United States Patent
Vermeulen

(10) Patent No.: US 10,282,228 B2
(45) Date of Patent: May 7, 2019

(54) LOG-BASED TRANSACTION CONSTRAINT MANAGEMENT

(71) Applicant: Amazon Technologies, Inc., Reno, NV (US)

(72) Inventor: Allan Henry Vermeulen, Corvallis, OR (US)

(73) Assignee: Amazon Technologies, Inc., Reno, NV (US)

( * ) Notice: Subject to any disclaimer, the term of this patent is extended or adjusted under 35 U.S.C. 154(b) by 579 days.

(21) Appl. No.: 14/316,630

(22) Filed: Jun. 26, 2014

(65) Prior Publication Data

US 2015/0378775 A1    Dec. 31, 2015

(51) Int. Cl.
*G06F 17/30* (2006.01)
*G06F 9/46* (2006.01)

(52) U.S. Cl.
CPC ........ *G06F 9/466* (2013.01); *G06F 17/30156* (2013.01); *G06F 17/30303* (2013.01)

(58) Field of Classification Search
CPC .............................................. G06F 17/30303
See application file for complete search history.

(56) References Cited

U.S. PATENT DOCUMENTS

| | | | |
|---|---|---|---|
| 5,408,653 A | | 4/1995 | Josten et al. |
| 5,799,305 A | * | 8/1998 | Bortvedt ................. G06F 9/466 |
| 6,052,695 A | * | 4/2000 | Abe .................... G06F 11/1471 |
| 6,240,413 B1 | * | 5/2001 | Learmont ................. G06F 8/65 |
| | | | 707/698 |
| 6,625,601 B1 | * | 9/2003 | Molloy ................... G06F 9/466 |
| 7,290,056 B1 | * | 10/2007 | McLaughlin, Jr. .......................... |
| | | | H04L 43/0852 |
| | | | 709/201 |
| 7,668,876 B1 | | 2/2010 | Kulkarni |
| 7,730,034 B1 | | 6/2010 | Deflaux et al. |
| 7,949,662 B2 | | 5/2011 | Farber et al. |
| 8,019,849 B1 | | 9/2011 | Lopilato et al. |
| 8,078,582 B2 | | 12/2011 | Wang et al. |
| 8,108,343 B2 | | 1/2012 | Wang et al. |
| 8,510,270 B2 | | 8/2013 | Pareek et al. |
| 8,548,945 B2 | | 10/2013 | Dwyer et al. |
| 8,650,155 B2 | | 2/2014 | Corbin et al. |
| 8,676,752 B2 | | 3/2014 | Kundu et al. |

(Continued)

OTHER PUBLICATIONS

Mojtaba et al. "Parallelizing Sequential Applications on Commodity Hardware using a Low-cost Software Transactional Memory", Copyright 2009.*

(Continued)

*Primary Examiner* — Jeff A Burke
*Assistant Examiner* — Cindy Nguyen
(74) *Attorney, Agent, or Firm* — Robert C. Kowert; Meyertons, Hood, Kivlin, Kowert & Goetzel, P.C.

(57) ABSTRACT

A transaction request is received at a log-based transaction manager, indicating a logical constraint to be satisfied before the corresponding transaction is committed. The transaction manager identifies a subset of transaction records stored in a persistent change log that are to be examined to evaluate the logical constraint. Based at least in part on the result of a comparison of one or more constraint-related data signatures included in the transaction request with corresponding data signatures in the subset of transaction records, a decision is made to commit the requested transaction.

20 Claims, 31 Drawing Sheets

(56) References Cited

U.S. PATENT DOCUMENTS

| | | | |
|---|---|---|---|
| 8,898,112 B1* | 11/2014 | Natanzon | G06F 11/2074 707/634 |
| 9,183,200 B1* | 11/2015 | Liu | G06F 17/30008 |
| 2007/0033157 A1* | 2/2007 | Gray | G06F 17/30371 |
| 2007/0162516 A1 | 7/2007 | Thiel et al. | |
| 2007/0219999 A1* | 9/2007 | Richey | G06F 17/30362 |
| 2008/0005203 A1* | 1/2008 | Bots | H04L 67/06 |
| 2008/0243865 A1* | 10/2008 | Hu | G06F 17/30575 |
| 2010/0057740 A1* | 3/2010 | Ni | G06F 9/466 707/E17.007 |
| 2010/0185847 A1* | 7/2010 | Shasha | G06F 11/1004 713/150 |
| 2012/0166407 A1 | 6/2012 | Lee et al. | |
| 2012/0209822 A1* | 8/2012 | Prabhakar | G06F 17/30371 707/703 |
| 2012/0310880 A1 | 12/2012 | Giampaolo et al. | |
| 2013/0110767 A1* | 5/2013 | Tatemura | G06F 17/30315 707/607 |
| 2014/0143367 A1* | 5/2014 | Dahlin | G06F 3/0617 709/213 |
| 2015/0172412 A1* | 6/2015 | Escriva | G06F 17/30091 709/202 |
| 2015/0347243 A1* | 12/2015 | Guerin | G06F 11/1471 709/212 |

OTHER PUBLICATIONS

International Search Report and Written Opinion, dated Dec. 7, 2015, Amazon Technologies, Inc., pp. 1-11.
U.S. Appl. No. 14/983,237, filed Dec. 29, 2015, Michael Benjamin Deardeuff et al.
Invitation to Pay Additional Fees for PCT/US2015/049470, dated Dec. 1, 2015, Amazon Technologies, Inc., pp. 1-10.
Ozgur Ulusoy. "Processing Real-Time Transactions in a Replicated Database System". Distributed and Parallel Databases, vol. 2, No. 4, Sep. 10, 1993, pp. 405-436.
Philip A. Bernstein, et al., "Concurrency Control and Recovery in Database Systems", Retrieved from the Internet URL: https://courses.cs.washington.edu/courses/cse490h/11wi/CSE490H_files/CSE550BHG-Ch7.pdf, Jan. 1987, pp. 1-58.
U.S. Appl. No. 14/753,475, filed Jun. 29, 2015, Allan Henry Vermeulen, et al.
U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
U.S. Appl. No. 14/316,674, filed Jun. 26, 2014, Allan Henry Vermeulen.
U.S. Appl. No. 14/316,680, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/136,645, filed Dec. 20, 2014, Marvin Michael Theimer.
U.S. Appl. No. 14/231,077, filed Mar. 31, 2014, Jacob A. Strauss.
U.S. Appl. No. 14/230,378, filed Mar. 31, 2014, Jacob A. Strauss.
"ChainReaction: a Causal + Consistent Datastore based on Chain Replication" Sergio Almeida, et al., Apr. 15-17, 2013, pp. 85-98.
"Chain Replication in Theory and in Practice", Scott Lystig Fritchie, Sep. 30, 2010, pp. 1-11.
"Chain Replication for Supporting High Throuphput and Availability", Robbert van Renesse, Fred B. Schneider, 2004, pp. 91-104.
U.S. Appl. No. 14/537,788, filed Nov. 10, 2014, Lei Ye.
U.S. Appl. No. 14/482,668, filed Sep. 10, 2014, Allan Henry Vermuelen.
U.S. Appl. No. 14/482,661, filed Sep. 10, 2014, Allan Henry Vermuelen.
U.S. Appl. No. 14/491,454, filed Sep. 19, 2014, Allan Henry Vermuelen.
U.S. Appl. No. 14/491,371, filed Sep. 19, 2014, Allan Henry Vermuelen.
U.S. Appl. No. 14/491,444, filed Sep. 19, 2014, Allan Henry Vermuelen.
Notice of Preliminary Rejection from Korean Patent Application No. 10-2017-7000274, dated Oct. 18, 2017, Amazon Technologies, Inc., pp. 1-16.

* cited by examiner

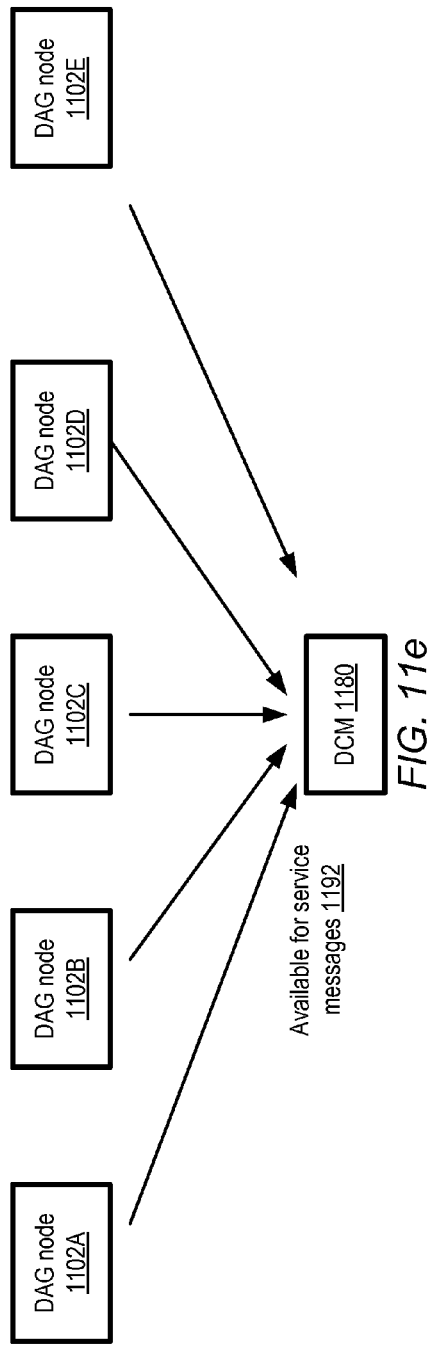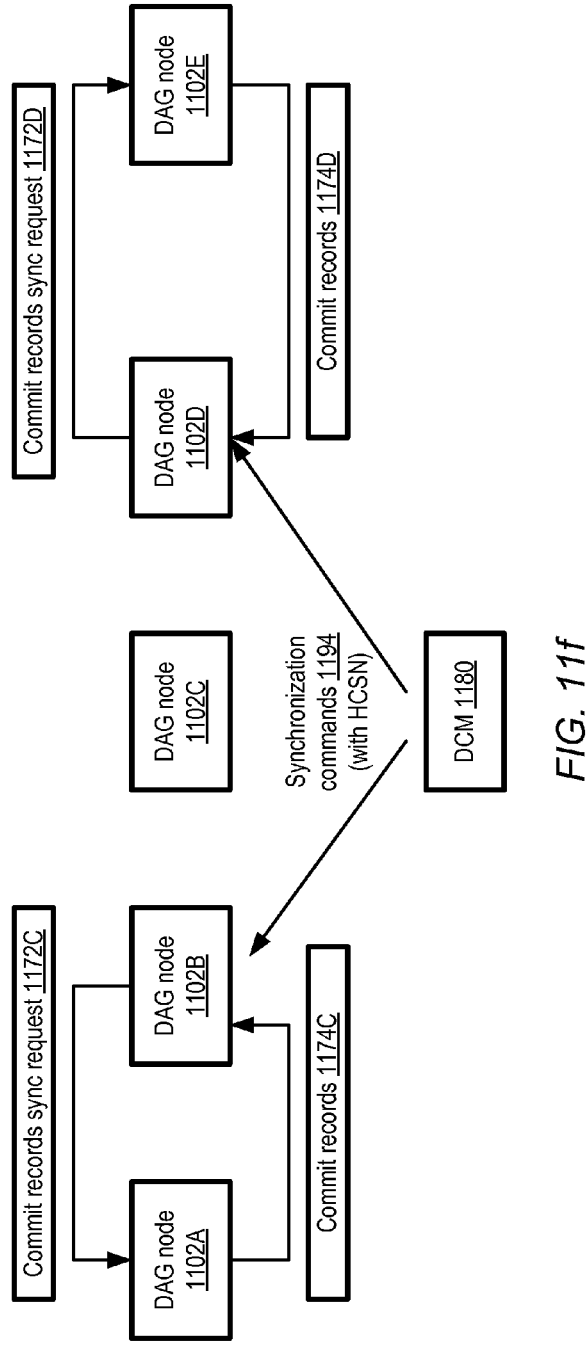

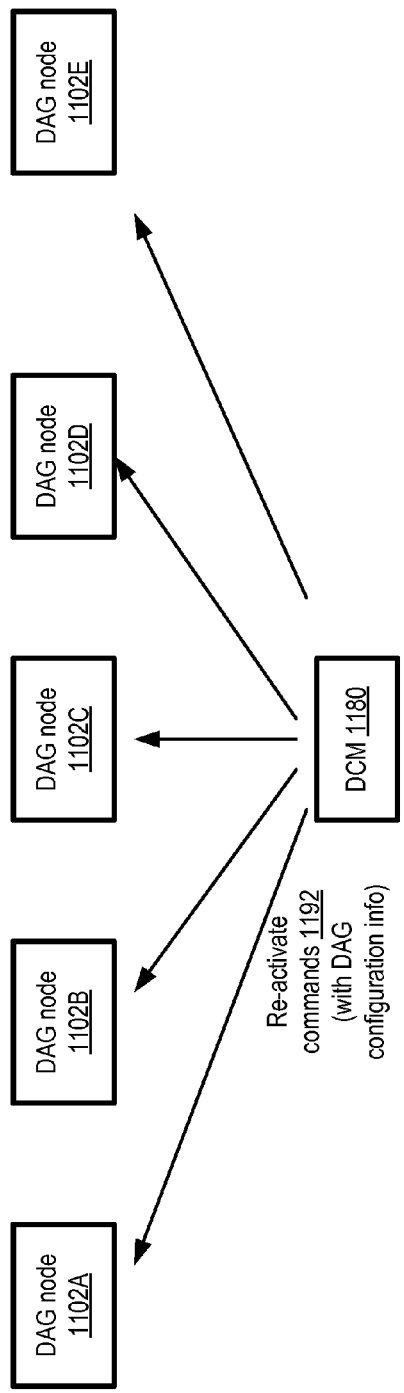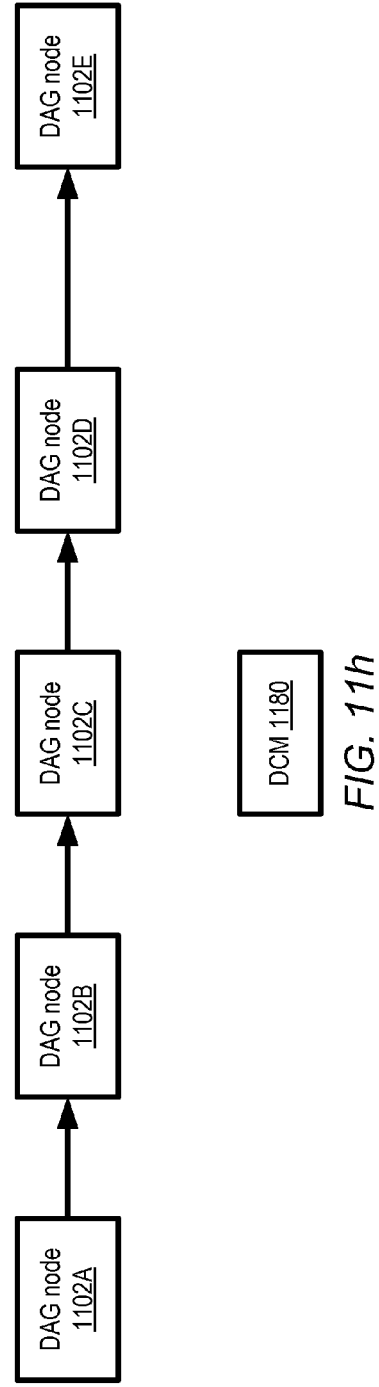

LOG-BASED TRANSACTION CONSTRAINT MANAGEMENT

BACKGROUND

In recent years, more and more computing applications are being implemented in distributed environments. A given distributed application may, for example, utilize numerous physical and/or virtualized servers spread among several data centers of a provider network, and may serve customers in many different countries. As the number of servers involved in a given application increases, and/or as the complexity of the application's network increases, failure events of various types (such as the apparent or real failures of processes or servers, substantial delays in network message latency, or loss of connectivity between pairs of servers) are inevitably encountered at higher rates. The designers of the distributed applications are therefore faced with the problem of attempting to maintain high levels of application performance (e.g., high throughputs and low response times for application requests) while concurrently responding to changes in the application configuration state.

Some traditional techniques for managing state information may involve locking the state information to implement application state changes in a consistent manner. Unfortunately, the locking mechanisms used for application state and/or data can themselves often become performance bottlenecks as the application increases in size and complexity. Other techniques may avoid locking, but may have to pause normal operations to propagate changed state information among the application's components. Such "stop-the-world" periods may be problematic, however, especially for latency-sensitive applications that are used for mission-critical workloads by hundreds or thousands of customers spread in different time zones across the world.

BRIEF DESCRIPTION OF DRAWINGS

FIG. 11a-11h collectively illustrate an example sequence of operations that may be performed at a replication DAG during a coordinated suspension procedure, according to at least some embodiments.

Figure 1:
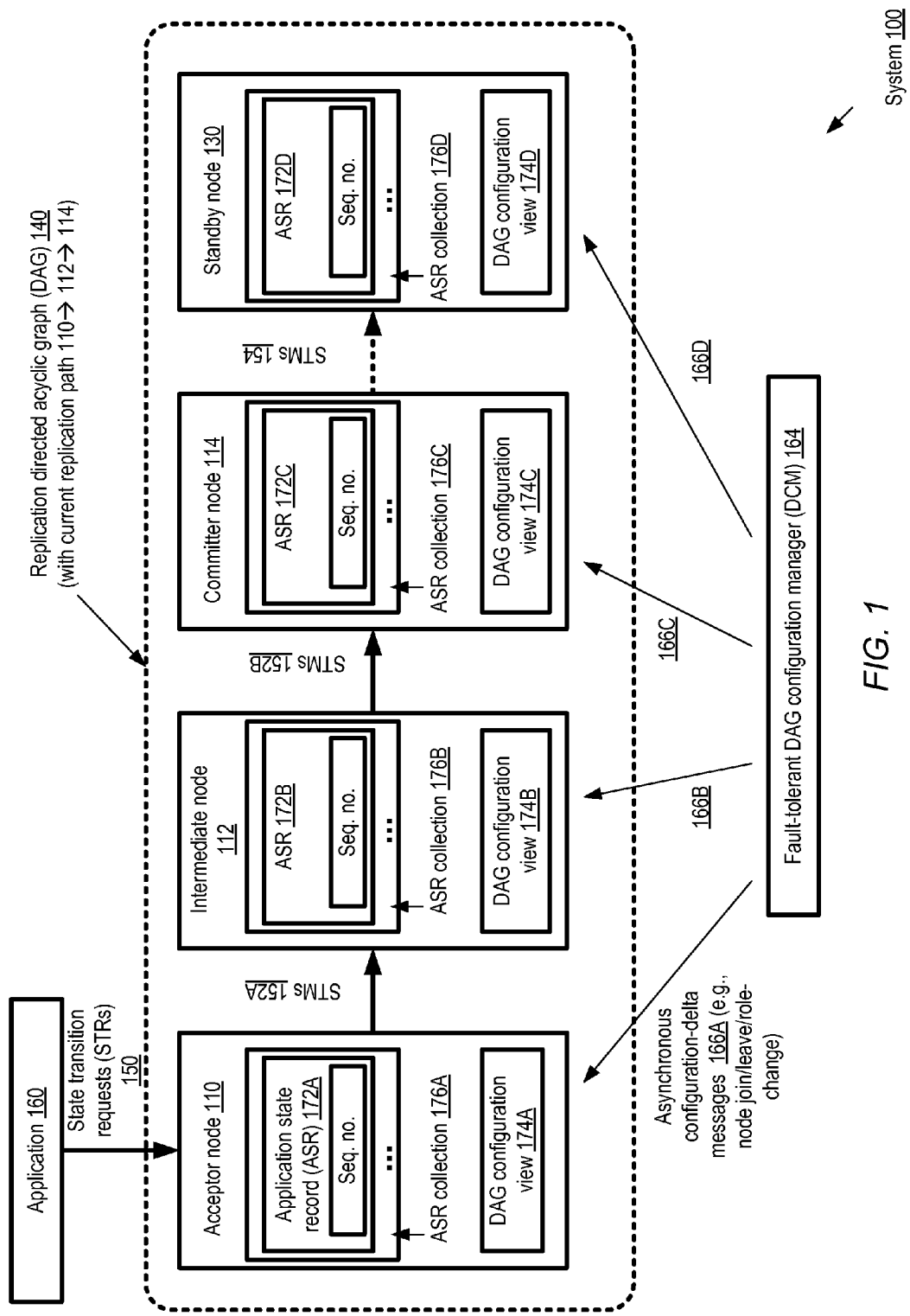
FIG. 1 illustrates an example system environment in which a dynamic DAG (directed acyclic graph) of replication nodes is established for managing application state changes, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for managing distributed application state using replication nodes organized as a graph, and of deploying such graphs to implement a logging service that can be used for transaction management, are described. According to some embodiments, a replicated state machine for building a fault-tolerant distributed application may be implemented using a plurality of replication nodes arranged in a directed acyclic graph (DAG). In some implementations, a particular replication DAG may include one or more acceptor nodes, one or more committer nodes, zero or more intermediary nodes each positioned along a replication pathway comprising DAG edges leading from an acceptor node to a committer node, and zero or more standby nodes that are configured to quickly take over responsibilities of one of the other types of nodes in the event of a node failure. Acceptor, intermediary and standby nodes of a replication DAG may collectively be referred to as "non-committer" nodes herein. "Acceptor", "intermediary", "committer", and "standby" may be referred to collectively as the set of roles that a DAG node may assume. In some embodiments, acceptor nodes may also be referred to as "head" nodes of the DAG, and committer nodes may also be referred to as "tail" nodes.

In general, in at least some embodiments, each node of a particular replication DAG may be responsible for replicating state information of at least a particular application, e.g., in the form of state transition records written to a local disk or other similar storage device. Application state information may be propagated along a set of edges from an acceptor node to a committer node of the DAG, referred to herein as a replication pathway or a commit pathway. Each state transition message propagated within the DAG may include a respective sequence number or a logical timestamp that is indicative of an order in which the corresponding state transition request was processed (e.g., at an acceptor node). Sequence numbers may be implemented using any of a variety of techniques in different embodiments—e.g., a simple N-bit counter maintained by an acceptor node may be used, or a monotonically increasing logical timestamp value (not necessarily related to a time-of-day clock) generated by an administrative component of the DAG such as the DAG's configuration manager may be used. When a particular state transition record reaches a committer node, e.g., after a sufficient number of replicas of the state transition record have been saved along a replication pathway, the transition may be explicitly or implicitly committed. The state of the application as of a point in time may be determined in some embodiments as a logical accumulation of the results of all the committed state transitions up to a selected sequence number. A configuration manager may be responsible for managing changes to DAG configuration (e.g. when nodes leave the DAG due to failures, or join/re-join the DAG) by propagating configuration-delta messages asynchronously to the DAG nodes as described below. In some embodiments, each replication node may implement a respective deterministic finite state machine, and the configuration manager may implement another deterministic finite state machine. The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for application state transition processing may work correctly even if some of the nodes along a replication pathway have a different view of the current DAG configuration than other nodes. It may thus be the case, in one simple example scenario, that one node A of a DAG continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The configuration manager may not need to request the DAG nodes to pause processing of state transition nodes in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein.

Under most operating conditions, the techniques used for propagating DAG configuration change information may eventually result in a converged consistent view of the DAG's configuration at the various member nodes, while minimizing or eliminating any downtime associated with node failures/exits, node joins or node role changes. Formal mathematical proofs of the correctness of the state management protocols may be available for at least some embodiments. In at least some embodiments, the replication DAG's protocols may be especially effective in dealing with false-positive failure detections. For example, in the above example, node D may have been informed by the configuration manager that node C has failed, even though node C has not actually failed. Thus, state transitions may still be processed correctly by C (and by its neighbors B and D) for some time after the false positive failure detection, in the interval before the configuration-delta messages indicating C's exit are received at A, B and D, enabling the application whose state is being replicated to make progress despite the false-positive failure detection. Upon eventually being informed that it has been removed from the DAG, C may indicate to the configuration manager that it is in fact available for service, and may be allowed to re-join the DAG (e.g., as a standby node or in some other position along the modified replication pathway).

In some embodiments, an acceptor node may be responsible for receiving application state transition requests from a client of the replication DAG, determining whether a particular requested transition should be accepted for eventual commit, storing a local replica of an accepted state transition record, and transmitting accepted state transition records to a neighbor node along a replication pathway of the DAG towards a committer node. Depending on the use case, a state transition record may include a write payload in some embodiments: e.g., if the application state comprises the contents of a database, a state transition record may include the bytes that are written during a transaction corresponding to the state transition. The acceptor node may also be responsible in at least some embodiments for determining or generating the sequence number for an accepted state transition. An intermediary node may be responsible for storing a local replica of the accepted state transition record, and transmitting/forwarding a message indicating the accepted state transition to the next node along the pathway to a committer node. The committer node may store its own replica of the state transition record on local storage, e.g., with an indication that the record has been committed. A record indicating that a corresponding state transition has been committed may be referred to herein as a "commit record", while a record that indicates that a corresponding state transition has been accepted but has not yet necessarily been committed may be referred to as an "accept record". In some embodiments, and depending on the needs of the application, the committer node may initiate transmission of a commit response (e.g., via the acceptor node) to the client that requested the state transition. In at least one embodiment, the committer node may notify some or all of the nodes along the replication pathway that the state transition has been committed. In some embodiments, when an indication of a commit is received at a DAG node, the accept record for the now-committed state transition may be replaced by a corresponding commit record, or modified such that it now represents a commit record. In other embodiments, a given DAG node may store both an accept record and a commit record for the same state transition, e.g., with respective sequence numbers. In some implementations, separate commit record sets and accept record sets may be stored in local storage at various DAG nodes, while in other implementations, only one type of record (accept or commit) may be stored at a time for a given state transition at a given DAG node.

A configuration manager may be designated as the authoritative source of the DAG's configuration information in some embodiments, responsible for accepting changes to DAG configuration and propagating the changes to the DAG nodes. In at least some embodiments, the configuration manager may itself be designed to be resilient to failures, e.g., as a fault-tolerant cluster of nodes that collectively approve DAG configuration changes (such as removals or additions of nodes) via consensus and replicate the DAG configuration at a plurality of configuration manager storage devices. As implied by the name "configuration-delta", a message sent to a DAG node by the configuration manager may include only an indication of the specific change (e.g., a change caused by a node joining the DAG or leaving the DAG, or a change to a role/position of an existing node of the DAG), and need not include a representation of the DAG's configuration as a whole, or list the entire membership of the DAG. A given recipient of a configuration-delta message may thus be expected to construct its own view of the DAG configuration, based on the specific set or sequence of configuration-delta messages it has received thus far. In some implementations, sequence numbers may also be assigned to configuration-delta messages, e.g., to enable a recipient of a configuration-delta message to determine whether it has missed any earlier configuration-delta messages. Since the configuration manager may not attempt to guarantee the order or relative timing of receiving the configuration-delta messages by different DAG nodes, the current views of the DAG's configuration may differ at different nodes in some embodiments, at least for some periods of time as indicated by the example above.

According to one embodiment, the actions taken by DAG nodes in response to configuration-delta messages may differ based on whether the configuration change affects an immediate neighbor of the recipient. Consider another example scenario in which a DAG comprises an acceptor node A, an intermediary node B, and a committer node C at a point of time T0, with the initial replication pathway A-to-B-to-C. At a time T1, the DAG's configuration manager DCM1 becomes aware that B has left the DAG, e.g., as a result of an apparent failure or loss of connectivity. DCM1 may send respective asynchronous configuration-delta messages D1 and D2 respectively to remaining nodes A and C, without requesting any pause in state transition request processing. If C receives D2 at time T2, before A receives D1 at time T3, A may continue sending state transition messages directed to B for some time interval (T3–T2) (although, if N has in fact failed, the messages send by A may not be processed by B). Similarly, if A receives D1 at T2, before C receives D2 at T3, C may continue to process messages it receives from B that were in flight when B failed, for some time (T3–T2) before C becomes aware of B's departure from the DAG. When node A receives D1, if it has not yet been contacted by C, node A may establish connectivity to C as its new immediate successor in the newly-configured replication pathway (A-to-C) that replaces the older replication pathway (A-to-B-to-C). Similarly, when C receives D2, it may establish connectivity to A (if A has not already contacted C) as its new immediate predecessor, and at least in some embodiments, C may submit a request to A for re-transmissions of state transition records that may have been transmitted from A to B but have not yet reached C. For example, C may include, within the re-transmission request, the highest sequence number HSN1 of a state transition record that it has received thus far, enabling A to re-transmit any state transition records with sequence numbers higher than HSN1.

In at least some embodiments, the configuration manager may rely on a health detection mechanism or service to indicate when a DAG node has apparently become unhealthy, leading to a removal of the apparently-unhealthy node from the DAG configuration. At least some health detection mechanisms in distributed environments may depend on heartbeats or other lower-level mechanisms which may not always make the right decisions regarding node health status. At the same time, the configuration manager may not be in a position to wait indefinitely to confirm actual node failure before sending its configuration-delta messages; instead, it may transmit the configuration-delta messages upon determining that the likelihood of the node failure is above some threshold (e.g., 80% or 90%), or use some other heuristics to trigger the DAG configuration changes and corresponding delta messages. As mentioned earlier, the state management protocols used at the replication DAG may alleviate the negative impact of false positive failure "detections", e.g., by avoiding "stop-the-world" pauses. As a result, it may be possible to use faster/cheaper (although potentially less reliable) failure-checking mechanisms when replication DAGs are employed than would have been acceptable if other state replication techniques were used.

In at least one embodiment, a coordinated suspension technique may be implemented for replication DAGs. Under certain conditions, e.g., if a large-scale failure event involving multiple DAG resources or nodes is detected, the configuration manager may direct the surviving nodes of the DAG to stop processing further state transitions, synchronize their application state information with each other, store the synchronized application state information at respective storage locations, and await re-activation instructions. In some implementations, after saving application state locally, the DAG nodes may each perform a clean shutdown and restart, and report to the configuration manager after restarting to indicate that they are available for service. If a node that had failed before the suspend command was issued by the configuration manager reports that it is available for service, in some embodiments the configuration manager may direct such a node to synchronize its application state with another node that is known (e.g., by the configuration manager) to be up-to-date with respect to application state. The configuration manager may wait until a sufficient number of nodes are (a) available for service and (b) up-to-date with respect to application state, determine a (potentially new) DAG configuration, and re-activate the DAG by sending re-activation messages indicating the DAG configuration to the member nodes of the configuration. Such a controlled and coordinated suspension/restart strategy may allow more rapid and dependable application recovery after large-scale failure events than may have been possible otherwise in some embodiments. The coordinated suspension approach may also be used for purposes other than responding to large-scale failures—e.g., for fast parallel backups/snapshots of application state information from a plurality of the replication nodes.

DAG-based replicated state machines of the type described above may be used to manage a variety of different applications in various embodiments. In some embodiments, a logging service may be implemented, at which one or more data stores (e.g., relational or non-relational databases) may be registered for transaction management via an instance of a persistent change log implemented using a replication DAG. As described below in further detail, an optimistic concurrency control mechanism may be used by such a log-based transaction manager in some embodiments. A client of the logging service may perform read operations on one or more source data stores and determine one or more data store locations to which write operations are to be performed (e.g., based on the results of the reads) within a given transaction. A transaction request descriptor including representations of the read sets, write sets, concurrency control requirements, and/or logical constraints on the transaction may be submitted to a conflict detector of the logging service (e.g., conflict detection logic associated with an acceptor node of the corresponding replication DAG). The conflict detector may use records of previously-committed transactions together with the contents of the transaction descriptor to determine whether the transaction request is acceptable for commit. If a transaction is accepted for commit, a replication of a corresponding commit record may be initiated at some number of replication nodes of the DAG established for the log. The records inserted into a given replica of the log may thus each represent respective application state transitions. A number of different logical constraints may be specified in different embodiments, and enforced by the log-based transaction manager, such as de-duplication requirements, inter-transaction commit sequencing requirements and the like. Such a log-based transaction management mechanism may, in some embodiments, enable support for multi-item transactions, or multi-database transactions, in which for example a given transaction's write set includes a plurality of write locations even though the underlying data stores may not natively support atomicity for transactions involving more than one write. The writes corresponding to committed transactions may be applied to the relevant data stores asynchronously in at least some embodiments—e.g., a record that a transaction has been committed may be saved in the persistent change log at some time before the corresponding writes are propagated to the targeted data stores. The persistent change log may thus become the authoritative source of the application state in at least some embodiments, with the data stores catching up with the application state after the log has recorded state changes.

Replication DAGs may also be used for replicated database instances, for managing high-throughput data streams, and/or for distributed lock management in various embodiments. In some embodiments, replication DAGs may be used within provider networks to manage state changes to virtualized resources such as compute instances. In at least some embodiments, in addition to propagating committed writes to registered data stores (from which the results of the writes can be read via the respective read interfaces of the data stores), a logging service may also define and implement its own separate access interfaces, allowing interested clients to read at least a portion of the records stored for a given client application directly from a persistent log instance.

Example System Environment

FIG. 1 illustrates an example system environment in which a dynamic DAG (directed acyclic graph) of replication nodes is established for managing application state changes, according to at least some embodiments. As shown, in system 100, replication DAG 140 established for managing state transitions of an application 160 comprises a replication pathway with three nodes: an acceptor node 110, an intermediate node 112 and a committer node 114. In addition, DAG 140 includes a standby node 130 in the depicted embodiment, available to take over the responsibilities of any of the other nodes if needed. Other combinations of nodes may be deployed for other replication DAGs—e.g., more than one intermediate node may be used for some applications, no intermediate nodes may be used for other applications, or standby nodes may not be established. Changes to the configuration of the DAG 140 may be coordinated by a fault-tolerant DAG configuration manager (DCM) 164 as described below.

The acceptor node 110 may receive application state transition requests (STRs) 150 via one or more programmatic interfaces such as APIs (application programming interfaces) in the depicted embodiment. The acceptor node 110 may accept a requested transition for an eventual commit, or may reject the request, using application-dependent rules or logic. If a transition is accepted, a sequence number may be generated by the acceptor node 110, e.g., indicative of an order in which that transition was accepted relative to other accepted transitions. As mentioned above, in some embodiments the sequence number may comprise a counter that is incremented for each accepted transition, while in other embodiments a logical clock or timestamp value provided by the configuration manager may be used. A collection 176A of application state records (ASRs) 172A including corresponding sequence numbers may be stored in local persistent storage by the acceptor node. In some embodiments, the application state records may comprise both transition accept records and transition commit records (with a commit record being stored only after the acceptor node is informed that the corresponding transition was committed by the committer node). In other embodiments, at least some nodes along the replication pathway may only store accept records. After storing a state transition record indicating acceptance, the acceptor node may transmit a state transition message (STM) 152A indicating the approval to its successor node along the replication pathway, such as intermediate node 112 in the illustrated configuration. The intermediate node may store its own copy of a corresponding ASR, 172B, together with the sequence number, in its local ASR collection 176B. The intermediate node may transmit its own STM 152B to its neighbor along the current replication pathway, e.g., to committer node 114 in the depicted embodiment. In at least some implementations, the STMs 152 may include an indication of which nodes have already stored replicas of the ASRs—e.g., the message 152B may indicate to the committer node that respective replicas of the application state record indicating acceptance have been stored already at nodes 110 and 112 respectively.

In response to a determination at the committer node that a sufficient number of replicas of the application state record have been stored (where the exact number of replicas that suffice may be a configuration parameter of the application 160), the transition may be committed. The ASR collection 176C of the committer node may comprise records of transaction commits (as opposed to approvals) in the depicted embodiment; thus, ASR 172C may indicate a commit rather than just an acceptance. In at least some embodiments, the committer node 116 may transmit indications or notifications to the acceptor node and/or the intermediate node indicating that the transition was committed. In other embodiments, the acceptor and/or intermediate node may submit requests (e.g., periodically) to the committer node 116 to determine which transitions have been committed and may update their ASR collections accordingly. For some applications, explicit commits may not be required; thus, no indications of commits may be stored, and each of the DAG nodes along the pathway may simply store respective application state records indicating acceptance. In the depicted embodiment, post-commit STMs 154 may be transmitted from the committer node to the standby node 130 to enable the standby node to update its ASR collection 176D (e.g., by storing a commit ASR 172D), so that if and when the standby node is activated to replace another DAG node, its application state information matches that of the committer node. The fact that standby nodes are kept up-to-date with the latest committed application state may enable the configuration manager to quickly activate a standby node for any of the other three types of roles in some embodiments: e.g., as an acceptor node, an intermediate node, or a committer node.

A fault-tolerant DAG configuration manager (DCM) 164 may be responsible for propagating changes to the DAG configuration or membership in the form of configuration-delta messages 166 (e.g., messages 166A, 166B, 166C and 166D) to the DAG nodes as needed in the depicted embodiment. When a given DAG node leaves the DAG 140, e.g., as a result of a failure, a corresponding configuration-delta message 166 may be sent to one or more surviving nodes by the DCM 164, for example. Similarly, when a new node joins the DAG (e.g., after a recovery from a failure, or to increase the durability level of the application 160), a corresponding configuration-delta message indicating the join event, the position of the joining node within the DAG, and/or the role (e.g., acceptor, intermediate, committer, or standby) granted to the joining node may be transmitted by the DCM to one or more current member nodes of the DAG. The configuration-delta messages 166 may be asynchronous with respect to each other, and may be received by their targets in any order without affecting the overall replication of application state. Each node of the DAG may be responsible for constructing its own view 174 of the DAG configuration based on received configuration-delta messages, independently of the configuration views 174 that the other nodes may have. Thus, for example, because of the relative order and/or timing of different configuration-delta messages received at respective nodes 110, 112, 114 and 130, one or more of the configuration views 174A, 174B, 174C and 174D may differ at least for some short time intervals in some embodiments. In at least some embodiments, each DAG node may store representations or contents of some number of the configuration-delta messages received in respective local configuration change repositories. In the depicted embodiment, the DCM 164 may not enforce stop-the-world pauses in application state processing by the DAG nodes—e.g., it may allow the nodes to continue receiving and processing application state transition messages regardless of the timing of configuration-delta messages or the underlying DAG configuration changes. Examples of the manner in which DAG nodes respond to configuration-delta messages are discussed below with reference to FIG. 2a-2h.

It is noted that although FIG. 1 shows a DAG with a single linear replication pathway or "chain" with one node of each type, in at least some embodiments a replication DAG may include branched pathways and/or multiple nodes for each role. That is, several acceptor, intermediate, committer and/or standby nodes may coexist in the same DAG, and the DAG's replication pathways may include join nodes (nodes at which transition requests from multiple predecessor nodes are received) or split nodes (nodes from which transition requests are sent to multiple successor nodes). If either the acceptor node 110 or the committer node 116 rejects a requested state transition (e.g., either because the acceptor node determines a set of application-specific acceptance criteria are not met, or because an insufficient number of replicas of an accepted transition have been made by the time the committer node receives the accepted state transition request message), in some embodiments the client that requested the transition may be informed that the transition was not committed. The client may then retry the transition (e.g., by submitting another state transition request), or may decide to abandon the request entirely. In some implementations, intermediate nodes may also be permitted to abort transition requests.

Figure 2A:
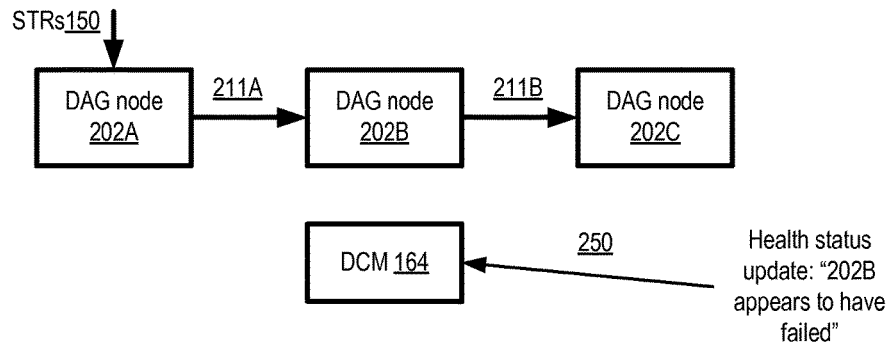
FIG. 2a-2h collectively illustrate an example sequence of operations that may be performed at a replication DAG in response to a detection that one of the nodes of the DAG may have failed, according to at least some embodiments.

FIG. 2a-2h illustrate an example sequence of operations that may be performed at a replication DAG in response to a detection that one of the nodes of the DAG may have failed, according to at least some embodiments. FIG. 2a shows an initial state of the DAG configuration, including three nodes 202A, 202B and 202C. State transition requests (STRs) 150 are received at node 202A. Accepted state transition records are replicated at nodes 202A (after local approval of the STRs) and 202B (after node 202B receives approved STMs 211A), and committed at 202C (after node 202C receives approved STMs 211B). The DCM 164 may receive a health status update 250 indicating that node 202B has apparently failed. The health status update regarding node 202B's status may be received from any of a variety of sources in different embodiments, e.g., from one of the other nodes (202A or 202B), or from a health monitoring service external to the DAG (e.g., a general-purpose resource health monitoring service established at a provider network where the DAG nodes are instantiated). In at least one implementation, the health status update may be generated by a subcomponent of the DMC 164 itself, such as a monitoring process that periodically sends heartbeat messages to the DAG nodes and determines that a given node is in an unhealthy state if no response is received within an acceptable time window to some number of successive heartbeat messages.

Figure 2B:
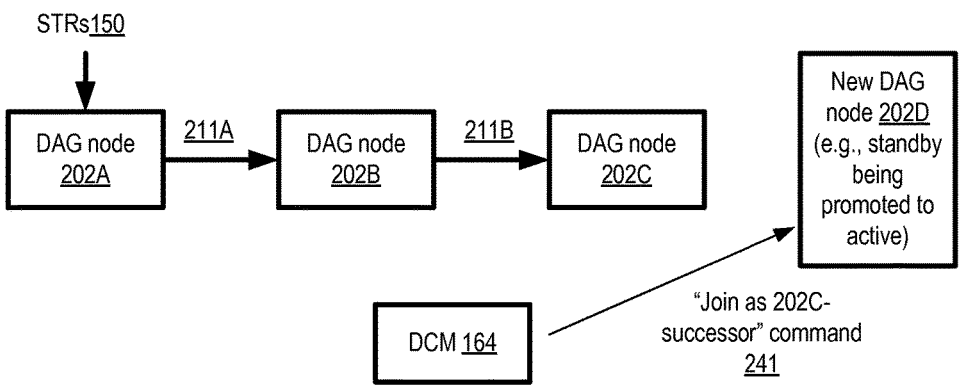
Figure 2C:
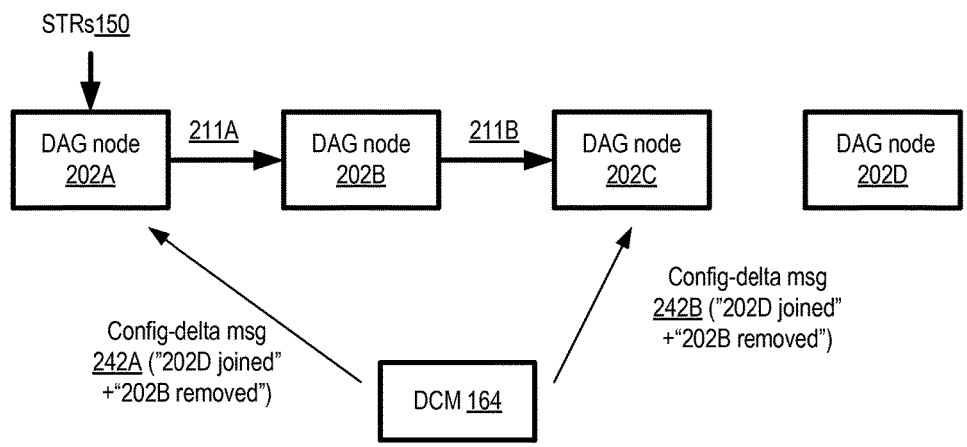
Figure 2D:
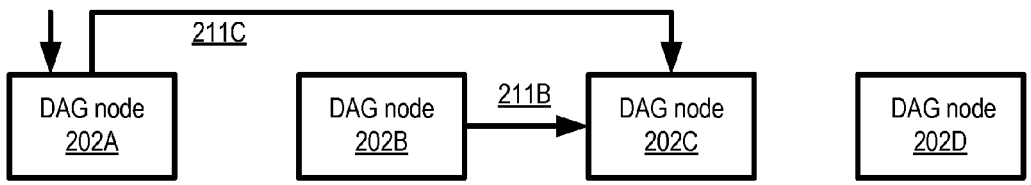

In the depicted embodiment, the DCM 164 may decide on the basis of the health status update that node 202B should be removed from the DAG, and a new node 202D should be added as a successor to node 202C. The new node may, for example, comprise a standby node being promoted to active status as the new committer node of the DAG. After deciding the new configuration of the DAG (i.e., that the DAG should now comprise a replication chain 202A-to-202C-to-202D), and saving a representation of the new configuration in a persistent repository, DCM 164 may issue a command 241 to node 202D to join the DAG as a successor to node 202C. It is noted that at least in some embodiments, a removal of a node such as 202B from a DAG may not necessarily be accompanied by an immediate addition of a replacement node (especially if the number of DAG nodes that remain online and connected after the removal exceeds the minimum number of nodes needed by the application whose state is being replicated); the addition of node 202D is illustrated simply as one of the ways in which the DCM may respond to a node failure (or at least an apparent node failure). As shown in FIG. 2b, it may be the case that node 202B has not actually failed (i.e., that the health update was in error regarding 202B's failure). In such a false-positive scenario, state transition messages may continue to be transmitted from 202A towards 202B, and from 202B to 202C, allowing the application to continue making progress for at least some time after the DCM 164 makes the removal decision.

In at least some embodiments, when a node such as 202B is removed from a DAG, and the immediate successor (e.g., 202C) of the removed node remains in the DAG, the role that was previously assigned to the removed node may be transferred to the immediate successor. Thus, node 202C, which may have been a committer node, may be made an intermediate node upon node 202B's departure, and the newly-activated node 202D may be designated as the new committer node. If the removed node had no immediate successor (e.g., if node 202C had been removed in the depicted example instead of node 202B), the newly-activated standby node may be granted the role that was assigned to the removed node in some embodiments. In other embodiments, roles may not be transferred in a such a sequential/linear fashion—e.g., the configuration manager may decide which roles should be granted to a given node without taking the relative position of the node vis-à-vis a removed node into account.

After deciding that node 202B should be removed from the DAG, the DCM 164 may send respective asynchronous configuration-delta messages 242A and 242B to nodes 202A and 202C in the depicted embodiment. As shown, each of the delta messages may indicate that 202B has left the DAG, and that 202D has joined. Although the two changes to the configuration are indicated in a single configuration-delta message in the depicted embodiment, in other embodiments separate configuration delta messages may be sent for the removal of 202B and the join of 202D. The configuration-delta messages may indicate only the changes to the DAG configuration, and may not comprise a representation of the DAG's entire configuration in the depicted embodiment. Until node 202A receives the configuration-delta message 242A or otherwise becomes aware that 202B has left the DAG (e.g., due to termination of a network connection), STMs may continue to be directed from node 202A to node 202B. In the scenario where 202B has not actually failed, node 202B may continue processing state transition requests and sending messages 211B towards node 202C until it becomes aware that it has been removed from the DAG (e.g., if either 202A or 202C stop communicating with 202B).

Since the configuration-delta messages 242 are sent using an asynchronous messaging mechanism, they may arrive at their destinations at different times. If node 202A receives configuration-delta message 242A before node 202C receives configuration-delta message 242B, the scenario depicted in FIG. 2d may be reached (in which the DAG at least temporarily contains a branch). In response to message 242A, node 202A may save the indication of the configuration change in local storage and stop sending any further messages to node 202B. Furthermore, node 202A may determine that its new successor node is 202C, and may therefore establish network connectivity with node 202C and start sending node 202C new state transition messages 211C. In the embodiment depicted, state transition processing activities may continue at various nodes of the DAG even as the message indicating the removal of 202B makes its way to the remaining nodes. In a scenario in which node 202B is assumed to have failed but in fact remains functional, for example, even after node 202A learns that node 202B has been removed from the DAG, one or more in-flight state transition messages may be received from node 202A at node 202B. Upon receiving such an in-flight message, node 202B may replicate the state transition information indicated in the message in local storage and attempt to transmit another similar STM to node 202C. If node 202C has not yet learned of node 202B's removal (or at least has not yet closed its connection with node 202B), node 202C may receive and process the message from node 202B, allowing the application to make progress, even though node 202B has been removed from the DAG configuration by the configuration manager.

Figure 2E:
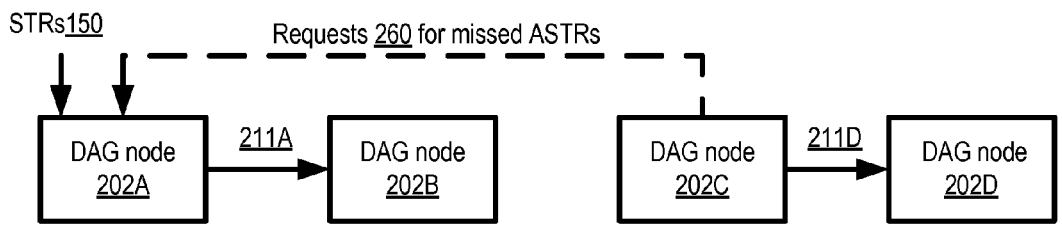

If node 202C receives configuration-delta message 242B before node 202A received configuration-delta message 242A, the scenario illustrated in FIG. 2e may be reached. Upon receiving message 242B, node 202C may stop receiving new messages sent from node 202B (e.g., by terminating its connection with node 202B if the connection is still in service). Upon realizing that node 202A is its new immediate predecessor in the DAG pathway, node 202C may establish connectivity to node 202A. Node 202C may also determine the highest sequence number HSN1 (from among the sequence numbers for which approved STMs have already been received at node 202C), and send a request 260 to node 202A to re-transmit any approved state transition messages that 202C may have missed (i.e., any approved STMs with higher sequence numbers than HSN1) in the depicted embodiment. Furthermore, node 202C may also establish connectivity to its new successor node 202D, and may start sending subsequent approved STMs 211D to node 202D.

Figure 2F:
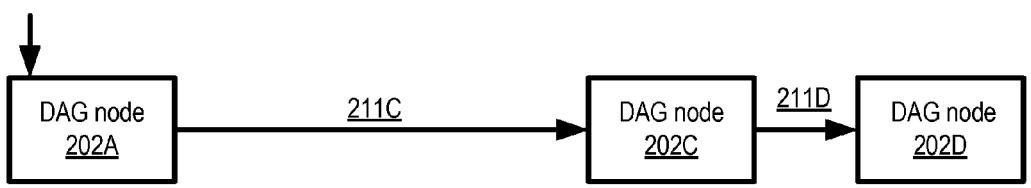

After both nodes 202A and 202C have been informed about the DAG configuration change, the DAG's new replication pathway illustrated in FIG. 2f (i.e., 202A-to-202C-to-202D) may be used for new incoming state transition requests. It is noted that because of the timing of the configuration-delta messages 242, it may be the case that node 202A learns about the configuration change from node 202C before the configuration-delta message 242A is received at node 202A. Similarly, node 202C may learn about the new configuration from node 202A (or even node 202D) in some embodiments. Thus, there may be multiple ways in which information about the new configuration may reach any given node of the DAG, and at least in some embodiments the DAG nodes may start using portions of the new replication pathway even before the configuration-delta messages have reached all of their targeted recipients.

Figure 2G:
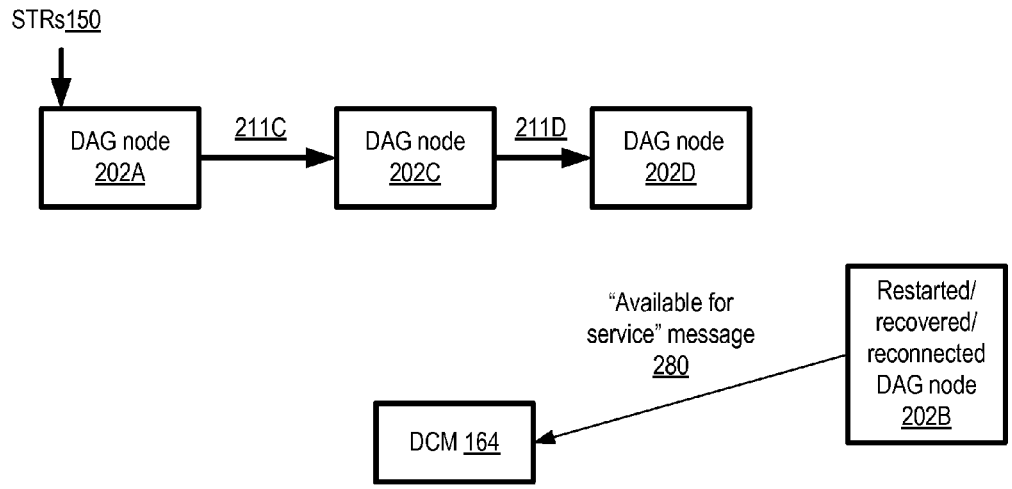
Figure 2H:
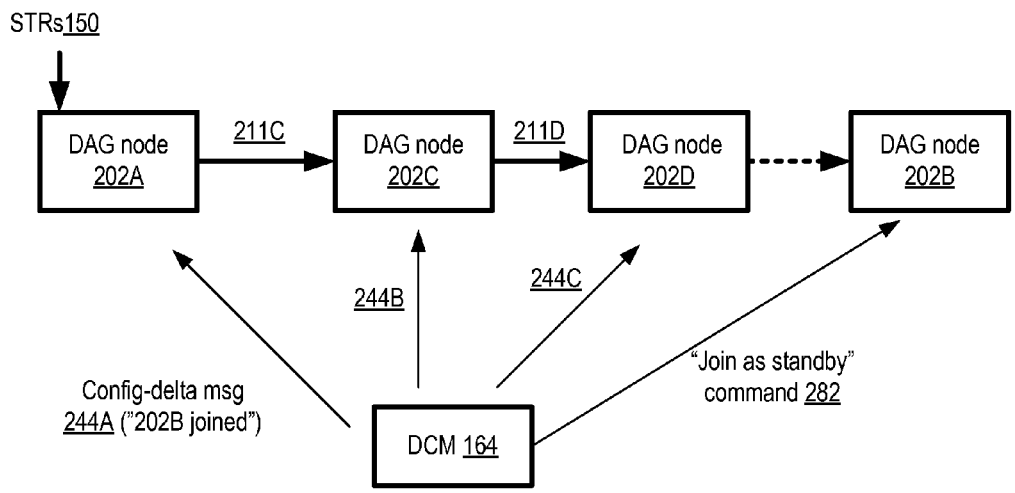

As shown in FIG. 2g, at some point after it has been removed from the DAG (e.g., either due to an actual failure or due to a false positive failure detection), node 202B may optionally indicate to the DCM 164 that it is ready for service. In the case of an actual failure, for example, node 202B may eventually be repaired and restarted and may perform some set of recovery operations before sending the "available for service" message 280. In the case of a network connectivity loss, the "available for service" message may be sent after connectivity is reestablished. In response, in the depicted embodiment, the DCM 164 may decide to add node 202B back as a standby node of the DAG. Accordingly, as shown in FIG. 2h, the DCM may send a join command 282 to node 202B, and a new set of configuration-delta messages 244A, 244B and 244C to nodes 202A, 202B and 202D respectively to inform them of the addition of node 202B. It is noted that the sequence of operations illustrated in FIG. 2a-2h is provided as an example, and that the DAG nodes and the DCM may perform a different sequence of operations than that illustrated in FIG. 2a-2h in response to an apparent failure of node 202B in various embodiments. For example, no new node may be added to the DAG in some embodiments as a successor to node 202C. Also, in some embodiments, node 202B may not necessarily re-join the same DAG after it becomes available for service; instead, for example, it may be deployed to a different DAG or may be kept in a pool of nodes from which new DAGs may be configured.

Although a detection of a failure is shown as triggering a DAG configuration changes in FIG. 2a-2h, in general, any of a number of different considerations may lead to modifications of DAG configurations in various embodiment. For example, an application owner (or the DCM) may decide to add a node to a DAG to enhance data durability or for availability reasons. Configuration-delta messages indicating the addition of a new node may be propagated in a similar asynchronous fashion to other DAG nodes as the removal-related propagation described above in some embodiments, without requiring "stop-the-world" pauses in state transition processing. A DAG node may have to be taken offline for maintenance-related reasons in some embodiments, e.g., for a software upgrade, for debugging software errors, or for hardware modifications. In at least one embodiment, a DAG's configuration may be changed as a result of a determination that the workload level (e.g., the number of state transitions being processed per second) at one or more of the nodes has reached a threshold level, and that more performant (or less performant) hardware/software stacks should be utilized than are being used currently. In some embodiments, a DAG configuration change may involve changing the position or role of a particular DAG node, without necessarily adding or removing a node. For example, a configuration manager may switch the role of committer to a node that was previously an intermediate node, and make the old committer node an intermediate node in the new configuration. Such a role change may be implemented (and the corresponding configuration-delta messages propagated), for example, for load balancing purposes, especially in a multi-tenant environment in which the same host is being used for nodes of several different DAGs. Such multi-tenant environments are described below in further detail.

State Transition Records and Configuration-Delta Messages

Figure 3:
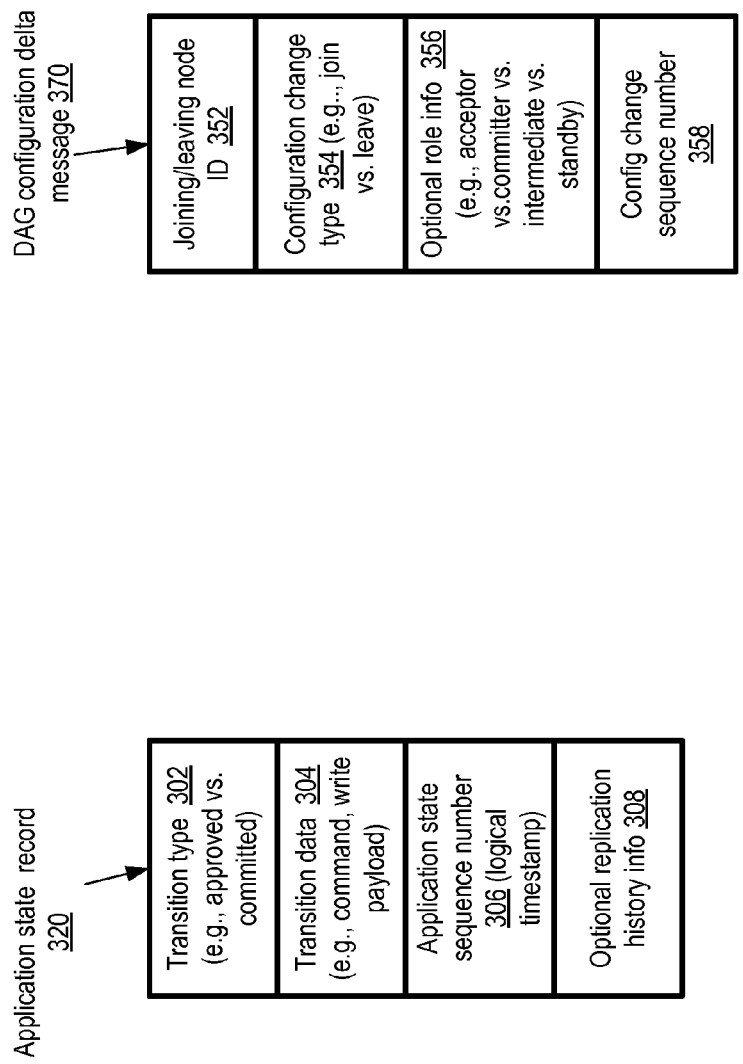
FIG. 3 illustrates example components of application state records and DAG configuration-delta messages that may be generated at a dynamic replication DAG according to at least some embodiments.

FIG. 3 illustrates example components of application state records (ASRs) and DAG configuration-delta messages that may be generated at a dynamic replication DAG according to at least some embodiments. As indicated earlier, copies of application state records, each representing an approved or committed state transition, may be stored at each of several nodes along a replication pathway of a DAG in at least some embodiments Application state records may also be referred to as state transition records herein. As shown, an application state record 320 may comprise an indication of the type 302 of the transition—e.g., whether an approval of a requested state transition is being recorded, or whether a commit of an approved state transition is being recorded. In some embodiments, as noted earlier, each DAG node may store both approval and commit records, while in other embodiments, only one type of state transition record may be stored. For example, in one scenario, approval records may be replicate initially at non-committer nodes, and the approval records may be changed to commit records after the transaction is eventually committed by the committer node. In at least one embodiment, a separate transition type field 302 may not be included in an ASR or in the message that leads to the generation of the ASR—instead, the type of the transition may be inferred by a DAG node based on the node's knowledge of its current role and/or the role of the source DAG node from which the message is received. For example, a non-committer node that receives a state transition message may infer that the message represents an approved state transition.

The state transition records 320 records may include transition data 304 in the depicted embodiment. The nature of the contents of the transition data component 304 may differ depending on the application whose state is being managed. In some cases, for example, a state transition request may include a write payload (indicating some number of bytes that are to be written, and the address(es) to which the bytes are to be written), and the write payload may be included in the transition record. For other applications, each state transition may indicate a respective command issued by an application client, and a representation of the command may be included in the ASR. The ASR 320 may also include a sequence number 306 (which may also be considered a logical timestamp) corresponding to the state transition. The sequence number may, for example, be generated at an acceptor node when a state transition request is approved, or at a committer node when the state transition is committed. In at least some embodiments, the current state of the application being managed using the DAG may be determined by applying, starting at some initial state of the application, transition data of committed state records (e.g., write payloads, commands, etc.) in order of increasing sequence numbers. In some embodiments, replication history information 308 of a transition may also be included in an ASR—e.g., indicating which DAG nodes have already stored a respective ASR for the same transition, and/or the order tin which those records have been replicated. Such replication history information may, for example, be used by a committer node in some implementations to confirm that a sufficient number of nodes have recorded a given state transition for a commit. In some embodiments, an ASR message may indicate the identity of the acceptor node where the corresponding state transition request was received, but need not include information regarding other nodes along the replication pathway. In at least one implementation, a committer node may not be required to confirm that a sufficient number of nodes have replicated a state transition record before committing an approved state transition.

A DAG configuration-delta message 370 may indicate an identifier 352 of the node (or nodes) joining or leaving the configuration in the depicted embodiment, and the type of change 354 (e.g., join vs. leave) being implemented. In some implementations, role information 356 about the joining (or leaving) node may optionally be included in the configuration-delta message. In at least some embodiments, just as application state sequence numbers are associated with application state transitions, DAG configuration change sequence numbers 358 may be included with configuration-delta messages. Such sequence numbers may be used by a recipient of the configuration-delta messages to determine whether the recipient has missed any prior configuration changes, for example. If some configuration changes have been missed (due to network packets being dropped, for example), the recipient node may send a request to the DCM to re-transmit the missed configuration-delta messages. The configuration change sequence numbers 358 may be implemented as counters or logical timestamps at the DCM in various embodiments. In some implementations in which the DCM comprises a cluster with a plurality of nodes, a global logical timestamp maintained by the cluster manager may be used as a source for the configuration change sequence numbers 358.

Replication DAG Deployments in Provider Network Environments

Figure 4:
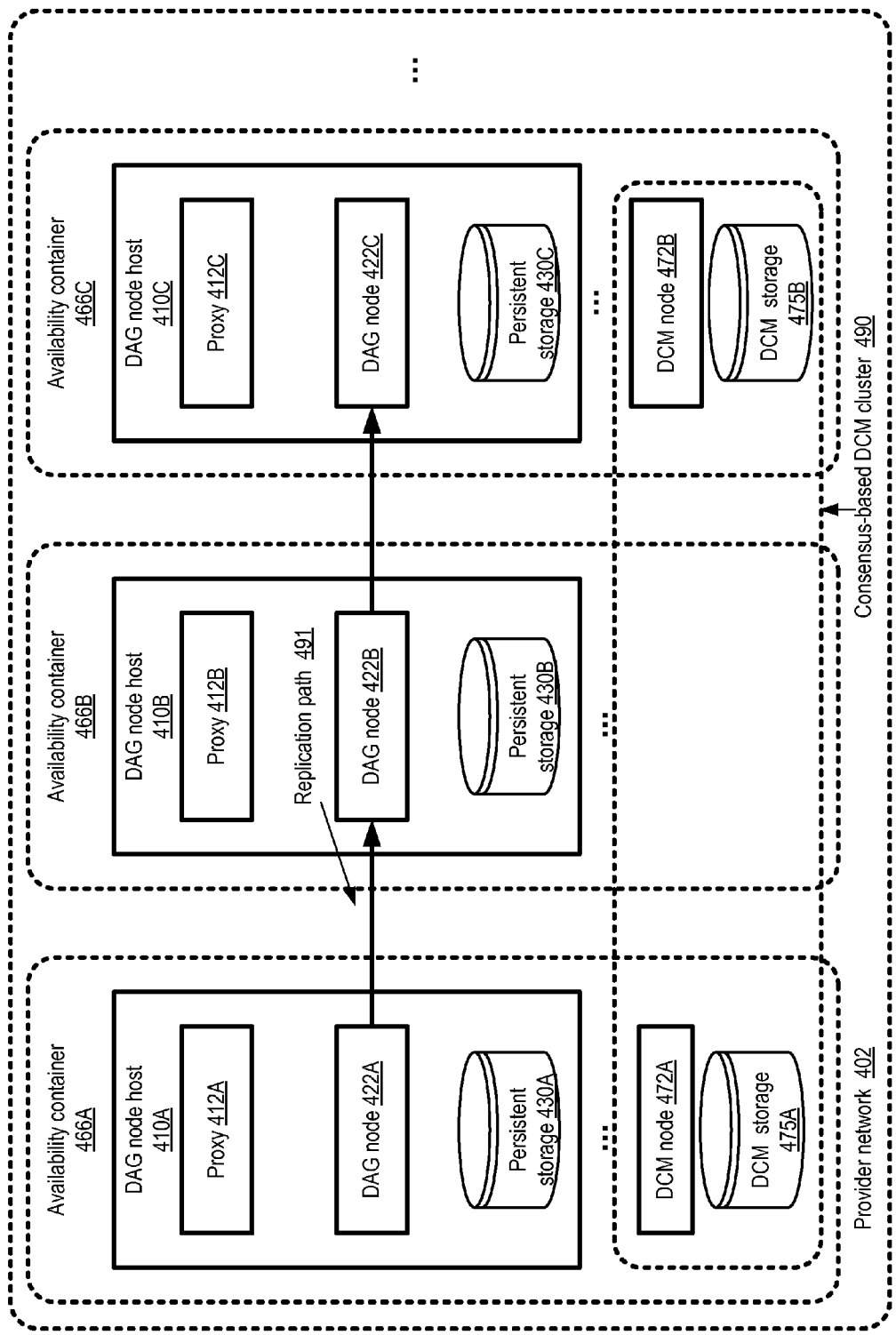
FIG. 4 illustrates an example replication DAG whose member nodes are distributed across a plurality of availability containers of a provider network, according to at least some embodiments.

FIG. 4 illustrates an example replication DAG whose member nodes are distributed across a plurality of availability containers of a provider network, according to at least some embodiments. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. At least some provider networks may also be referred to as "public cloud" environments. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance.

In some embodiments a provider network may be organized into a plurality of geographical regions, and each region may include one or more availability containers, which may also be termed "availability zones". An availability container in turn may comprise one or more distinct physical premises or data centers, engineered in such a way (e.g., with independent infrastructure components such as power-related equipment, cooling equipment, and/or physical security components) that the resources in a given availability container are insulated from failures in other availability containers. A failure in one availability container may not be expected to result in a failure in any other availability container; thus, the availability profile of a given physical host or virtualized server is intended to be independent of the availability profile of other hosts or servers in a different availability container.

One or more nodes of a replication DAG may be instantiated in a different availability container than other nodes of the DAG in some embodiments, as shown in FIG. 4. Provider network 402 includes three availability containers 466A, 466B and 466C in the depicted embodiment, with each availability container comprising some number of node hosts 410. Node host 410A of availability container 466A, for example, comprises a DAG node 422A, local persistent storage (e.g., one or more disk-based devices) 430A, and a proxy 412A that may be used as a front end for communications with DAG clients. Similarly, node host 410B in availability container 466B comprises DAG node 422B, local persistent storage 430B, and a proxy 412B, and node host 410C in availability container 466C includes DAG node 422C, local persistent storage 430C and a proxy 412C. In the depicted embodiment, DAG nodes 422 (and/or proxies 412) may each comprise one or more threads of execution, such as a set of one or more processes. The local persistent storage devices 430 may be used to store local replicas of application state information along replication path 491 (and/or DAG configuration-delta message contents received at the DAG nodes 422 of the replication path 491) in the depicted embodiment.

The DCM of the DAG depicted in the embodiment of FIG. 4 itself comprises a plurality of nodes distributed across multiple availability containers. As shown, a consensus-based DCM cluster 490 may be used, comprising DCM node 472A with DCM storage 475A located in availability container 466A, and DCM node 472B with DCM storage 475B located in availability container 466B. The depicted DCM may thus be considered fault-tolerant, at least with respect to failures that do not cross availability container boundaries. The nodes of such a fault-tolerant DCM may be referred to herein as "configuration nodes", e.g., in contrast to the member nodes of the DAG being managed by the DCM. Changes to the DAG configuration (including, for example, node removals, additions or role changes) may be approved using a consensus-based protocol among the DCM nodes 472, and representations of the DAG configuration may have to be stored in persistent storage by a plurality of DCM nodes before the corresponding configuration-delta messages are transmitted to the DAG nodes 422. The number of availability containers used for the DCM and/or for a given replication DAG may vary in different embodiments and for different applications, depending for example on the availability requirements or data durability requirements of the applications. In some embodiments, replication DAGs may be used to manage the configuration of resources of other services implemented at a provider network. For example, changes to the state of compute instances (virtual machines) or instance hosts (physical hosts) used by a virtualized computing service may be managed using a replication DAG in one embodiment.

Figure 5:
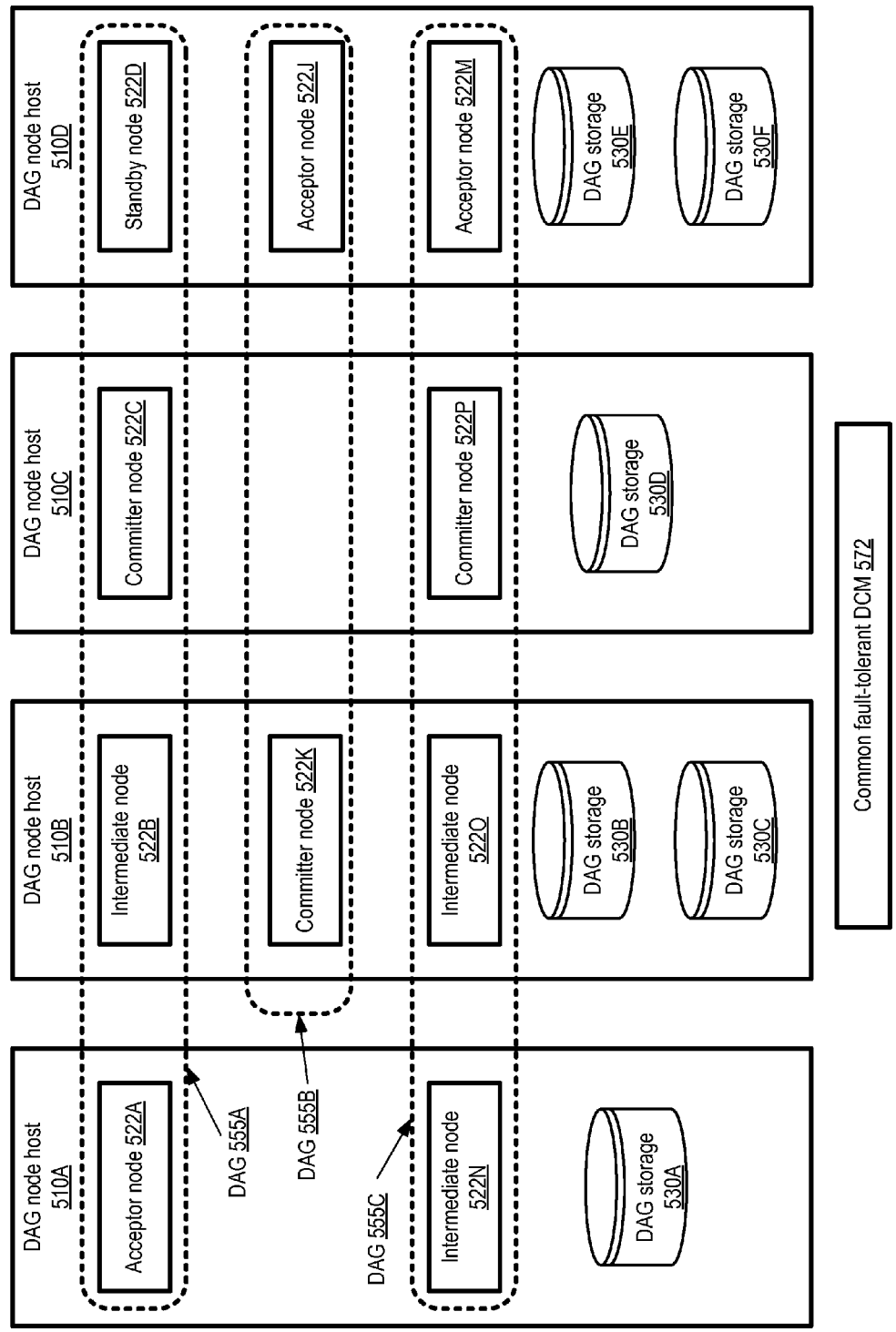
FIG. 5 illustrates an example configuration in which nodes of a plurality of replication DAGs may be implemented at a single host in a multi-tenant fashion, according to at least some embodiments.

FIG. 5 illustrates an example configuration in which nodes of a plurality of replication DAGs may be implemented at a single host in a multi-tenant fashion, according to at least some embodiments. As shown, nodes of three replication DAGs 555A, 555B and 555C are distributed among four DAG node hosts 510A, 510B, 510C and 510D. In general, the node hosts may differ in their resource capacities—e.g., the computing, storage, networking and/or memory resources of one host may differ from those of other hosts. For example, node host 510B has two storage devices 530B and 530C that can be used for DAG information, node host 510D has two storage devices 530E and 530F, while node hosts 510A and 510C have one storage device (530A and 530D respectively).

Host 510A comprises an acceptor node 522A of DAG 555A, and an intermediate node 522N of DAG 555C. Host 510B comprises an intermediate node 522B of DAG 555A, a committer node 522K of DAG 555B, and an intermediate node 522O of DAG 555C. Committer node 522C of DAG 555A and committer node 522P of DAG 555C may be implemented at host 510C. Finally, standby node 522C of DAG 555A, acceptor node 522J of DAG 555B, and acceptor node 522M of DAG 555C may be instantiated at host 510D. Thus, in general, a given host may be used for nodes of N different DAGs, and each DAG may utilize M different hosts, where M and N may be configurable parameters in at least some embodiments. Nodes of several DAGs established on behalf of respective application owners may be implemented on the same host in a multi-tenant fashion in at least some embodiments: e.g., it may not be apparent to a particular application owner that the resources being utilized for state management of their application are also being used for managing the state of other applications. In some provider network environments, a placement service may be implemented that selects the specific hosts to be used for a given node of a given application's replication DAG. Node hosts may be selected on the basis of various combinations of factors in different embodiments, such as the performance requirements of the application whose state is being managed, the available resource capacity at candidate hosts, load balancing needs, pricing considerations, and so on. In at least some implementations, instantiating multiple DAG nodes per host may help to increase the overall resource utilization levels at the hosts relative to the utilization levels that could be achieved if only a single DAG node were instantiated. For example, especially in embodiments in which a significant portion of the logic used for a DAG node is single-threaded, more of the processor cores of a multi-core host could be used in parallel in the multi-tenant scenario than in a single-tenant scenario, thereby increasing average CPU utilization of the host.

Methods for Implementing Dynamic DAG-Based State Replication

Figure 6:
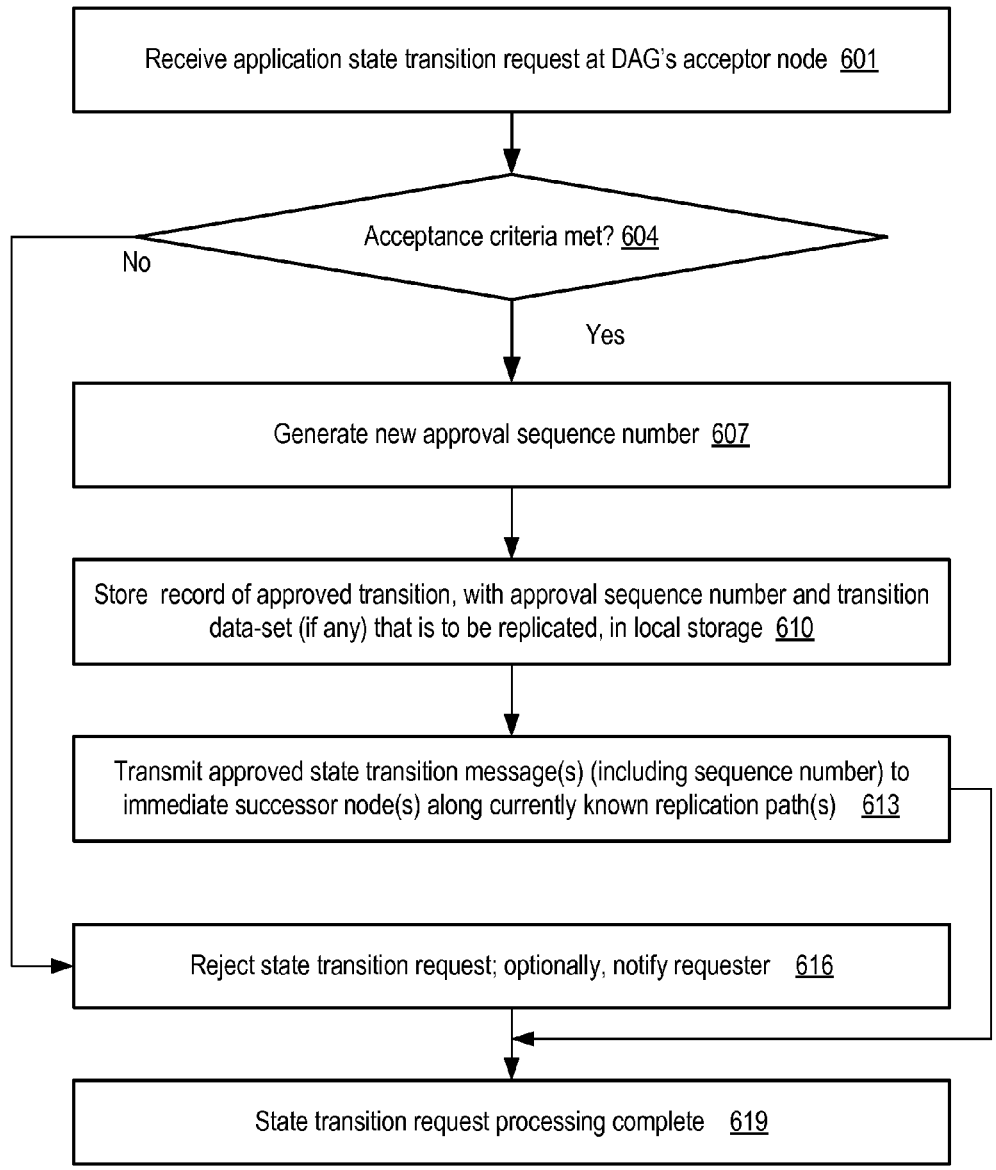
FIG. 6 is a flow diagram illustrating aspects of operations that may be performed at an acceptor node of a replication DAG in response to receiving a state transition request, according to at least some embodiments.

As discussed above, a given node of a replication DAG may be granted one of a number of roles (e.g., acceptor, intermediate, committer, or standby) in some embodiments at a given point in time. FIG. 6 is a flow diagram illustrating aspects of operations that may be performed at an acceptor node of a replication DAG in response to receiving a state transition request (STR), according to at least some embodiments. As shown in element 601, the acceptor node may receive a message comprising an STR for an application, e.g., from a client of a state replication service. The STR may comprise various elements in different embodiments, depending in part on the nature of the application. For example, in some embodiments as described below in greater detail, the DAG may be used for optimistic concurrency control for transactions directed at one or more data stores, and the STR may include data such as read sets and write sets that can be used to detect conflicts with previously-committed transactions. Each application whose state transitions are managed using a replication DAG may have its own set of acceptance criteria for requested state transitions, and at least in some cases the contents of the STR may be used to decide whether the transition should be accepted or rejected. In some implementations, operational conditions may also or instead be used for accepting/rejecting requested state transitions—e.g., if the workload level at the acceptor node or at other nodes of the DAG is at or above a threshold, the state transition may be rejected. If the transition meets the acceptance criteria (as detected in element 604), a new approval sequence number may be generated for the accepted STR (element 607), e.g., by incrementing a counter value or by obtaining some other monotonically increasing logical timestamp value. A record indicating that the transition was approved may be stored in local storage, together with the sequence number (element 610). For some applications, transition requests may include a data set (such as a write payload) to be replicated, the acceptor node may store the data set in local storage as well. In one implementation the acceptor node may comprise one or more processes running at a particular host of a provider network, and the a record of the transition's approval, the sequence number and the transition's data set may all be stored at a persistent disk-based storage device of the particular host. In some embodiments, the transition's data, an indication that the transition was approved, and the sequence number may all be combined into a single object stored at local storage, such as a log entry inserted into (or appended to) a log. In other embodiments, the transition's data set may be stored separately from the records indicating approval of the transition.

After the record of the state transition is safely stored, a state transition message indicating the approval may be transmitted to a neighbor node along a replication path of the DAG (element 613) towards a committer node. In some cases, depending on the topology of the DAG, multiple such messages may be sent, one to each neighbor node along the replication path. As described earlier, each node of the DAG may have its own view of the DAG configuration, which may not necessarily coincide with the views of the other nodes at a given point in time. The acceptor node may direct its approved state transition messages to the neighbor node(s) indicated in its current view of the DAG's configuration in the depicted embodiment, even if that current view happens to be obsolete or incorrect from the perspective of the DCM of the DAG (or from the perspective of one or more other DAG nodes). After the message(s) are sent, the state transition request's processing may be deemed complete at the acceptor node (element 619). If the requested transition does not meet the acceptance criteria of the application (as also detected in element 604), the transition may be rejected (element 616). In some implementations, a notification or response indicating the rejection may be provided to the requester.

Figure 7:
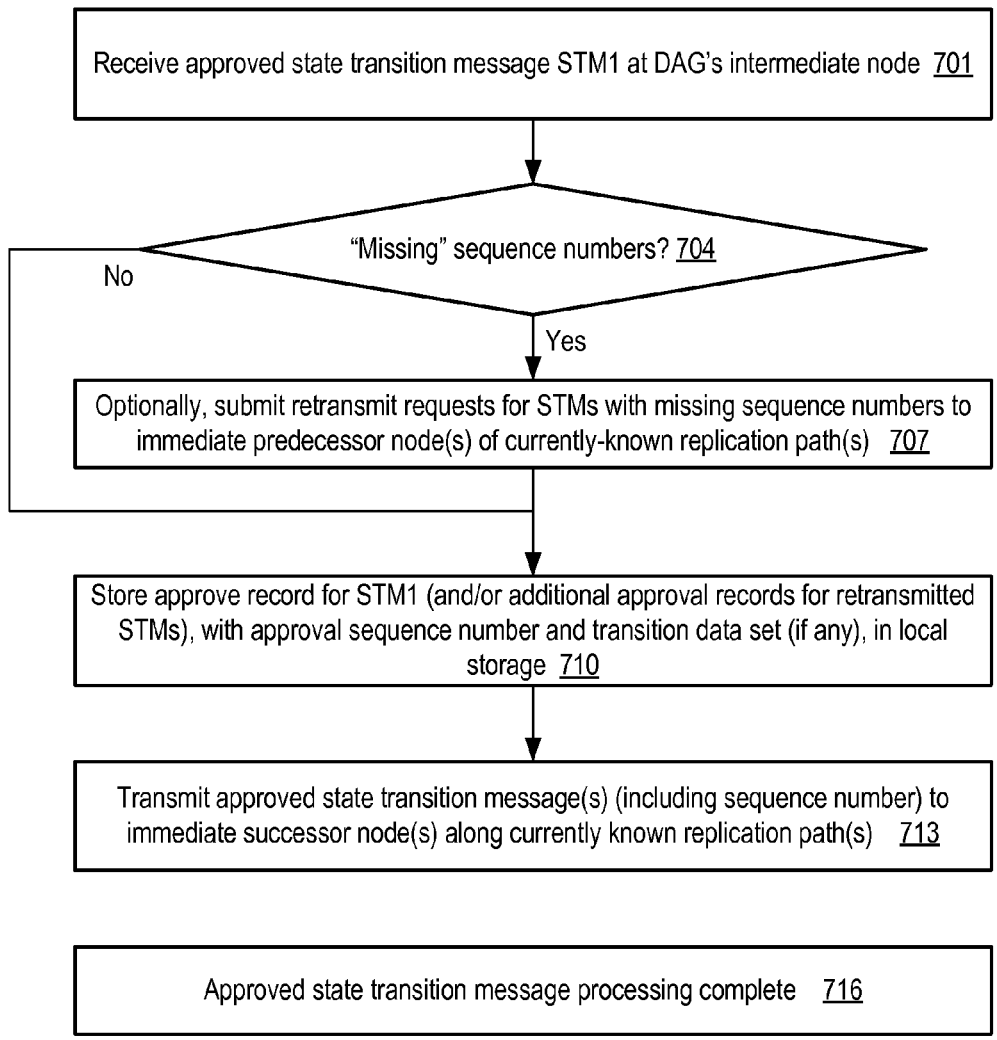
FIG. 7 is a flow diagram illustrating aspects of operations that may be performed at an intermediate node of a replication DAG in response to receiving an approved state transition message, according to at least some embodiments.

FIG. 7 is a flow diagram illustrating aspects of operations that may be performed at an intermediate node of a replication DAG in response to receiving an approved state transition message, according to at least some embodiments. After such a message STM1 is received (element 701), e.g., from an acceptor node or from another intermediate node, in some embodiments the intermediate node may determine whether state transition messages with lower sequence numbers are missing (e.g., if STM1 has a sequence number of SN1, whether one or more STMs with smaller sequence numbers than SN1 have not yet been received). If evidence of such missing state transition messages is found (element 704), the intermediate node may optionally submit a retransmit request for the missing STM(s) to immediate predecessor nodes along currently-known replication paths (element 707) in the depicted embodiment. In some implementations, the intermediate node may wait to receive responses to its retransmit request before storing a record of the approved state transition corresponding to STM1 in local storage. The approve record for STM1 may be stored, e.g., together with the approval sequence number and any data set (such as a write payload) associated with the transition (element 710). A state transition message (which may be similar in content to the message that was received, or identical in content to the message that was received) may then be sent to each neighbor node on the currently-known replication path(s) towards a committer node (element 713). In some implementations in which a state transition's approval history is included within state transition messages, the intermediate node may add its (the intermediate node's) identifier to the list of approvers indicated in the outgoing state transition message.

In some embodiments, instead of checking for missing sequence numbers before saving the approval record for STM1 in local storage, a different approach may be taken. For example, the intermediate node may check for missing sequence numbers after storing the approval record in local storage and/or after transmitting a corresponding STM towards the committer node.

In one implementation, a networking protocol such as TCP (the Transmission Control Protocol) that guarantees in-order delivery of messages within a given connection may be used in combination with a pull model for receiving STMs at non-acceptor nodes. In such an implementation, as long as an intermediate node, committer node or standby node maintains a network connection with its immediate predecessor along a replication path, the networking protocol may be relied upon to ensure that no messages are lost. If, at a given DAG node N1, the connection to the immediate predecessor node P1 is lost in such an implementation, N1 may be responsible for establishing a new connection to P1 (or to a different predecessor node if a configuration-delta message has been received indicating that P1 is no longer part of the DAG), and requesting P1 to send any STMs with sequence numbers higher than the previously highest-received sequence number.

Figure 8:
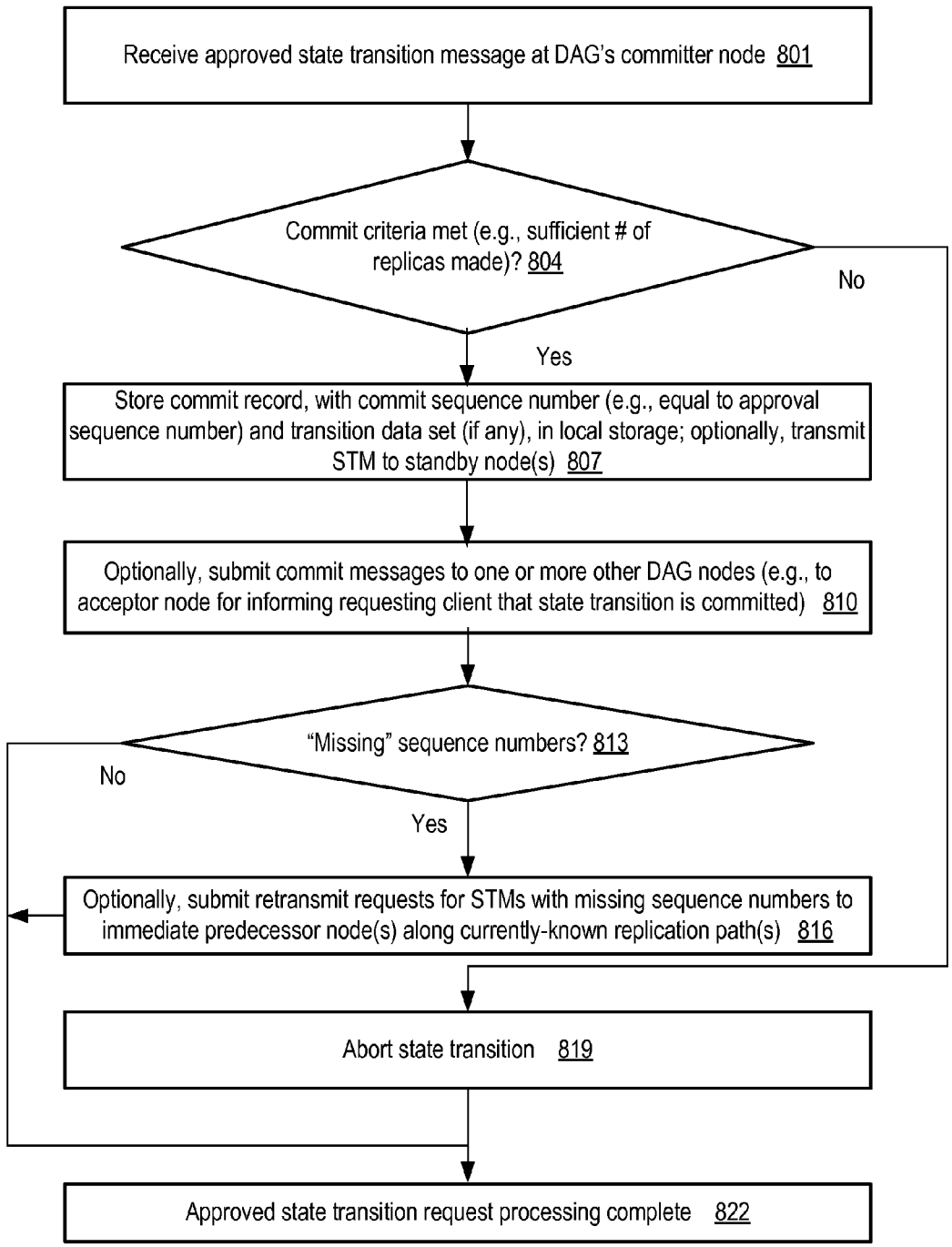
FIG. 8 is a flow diagram illustrating aspects of operations that may be performed at a committer node of a replication DAG in response to receiving an approved state transition message, according to at least some embodiments.

FIG. 8 is a flow diagram illustrating aspects of operations that may be performed at a committer node of a replication DAG in response to receiving an approved state transition message, according to at least some embodiments. Upon receiving an approved state transition message (element 801), e.g., from an intermediate node or from an acceptor node, the committer node may determine whether the state transition meets the application's commit criteria. In some embodiments, the committer node may be able to determine, from the contents of the STM (such as an approval history field), the number of replicas of application state records that have been saved thus far, and the transition may be deemed committable if the number of replicas exceeds a threshold. The replica count thresholds may differ based on the application; for example, a single replica at the acceptor node may be sufficient for some applications. In other embodiments, the committer node may also have to consider other factors before committing the transition, such as whether the committer node has already received all the STMs with lower sequence numbers than the current STM's sequence number. In one embodiment, for example, the committer node may have to wait until it receives and processes all such prior STMs before committing the current transition.

If the commit criteria (which may differ from application to application) are met (as detected in element 804), the committer node may store a commit record within its collection of application state records in local storage (element 807), e.g., together with the sequence number and the transition's data set (if any). In some implementations, the commit criteria may default to the acceptance criteria that have already been verified at the acceptor node—that is, once the state transition has been approved at an acceptor node, the committer node may commit the state transition indicated in a received STM without having to verify any additional conditions. In some embodiments, a copy of the approval sequence number indicated in the STM may be stored as the commit sequence number. Since some approved transitions may not get committed, in at least one embodiment a different set of sequence numbers may be used for commits than is used for approvals (e.g., so that the sequence of commit sequence numbers does not have any gaps). If standby nodes are configured for the DAG, post-commit STMs may be directed to one or more such standby nodes from the committer node. In at least some embodiments, after the transition is committed, a notification of the commit may be provided to one or more other nodes of the DAG (element 810), e.g., to enable the other nodes to update their application state information and/or for transmitting a response to the state transition's requesting client indicating that the transition has been committed.

In some embodiments in which missing STMs were not handled as part of the processing related to commit criteria, the committer node may take similar actions as were indicated in FIG. 7 with respect to missing STMs. Thus, for example, if the committer node determines that one or more STMs are missing (with lower sequence numbers than the sequence number of the received STM) (element 813), a retransmit request for the missing STMs may be sent to the immediate predecessor node(s) (element 816) to complete processing of the received STM (element 822). If the commit criteria were not met, the committer node may abort the state transition (element 819). In some embodiments, an abort notification may be sent to one or more other nodes of the DAG, and/or to the client that requested the state transition. In some implementations, as mentioned above, if a state transition has been approved at an acceptor node, the replication DAG may be responsible for (eventually) committing the state transition even if one or more nodes of the replication pathway (including the acceptor node itself) fail. Aborting a state transition may require a relatively heavyweight change in some such implementations, such as the removal of approval records of the transition from other DAG nodes (or the actual removal from the DAG of the nodes at which approval records happen to be stored). As described below in further detail with respect to FIG. 11a-FIG. 14, a preemptive coordinated DAG suspension technique may be used in some embodiments to avoid scenarios in which STMs reach committer nodes without the corresponding state transition information having been replicated at a desired number of DAG nodes.

Figure 9:
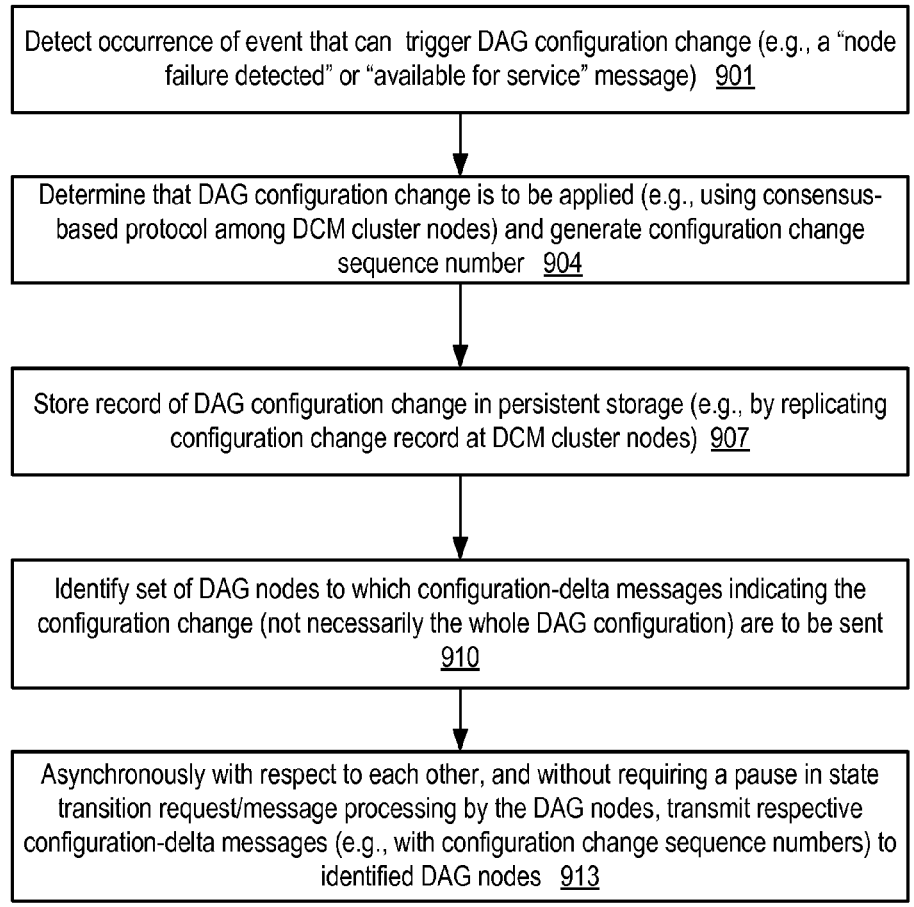
FIG. 9 is a flow diagram illustrating aspects of operations that may be performed at a configuration manager of a replication DAG, according to at least some embodiments.

FIG. 9 is a flow diagram illustrating aspects of operations that may be performed at a configuration manager (DCM) of a replication DAG, according to at least some embodiments. As shown in element 901, an event that can potentially trigger a configuration change at a DAG may be detected by the configuration manager. Such an event may include receiving a message such as "node failure detected" (e.g., from a DAG node, or from a health management component of a provider network) or "available for service" (e.g., from a DAG node that has restarted after a failure). In some embodiments the configuration manager itself may be responsible for monitoring the health status of various DAG nodes, and the triggering event may be a detection by the configuration manager that one of the nodes has not responded in a timely fashion to some number of heartbeat messages or other health checks. In at least some embodiments, the DAG nodes may be responsible for reporting any apparent node failures (e.g., when a connection is unexpectedly dropped, or when no message is received from a neighbor node for a time period greater than a threshold) to the DCM. A DAG node may also be responsible for notifying the DCM of impending changes (such as when the node is scheduled to go off-line for maintenance) that may lead to DAG configuration changes in some embodiments. The DCM may determine whether the indicated configuration change (e.g., a removal of a failed node, or the joining of a new node) is to be made effective (element 904) in the depicted embodiment, e.g., based on a consensus protocol that may be implemented among a plurality of nodes of a DCM cluster. For example, in some implementations, a determination by one DCM node that a DAG node has failed may have to be confirmed at one or more other nodes of the cluster (e.g., by reviewing heartbeat responses received from the DAG node at other DCM nodes) before the node is removed from the configuration. In other implementations, the decision as to whether to apply a possible configuration change may be performed without utilizing a consensus-based protocol. A sequence number or logical timestamp associated with the DAG configuration change may be determined or generated in some embodiments, e.g., for inclusion in configuration-delta messages sent to other nodes of the DAG so that the configuration changes can be processed in the correct order at the DAG nodes.

Independently of how the configuration change is approved, in some embodiments a representation of the configuration change may have to be replicated at multiple storage locations of the DCM before the change is considered complete (element 907). Saving information about the configuration change in multiple locations may be an important aspect of the DCM's functionality in embodiments in which the DCM is to serve as the authoritative source of DAG configuration information. In at least some implementations, only the change to the configuration (rather than, for example, the entire configuration) may be replicated. After the configuration change information has been saved, a set of DAG nodes to which corresponding configuration-delta messages (indicating the just-implemented change to the configuration, not necessarily the whole configuration of the DAG) are to be sent from the DCM may be identified (element 910). In some embodiments, all the DAG members (potentially including a node that is being removed from the DAG as part of the configuration change indicated in the configuration-delta message) may be selected as destinations for the configuration-delta messages. In one embodiment, only the nodes that are assumed to be current DAG members may be selected, e.g., the configuration-delta message may not be sent to a node if it is being removed or is known to have failed. In other embodiments, some subset of the members may be selected as destinations, and that subset may be responsible for propagating the configuration changes to the remaining nodes. In embodiments in which a subset of members are selected as destinations, the DCM may have to keep track of which changes have been propagated to which members at any given time. After the destination set of DAG nodes have been identified, respective configuration-delta messages may be sent to them asynchronously with respect to each other, and without requesting any pause in state transition message processing or state transition request processing (element 913). In at least some embodiments, the configuration-delta messages may include the configuration sequence number associated with the configuration change. In some implementations, a composite configuration-delta message may indicate two or more changes (e.g., a removal of a failed node and a joining of a replacement node).

Figure 10:
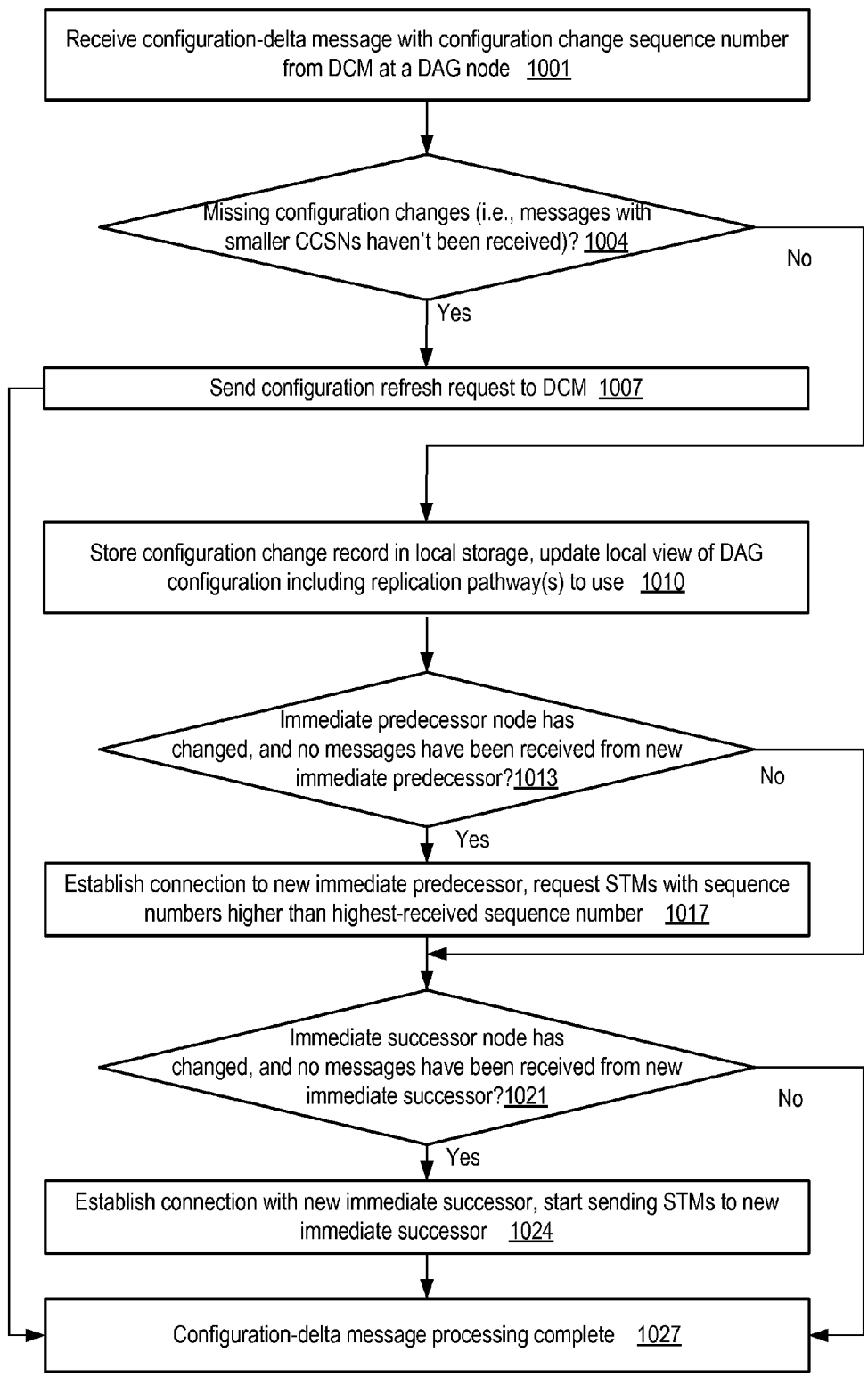
FIG. 10 is a flow diagram illustrating aspects of operations that may be performed at a member node of a replication DAG in response to receiving a configuration-delta message from a configuration manager, according to at least some embodiments.

FIG. 10 is a flow diagram illustrating aspects of operations that may be performed at a member node of a replication DAG in response to receiving a configuration-delta message from a configuration manager, according to at least some embodiments. Upon receiving such a configuration-delta message comprising a configuration change sequence number from the DCM (element 1001), the recipient DAG node may determine whether it has missed any prior configuration-delta messages in the depicted embodiment, e.g., by comparing the newly-received sequence number with the highest sequence number received previously. If the recipient determines that one or more configuration-delta messages have not yet been received (element 1004), it may send a configuration refresh request to the DCM (element 1007). Such a refresh request may result in the DCM re-sending the missed configuration-delta message or messages, for example, or in sending a different type of message in which the entire current configuration of the DAG is indicated.

If missing configuration-delta messages are not detected (also in operations corresponding to element 1004), the recipient node may store the received configuration change information in a configuration change repository in local storage. The accumulated messages in the repository may be used to update the recipient's view of the DAG configuration (element 1010). Updating the local view of the DAG configuration may include, for example, determining one or more DAG nodes and/or edges of the replication pathway or pathways to be used for future outgoing and incoming state transition messages. As mentioned earlier, because of the asynchronous nature of message delivery and because different parts of a network may experience different delays, the sequence in which configuration-delta messages are obtained at one DAG node may differ from the sequence in which the same set of configuration-delta messages are received at another node. Accordingly, the replication pathways identified at two different nodes at a given point in time may differ from each other. In the depicted embodiment, the recipient node may take further actions if either its immediate predecessor node on a replication path has changed, or if its immediate successor has changed. If neither the immediate successor nor the immediate predecessor node changes, the processing of the configuration-delta message may end after the configuration change information is stored at local storage of the recipient node (element 1027) in some embodiments.

An example of a scenario in which an immediate predecessor node is changed with respect to a node C of a DAG is the change of a portion of a replication path from A-to-B-to-C to A-to-C. If the updated configuration involves a change to an immediate predecessor node of the recipient, and no messages have yet been received directly from the new immediate predecessor node (as detected in element 1013), the recipient node (node C in the current example) may establish a connection to the new immediate predecessor (node A in the current example). In addition, in at least some embodiments, the recipient node (e.g., node C) may also send a request to the new immediate predecessor (e.g., node A) for retransmission of STMs with sequence numbers higher than the most recently-received sequence number at the recipient node (element 1017). If node C has a successor node, it may continue to transmit any pending state transition messages to such a successor node while node C waits to receive the requested retransmissions from node A.

If the configuration-delta message indicates that the immediate successor node of the recipient has changed, (e.g., when mode A receives the same example configuration-delta message discussed above, indicating that node B has left the DAG), and no message has yet been received from the new immediate successor node (element 1021), the recipient node may establish a connection to the new successor node. In the above example, node A may establish a connection to node C, its new immediate successor. State transition messages may subsequently be transferred to the new immediate successor (element 1024).

Coordinated Suspension of Replication DAG Nodes

For provider network operators, large scale failure events that can cause near-simultaneous outages of a large number of applications present a significant challenge. Customers whose applications are affected by sustained outages may lose faith in the ability of the provider networks to provide the levels of service needed for critical applications. Although the probability of large scale failure events can be lowered by intelligent infrastructure design and by implementing application architectures that can take advantage of high-availability features of the infrastructure, it may be impossible to eliminate large scale failures entirely. Techniques that can allow distributed applications to recover more quickly and cleanly from failures that affect multiple resources may therefore be developed in at least some embodiments. In some environments in which replication DAGs of the type described above are employed for distributed application state management, a coordinated suspension protocol may be used to support more effective and efficient recovery from distributed failures. In one embodiment, for example, in response to a detection of a failure scenario, some number of nodes of a DAG may be directed by the configuration manager to stop performing their normal application state transition processing operations (e.g., receiving state transition request messages, storing local copies of application state information, and transmitting state transition request messages along their replication pathway(s)). After suspending their operations, the nodes may synchronize their local application state records with other DAG nodes in at least some embodiments, perform a clean shutdown and restart. After a node restarts, it may report back to the configuration manager that it is available for resumption of service, and await re-activation of the DAG by the configuration manager.

FIG. 11*a*-11*h* collectively illustrate an example sequence of operations that may be performed at a replication DAG during such a coordinated suspension procedure, according to at least some embodiments. Each node in the illustrated DAG may store a respective set of commit records, in which each commit record includes (or indicates, e.g., via a pointer) a corresponding commit sequence number (CSN). From the perspective of the node, the local commit record set may thus represent the state of an application being managed using the DAG. Records of approved (but not yet committed) state transitions may also be kept at some or all of the nodes, as described earlier. It is noted that although the coordinated suspension technique is described herein in the context of dynamic replication DAGs in which the DCM transmits configuration-delta messages as described above to keep the DAG nodes updated regarding DAG configuration changes, a similar approach may be employed for other state replication techniques in some embodiments. For example, the coordinated suspension technique may also be used in an environment in which configuration changes to a group of replication nodes are implemented using a stop-the-world reconfiguration interval during which all the nodes are updated in a synchronized fashion, such that the replication group becomes operational only after all the nodes have been made aware of the new configuration. Thus, dynamic replication DAGs may represent just one example of multi-node state replication groups (SRGs) at which the coordinated suspension technique may be implemented in different embodiments. At least some such SRGs may have their own configuration managers analogous to the DCMs described earlier, and may have some nodes designated as committer nodes and other nodes designated as non-committer nodes.

Figure 11A:
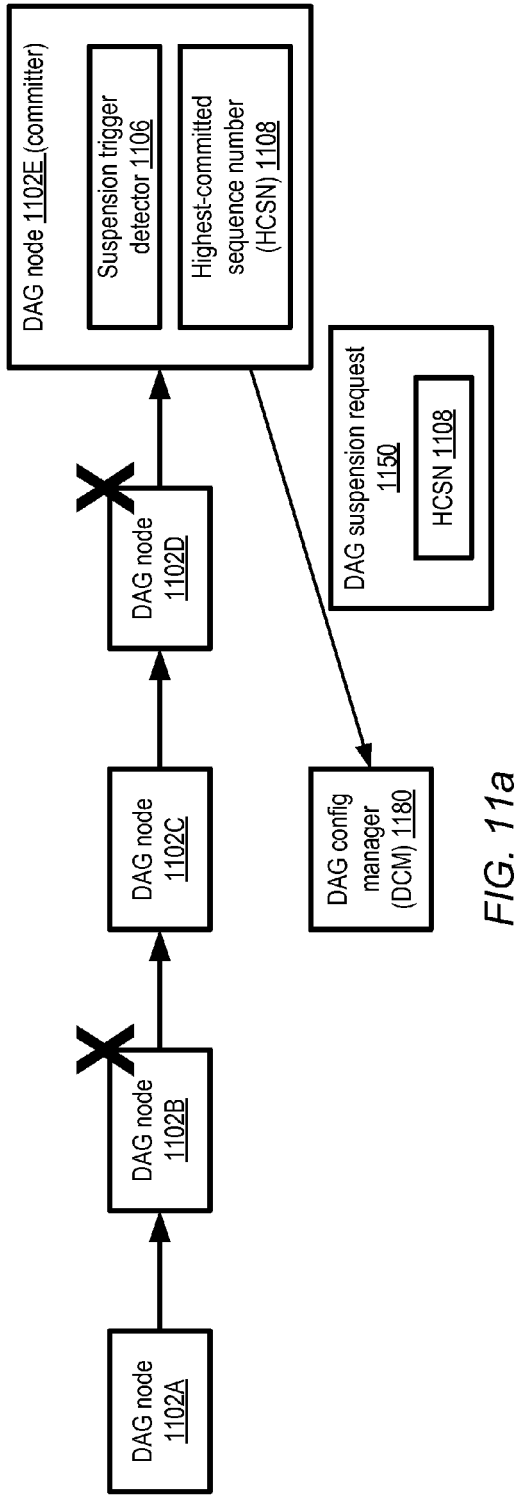

A replication DAG comprising five nodes 1102A, 1102B, 1102C, 1102D and 1102E is shown in FIG. 11*a*, together with a DCM 1180. In the depicted example, committer node 1102E comprises a suspension trigger detector 1106 which determines that a coordinated suspension procedure should be initiated for the DAG. A number of different types of causes may lead to the initiation of the suspension procedure in different embodiments. For example, the suspension procedure may be initiated (a) because some threshold number of nodes may have failed (such as failures at nodes 1102B and 1102D, indicated by the "X" symbols), (b) because the rate at which configuration-delta messages are being received at the committer node (or at some other node) exceeds a threshold, (c) because the rate at which network packets or connections are being dropped at some DAG node or the DCM exceeds a threshold, and so on. The committer node 1102E in the depicted embodiment sends a DAG suspension request 1150 comprising the highest sequence number among the sequence numbers represented in the committer node's commit record set. This highest sequence number may be referred to as the highest committed sequence number (HCSN) 1108 herein, and may be used as a reference for synchronizing commit record sets among the DAG nodes during one of the steps of the suspension procedure as described below. In some embodiments, the initial determination that a suspension should be initiated may be made at one of the non-committer nodes, or at the DCM 1180 itself, and a particular commit sequence number (ideally but not necessarily the HCSN) may be chosen as the target sequence number up to which the nodes should update their commit record sets.

Figure 11B:
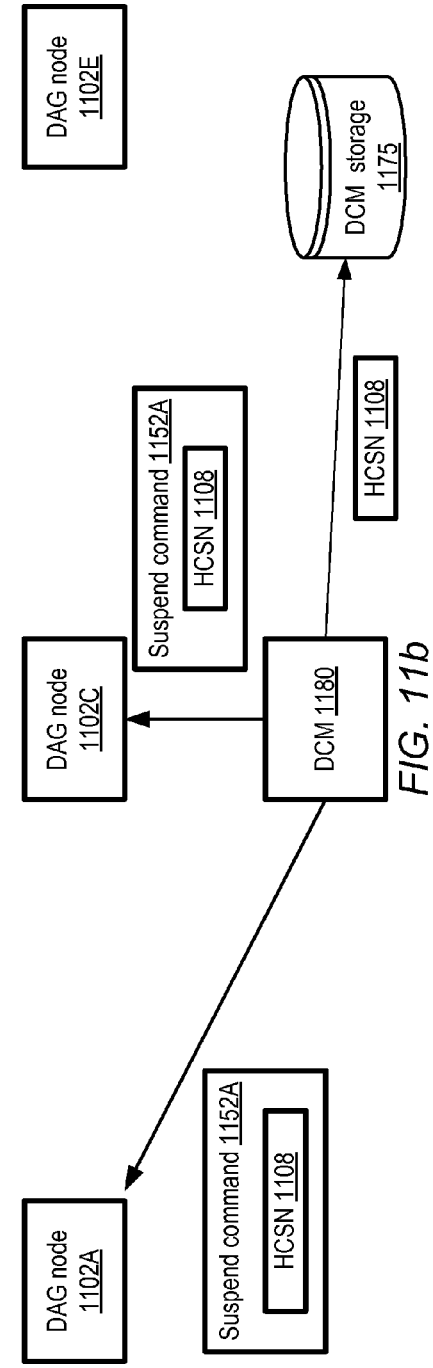

In response to receiving the suspension request, the DCM 1180 may save the HCSN in persistent storage 1175, as shown in FIG. 11*b*. The DCM may then send respective suspend commands 1152 to at least a subset of the DAG nodes, such as commands 1152A and 1152B to nodes 1102A and 1102C respectively in the depicted example scenario. In some embodiments, the DCM 1180 may send suspend commands to all the DAG nodes that are members of the DAG according to the latest DAG configuration saved at the DCM (including the nodes that may have failed, such as 1102B and 1102D). The suspend commands may include the HCSN 1108.

Figure 11C:
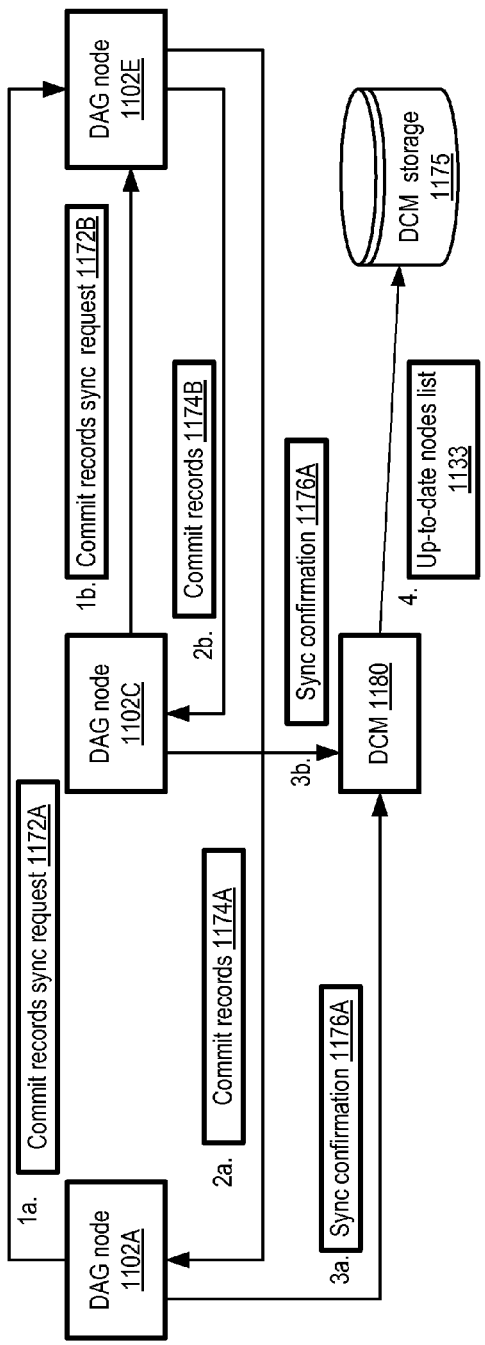

Upon receiving a suspend command, a DAG node may stop processing state transition requests/messages, and may instead begin a process to verify that its commit record set includes all the commit records up to and including the commit record corresponding to the HSCN. It may be the case, for example, that node 1102A and node 1102C may not yet have been notified by the committer node 1102E regarding one or more committed state transitions with sequence numbers less than or equal to the HCSN. In such a scenario, as shown in FIG. 11*c*, node 1102A may send a commit records sync request 1172B to committer node 1102E (as indicated by the arrow labeled "1*a*") and node 1102C may send a similar commit records sync request 1172B to node 1102E (as indicated by the arrow labeled "1b"). The commit records sync requests 1172 may respectively include an indication of which commit records are missing at the nodes from which the requests are sent—e.g., node 1102A may indicate that it already has commit records with sequence numbers up to SN1, while node 1102C may indicate that it is missing commit records with sequence numbers SN2, SN3, and SN4. The missing commit records 1174A and 1174B may then be sent to the nodes 1102A and 1102C respectively by the committer node, as indicated by the arrows labeled "2a" and "2b". Nodes 1102A and 1102C may then send respective synchronization confirmations 1176A and 1176B to the DCM 1180, as indicated by the arrows labeled "3a" and "3b". The DCM 1180 may add nodes 1102A and 1102C to a list of up-to-date nodes 1133 (i.e., nodes that have updated their commit record sets to match the commit record set of the committer node 1102E) maintained at the DCM's persistent storage 1175, as indicated by the arrow labeled "4".

Figure 11D:
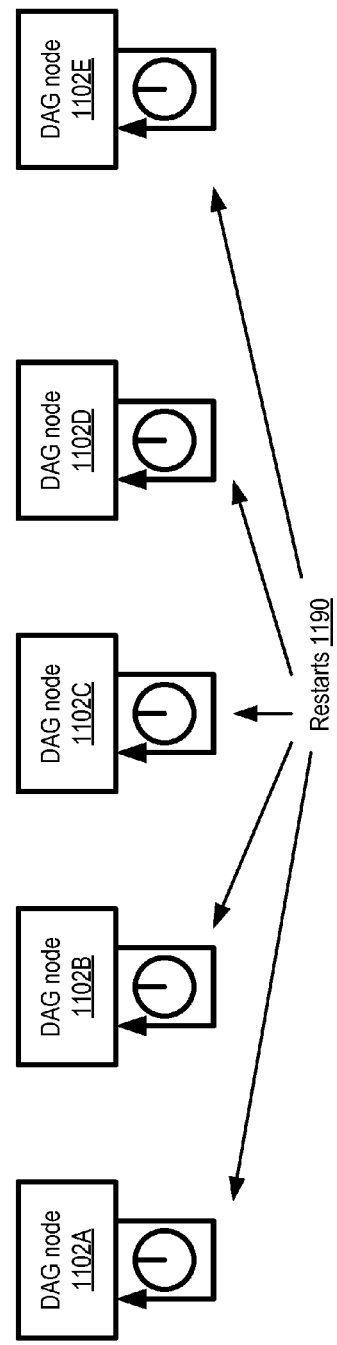

As shown in FIG. 11*d*, the nodes of the DAG may terminate execution and restart themselves in the depicted embodiment. The failed nodes 1102B and 1102D may restart as part of recovery from their failures, for example. As part of the coordinated suspension procedure, nodes 1102A and 1102C may save their commit record sets (and/or additional metadata pertaining to the operations of the nodes) in local storage after their commit record sets have been synchronized with that of the committer node, and then initiate a controlled restart. Node 1102E may wait for some time interval after it has sent the suspension request 1150 (allowing the committer node to respond to at least some sync requests 1172), save any state metadata to local storage, and then initiate its own controlled restart as part of the suspension procedure in the depicted embodiment.

After the DAG nodes 1102A-1102E come back online, they may each send a respective "available for service" message to the DCM 1180 in some embodiments, as shown in FIG. 11*e*, and await re-activation instructions to resume their application state transition processing operations. The DCM may be able to tell (using its up-to-date nodes list 1133) that the commit record sets of nodes 1102B and 1102D may not be up-to-date, and may accordingly send respective synchronization commands 1194 to nodes 1102B and 1102D, as shown in FIG. 11*f*. In at least some implementations the synchronization commands may indicate the HCSN 1108. In response to the synchronization commands 1194, nodes 1102B and 1102D may each send their own commit records sync requests 1172C and 1172D to nodes that are known to be up-to-date, indicating which commit records are missing in their respective commit record sets. For example, node 1102B may send its sync request 1172C to node 1102A, while node 1102D may send its sync request to node 1102E. In some embodiments, the DCM may specify the destination nodes to which the commit records sync requests should be sent. In one embodiment, all the non-committer DAG nodes may have to synchronize their commit record sets with the committer node. Nodes 1102B and 1102D may receive their missing commit records 1174C and 1174D respectively, so that eventually all the nodes have synchronized their commit record sets up to the HCSN. In some implementations, nodes 1102B and 1102D may send a confirmation to the DCM 1180 indicating that their commit record sets have been updated/synchronized. In at least one embodiment, the DCM may play a somewhat more passive role with respect to those nodes that are not in its up-to-date nodes list than described above with respect to FIG. 11*f*. In such an embodiment, when a failed node (such as 1102B or 1102D) comes back online, it sends a message to the DCM to determine whether the newly-online node is missing any commit records. The DCM may inform the node (e.g., by simply indicating the HCSN) that commit records with sequence numbers up to the HCSN are required for the node to become up-to-date. The node may then be responsible for bringing itself up-to-date and reporting back to the DCM once it has synchronized its commit records up to the HCSN. Thus, in such an embodiment, the DCM may not necessarily send a synchronization command 1194; instead, the newly-online nodes may take the initiative to synchronize their commit record sets.

After confirming that at least a threshold number of the nodes have updated commit record sets, the DCM 1180 may determine the configuration of the post-restart DAG. In some cases, the same configuration that was in use prior to the suspension may be re-used, while in other embodiments a different configuration may be selected. For example, it may be the case that the DAG is required to have a minimum of four nodes, so only four of the nodes 1102A-1102E may be selected initially. As shown in FIG. 11*g*, the DCM 1180 may send respective re-activation messages to the selected set of nodes (all five nodes in the depicted example), indicating the current configuration of the DAG. The DAG nodes may then resume normal operations, as indicated by FIG. 11*h*. In some embodiments, at least some of the DAG nodes that did not fail (e.g., 1102A, 1102C and 1102E) may not necessarily restart themselves. Instead, after synchronizing their commit record sets, one or more of such nodes may simply defer further state transition processing until they receive a re-activation command from the DCM in such embodiments.

Figure 12:
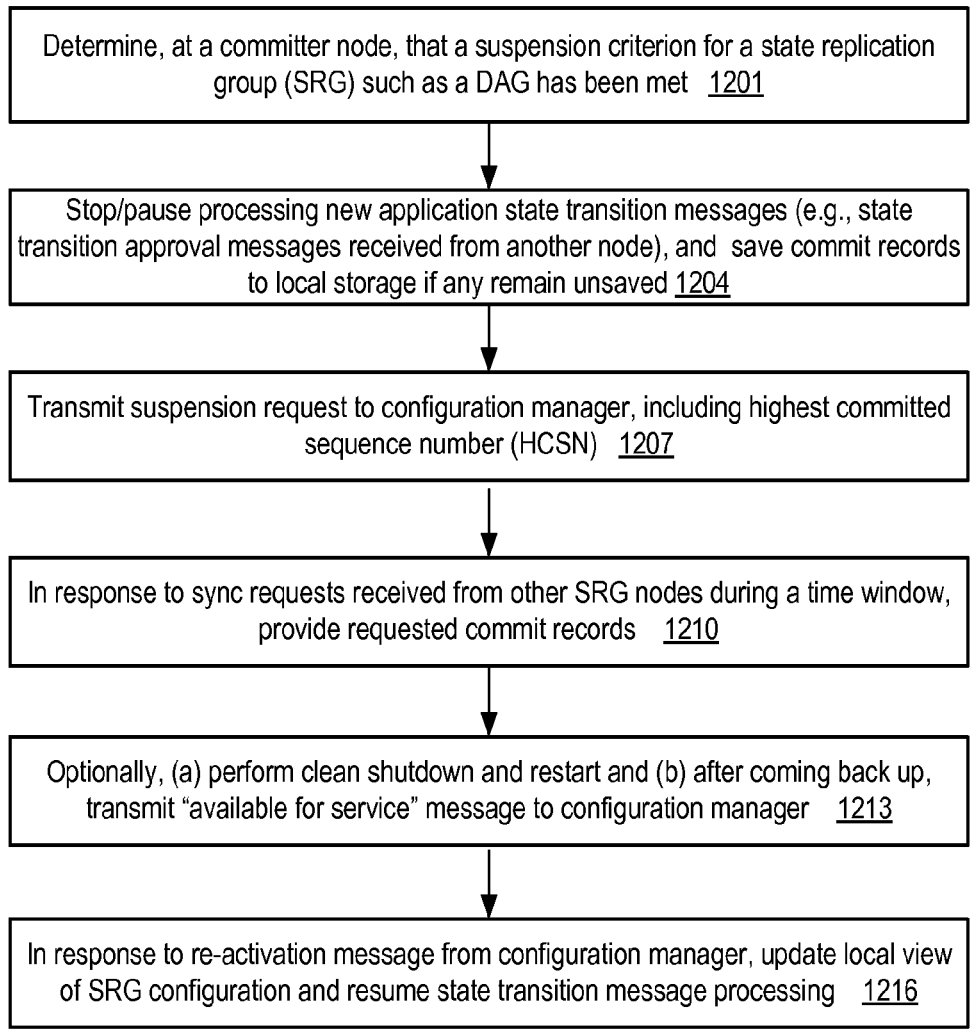
FIG. 12 is a flow diagram illustrating aspects of operations that may be performed at a committer node of a state replication group such as a replication DAG during a coordinated suspension procedure, according to at least some embodiments.

FIG. 12 is a flow diagram illustrating aspects of operations that may be performed at a committer node of an SRG such as a replication DAG during a coordinated suspension procedure, according to at least some embodiments. As shown in element 1201, the committer node may determine that a triggering criterion for a coordinated suspension of the SRG has been met. A variety of different triggering conditions may lead to a coordinated suspension, including, for example, a detection by the committer node that the number of SRG nodes that remain responsive has fallen below a threshold, or that the rate at which the SRG's configuration changes are occurring exceeds a threshold. In some cases resource workload levels or error rates may trigger the suspension—e.g., if the rate at which network packets are dropped exceeds a threshold, or if connections are being unexpectedly terminated at or above a maximum acceptable rate. In one embodiment, a non-committer node of the SRG, or a configuration manager such as the DCM, may initially detect a problem that should lead to a controlled suspension, and may inform the committer node about the problem.

After determining that controlled suspension is to be initiated, the committer node may pause or stop its normal processing/replication of state transition messages, and save any outstanding as-yet-unsaved commit records to local storage (element 1204) in the depicted embodiment. The committer node may then transmit a suspension request, including an indication of the HCSN (the highest-committed sequence number among the sequence numbers of transitions for which commit records have been stored by the committer node), to the SRG's configuration manager (e.g., the DCM in the case of a replication DAG) (element 1207). The HCSN may serve as the target commit sequence number up to which currently active nodes of the SRG are to synchronize their commit record sets.

In at least some embodiments, after it sends the suspension request, the committer node may receive some number of commit record sync requests from other SRG nodes (e.g., nodes that have determined that they do not have a full set of commit records with sequence numbers up to the HCSN) (element 1210). In the depicted embodiment, the committer node respond to any such sync requests that are received during a configurable time window. The committer node may then optionally perform a clean shutdown and restart and send an available-for-service message to the configuration manager of the SRG (element 1213). In some embodiments, the clean shutdown and restart may be omitted, and the committer node may simply send an available-for service message, or the committer node may simply defer further state transition-related processing until re-activation instructions are received from the configuration manager. Eventually, the committer node may receive a re-activation message from the configuration manager, indicating the current post-suspension configuration of the DAG, and the committer node may then resume state transition related processing (element 1216) as per the indicated configuration. In some embodiments, it may be the case that in the new, post-suspension configuration, the committer node is no longer granted the role of committer; instead, it may be configured as an acceptor node, an intermediary node or a standby node, for example.

Figure 13:
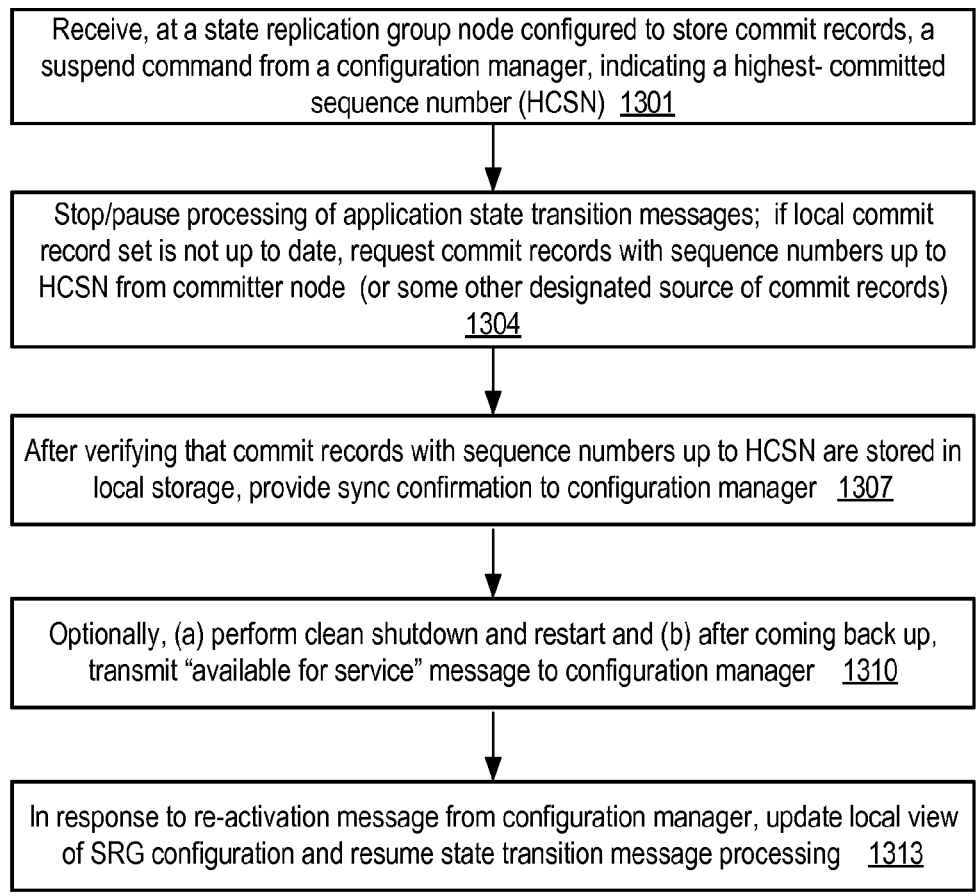
FIG. 13 is a flow diagram illustrating aspects of operations that may be performed at a non-committer node of a state replication group such as a replication DAG during a coordinated suspension procedure, according to at least some embodiments.

FIG. 13 is a flow diagram illustrating aspects of operations that may be performed at a non-committer node of a state replication group such as a replication DAG during a coordinated suspension procedure, according to at least some embodiments. During normal operations, the non-committer node may store commit records in local storage at some point after the corresponding transitions have been committed; as a result, the local commit record set of the non-committer node may not necessarily be as current as that of the committer node. As shown in element 1301, the non-committer node may receive a suspend command from the configuration manager, indicating an HCSN as the target sequence number to which the non-committer node should synchronize its local commit record set.

Upon receiving the suspend command, the non-committer node may pause or stop processing new state transition messages. If some commit records with lower sequence numbers than the HCSN are missing from the local commit record set, the non-committer node may send a commit record sync request for the missing records to the committer node (or to a different node indicated by the configuration manager as a source for missing commit records) (element 1304). If its commit record set is already up-to-date with respect to the HCSN, the non-committer node may not need to communicate with other nodes at this stage of the suspension procedure. After verifying that commit records with sequence numbers up to the HCSN are stored in local storage, the non-committer node may send a sync confirmation message to the configuration manager (element 1307) in the depicted embodiment. The non-committer node may then defer further application state transition processing until it is re-activated by the configuration manager. Optionally, the non-committer node may perform a clean shutdown and restart, and send an "available-for-service" message to the configuration manager after restarting (element 1310). In response to a re-activation message from the configuration manager, the non-committer node may update its view of the SRG configuration and resume application state transition processing (element 1313). In the post-suspension configuration, a different role may be granted to the non-committer node by the configuration manager in some cases—e.g., the non-committer node's role may be changed to a committer node.

Figure 14:
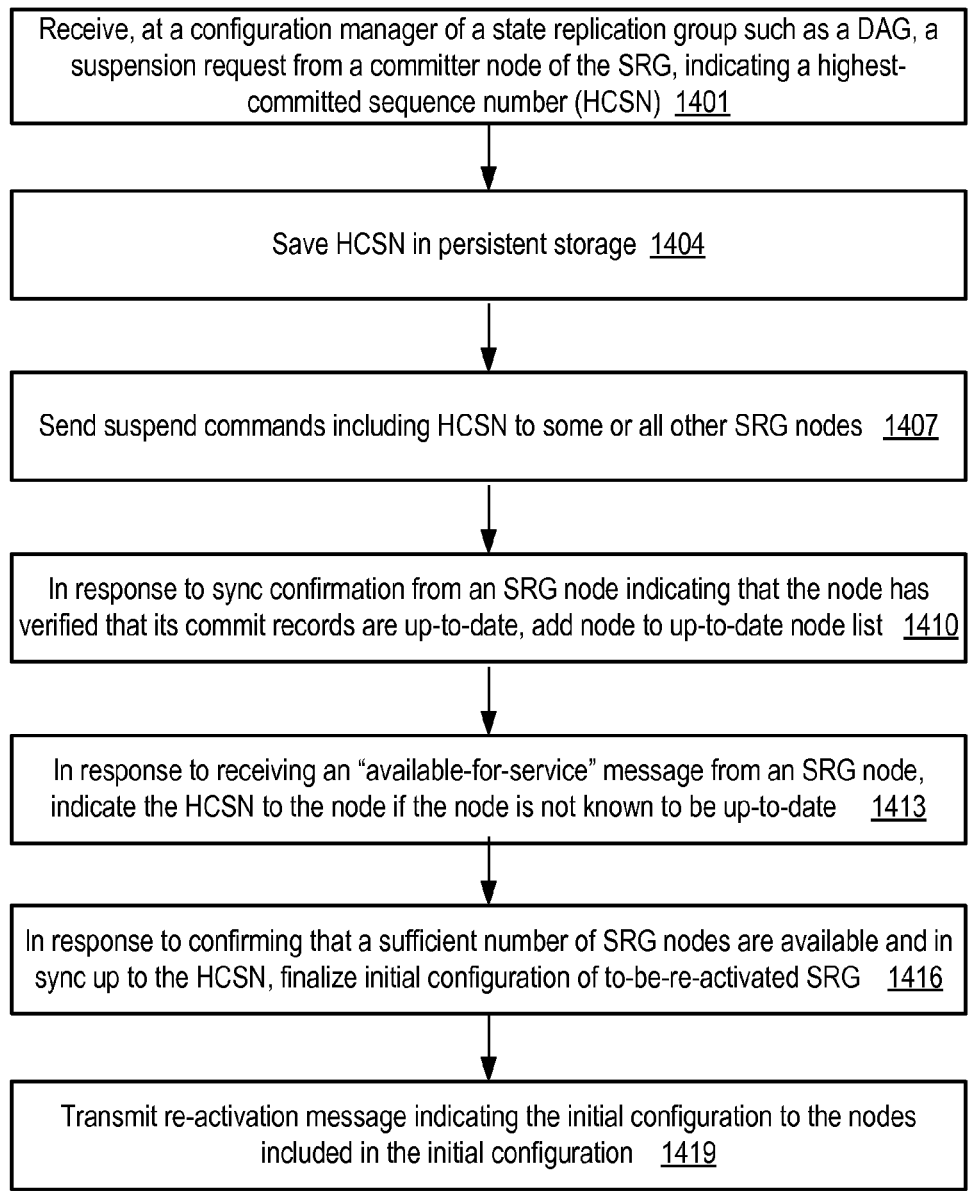
FIG. 14 is a flow diagram illustrating aspects of operations that may be performed at a configuration manager of a state replication group such as a replication DAG during a coordinated suspension procedure, according to at least some embodiments.

FIG. 14 is a flow diagram illustrating aspects of operations that may be performed at a configuration manager of a state replication group such as a replication DAG during a coordinated suspension procedure, according to at least some embodiments. As shown in element 1401, the configuration manager may receive a suspension request from a committer node of the SRG, indicating a highest-committed sequence number (HCSN) from among the sequence numbers of transitions whose commit records are stored at the committer node. In some embodiments, a consensus protocol may be employed among the various nodes of the configuration manager before the decision to suspend the SRG operations is made final. The configuration manager may store the HCSN in persistent storage (element 1404) (e.g., at respective storage devices at several nodes of a configuration manager cluster), and send suspend commands indicating the HCSN to one or more other nodes of the SRG (element 1407). In some embodiments, the suspend commands may be sent to all the known members of the SRG, including nodes that are assumed to have failed. The recipient nodes of the SRG may each verify that their local commit record sets contain commit records corresponding to the HCSN (which may in some cases require the recipient nodes to obtain missing commit records from the committer node as described above). After verifying that its commit record set is current with respect to the HCSN, a recipient of the suspend command may send the configuration manager a sync confirmation indicating that its commit record set is now up-to-date. Accordingly, upon receiving such a confirmation from an SRG node, the configuration manager may add that node to a list of up-to-date nodes (element 1410).

In some embodiments, the configuration manager may wait to receive respective messages from the SRG nodes indicating that they are available for service. Upon receiving such a message from a node (e.g., after the node has completed a clean shutdown and restart, or after the node has come back online after a failure), the configuration manager may determine whether the node is in the up-to-date nodes list or not. If the node from which the "available-for-service" indication is received is not known to be up-to-date with respect to commit records, the configuration manager may send indicate the HCSN to the node (element 1413), e.g., in an explicit synchronization command or in response to an implicit or explicit query from the node. Using the HCSN as the target sequence number up to which commit records are to be updated, the node may then update its local commit record set by communicating with other nodes that are already up-to-date. In some embodiments, the configuration manager may include, in the synchronization command, an indication of the source from which an out-of-date node should obtain missing commit records.

After the configuration manager has confirmed that a required minimum number of SRG nodes are (a) available for service and (b) up-to-date with respect to application commit state, the configuration manager may finalize the initial post-suspension configuration of the SRG (element 1416). The configuration manager may then send re-activation messages indicating the configuration to the appropriate set of nodes that are in the initial configuration (element 1419). In some embodiments, the initial configuration information may be provided to the nodes as a sequence of configuration-delta messages.

In at least some embodiments, the target sequence number selected for synchronization (i.e., the sequence number up to which each of a plurality of nodes of the SRG is to update its local set of commit records) need not necessarily be the highest committed sequence number. For example, it may be the case that the highest committed sequence number at a committer node is SN1, and due to an urgent need to suspend the SRG's operations as a result of a detection of a rapidly escalating large-scale failure event, the SRG configuration manager may be willing to allow nodes to suspend their operations after updating their commit records to a smaller sequence number (SN1-k). In some implementations, the nodes of the SRG may synchronize their commit records to some lower sequence number before suspending/restarting, and may synchronize to the highest-committed sequence number after the suspension—e.g., after the nodes restart and send "available-for-service" messages to the configuration manager. As noted earlier, in some embodiments the suspension procedures may be initiated by non-committer nodes, or by the configuration manager itself.

Log-Based Optimistic Concurrency Control for Multiple-Data-Store Transactions

Figure 15:
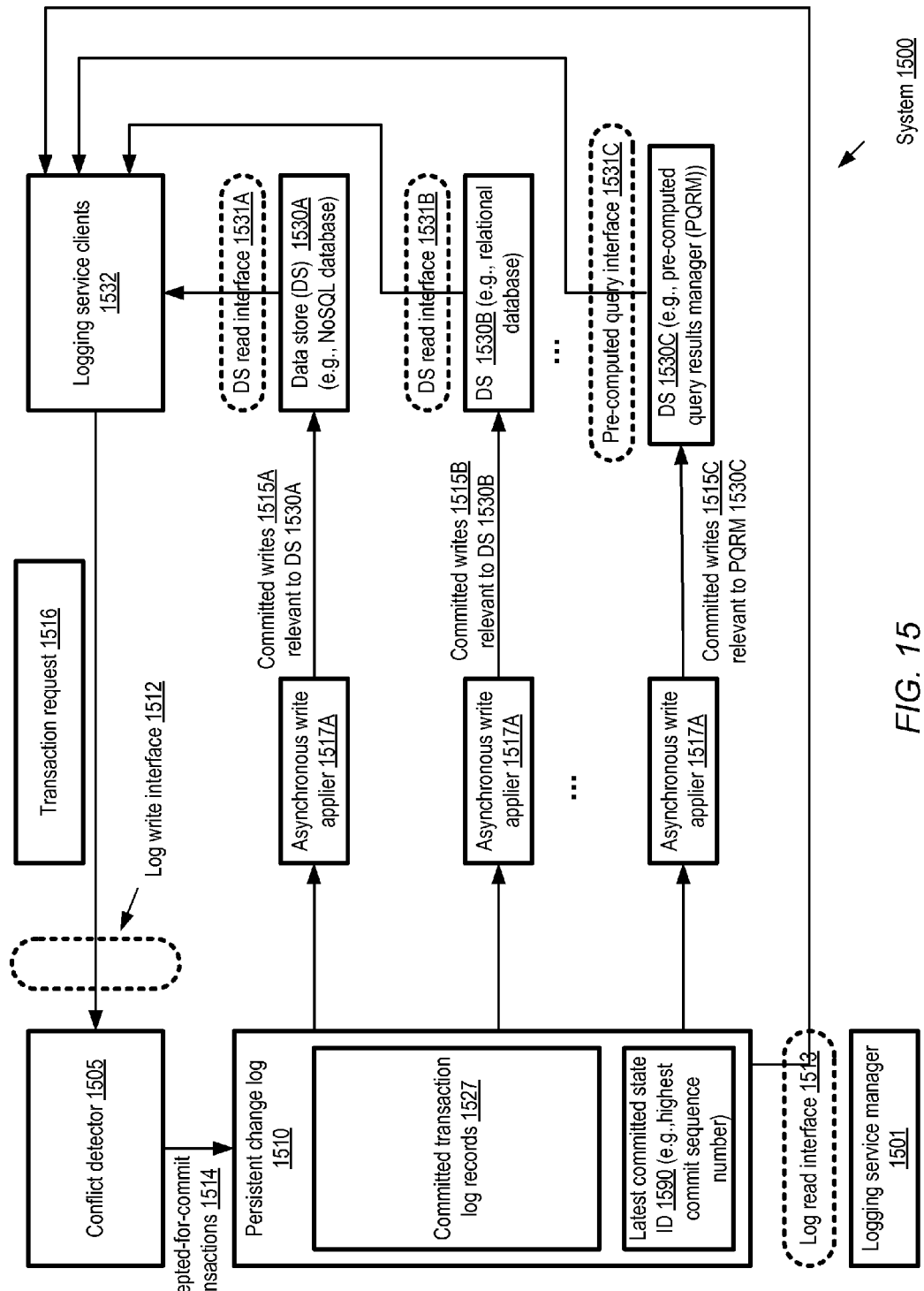
FIG. 15 illustrates an example system environment comprising a persistent change log supporting transactions that may include writes to a plurality of data stores, according to at least some embodiments.

In some embodiments, replication DAGs of the type described above may be used to implement optimistic concurrency control techniques using a logging service that enables support for transactions involving multiple independent data stores. FIG. 15 illustrates an example system environment comprising a persistent change log supporting transactions that may include writes to a plurality of data stores, according to at least some embodiments. System 1500 shows a persistent change log 1510 that may be instantiated using a logging service. One or more data stores 1530, such as data store 1530A (e.g., a NoSQL or non-relational database) and data store 1530B (e.g., a relational database) may be registered at the logging service for transaction management in the depicted embodiment. The terms "concurrency control", "transaction management", and "update management" may be used as synonyms herein with respect to the functionality provided by the logging service.

Clients 1532 may submit registration requests indicating the set of data sources for which they wish to use log-based transaction management for a particular application in some embodiments, e.g., via an administrative or control-plane programmatic interface presented by logging service manager 1501. The persistent change log 1510 may be instantiated in response to such a registration request in some embodiments. In general, a given persistent change log instance may be created for managing transactions for one or more underlying data stores—that is, in at least some deployments log-based transaction management may be used for a single data store rather than for multiple data stores concurrently. The term "data store", as used herein, may refer to an instance of any of a wide variety of persistent or ephemeral data repositories and/or data consumers. For example, some data stores may comprise persistent non-relational databases that may not necessarily provide native support for multi-item transactions, while other data stores may comprise persistent relational databases that may natively support multi-item transactions. In some embodiments, a network-accessible storage service of a provider network that enables its users to store unstructured data objects of arbitrary size, accessible via a web-services interface, may be registered as one of the data stores. Other types of data stores may comprise in-memory databases, instances of a distributed cache, network-accessible block storage services, file system services, or materialized views. Entities that consume committed writes recorded by the logging service, e.g., to produce new data artifacts, may represent another type of data store, and may be referred to generically as "data consumers" herein. Such data stores may, for example, include a pre-computed query results manager (PQRM) (as in the case of data store 1530C) responsible for generating results of specified queries on a specified set of data managed via the logging service (where the specified set of data may include objects stored at one or more different other data stores). In some embodiments, snapshot managers configured to generate point-in-time snapshots of some or all committed data managed via the logging service may represent another category of data stores. Such log snapshots may be stored for a variety of purposes in different embodiments, such as for backups or for offline workload analysis. The term "data consumers" may be used herein to refer to data stores such as PQRMs and snapshot managers. At least some of the data stores may have read interfaces 1531 that differ from those of others—e.g., data store (DS) read interface 1531A of data store 1530A may comprise a different set of APIs, web-based interfaces, command-line tools or custom GUIs (graphical user interfaces) than DS read interface 1531B or pre-computed query interface 1531C in the depicted embodiment.

In the depicted embodiment, logging service clients 1532 may construct transaction requests locally, and then submit (or "offer") the transaction requests for approval and commit by the persistent change log 1510. In one implementation, for example, a client-side library of the logging service may enable a client to initiate a candidate transaction by issuing the logical equivalent of a "transaction-start" request. Within the candidate transaction, a client may perform some number of reads on a selected set of objects at data stores 1530, locally (e.g., in local memory) perform a proposed set of writes directed at one or more data stores. The client may then submit the candidate transaction by issuing the equivalent of a "transaction-end" request. The candidate transaction request 1516 may be received at a conflict detector 1505 associated with the persistent change log 1510 via the log's write interface 1512 in the depicted embodiment. In general, in at least some embodiments, a given transaction request 1516 may include one or more reads respectively from one or more data stores, and one or more proposed writes respectively directed to one or more data stores, where the set of data stores that are read may or may not overlap with the set of data stores being written. The reads may be performed using the native DS read interfaces 1531 in some embodiments (although as described below, in some scenarios clients may also perform read-only operations via the persistent change log 1510).

At least some of the writes indicated in a given transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In the optimistic concurrency control mechanism of the logging service illustrated in FIG. 15, no locks may have to be obtained. Instead, in the depicted embodiment, the conflict detector 1505 may determine, based at least in part on the contents of the transaction descriptor 1516 and on a set of committed transaction log records 1527 of persistent change log 1510, whether the set of data items read in the requested transaction have been updated since they were read from their respective data stores. A sequence number based technique may be used to determine whether such read-write conflicts exist in at least some embodiments, as described below in further detail. If the conflict detector 1505 determines that none of the data that was read during the transaction was overwritten, the requested transaction may be accepted for commit, and such accepted-for-commit transactions 1514 may be submitted for replication of corresponding log records at the persistent change log. The terms "approve" and "accept" may be used as synonyms herein with respect to requested transactions that are not rejected. If some of the read data was updated since the corresponding reads occurred (or if a probability that the data was updated is estimated by the conflict detector to be greater than a threshold), the requested transaction 1516 may instead be rejected or aborted in the depicted embodiment. This type of approach to concurrency control may be deemed optimistic in that decisions as to whether to proceed with a set of writes of a transaction may be made initially under the optimistic assumption that read-write conflicts are unlikely. As a result, in scenarios in which read-write conflicts are in fact infrequent, higher throughputs and lower response times may be achieved than may be possible if more traditional locking-based techniques are used.

In the case where a transaction is accepted for commit, contents of a committed transaction log record may be replicated at some number of nodes of a replication DAG associated with the persistent change log 1510 (as described below in further detail with respect to FIG. 16) in the depicted embodiment before the commit is considered successful. If the requisite number of replicas is not created, the transaction may be rejected or aborted in the depicted embodiment. The number of replicas required for a commit may vary for different applications or clients. Committed transaction log records may also be referred to herein as "commit records". In some embodiments, the requesting client 1532 may be notified when the requested transaction is committed. In at least one embodiment, the client 1532 may be informed when a transaction is rejected, so that, for example, a new transaction request may be generated and submitted for the desired updates.

For each transaction that is committed, in at least some embodiments a commit sequence number (or some other identifier indicative of the committed state of the application) may be generated and stored (e.g., as part of each of the replicas of the committed transaction log record) at the persistent change log 1532. Such a commit sequence number may, for example, be implemented as a counter or as a logical timestamp, as discussed above with respect to the sequence numbers used at replication DAGs for state transitions. The commit sequence number may be determined, for example, by the conflict detector in some embodiments, or at a different component of the persistent change log (such as the committer node of the replication DAG being used) in other embodiments. In the depicted embodiment, after a given transaction is committed and its commit record is stored at the persistent change log, the writes of the transaction may be applied or propagated to one or more of the data stores 1530 to which they were directed (or, as in the case of the PQRM 1530C, where the written data is to be consumed). In some implementations, the writes may be pushed in an asynchronous fashion to the targeted data stores 1530. Thus, in such implementations, there may be some delay between the time at which the transaction is committed (i.e., when the required number of replicas of the commit record have been successfully stored) and the time at which the payload of a particular write operation of the committed transaction reaches the corresponding data store. In the embodiment shown in FIG. 15, respective asynchronous write appliers 1517 may be used to propagate some or all of the writes to relevant data stores. For example, write applier 1517A is configured to apply writes 1515A that are relevant to or data store 1530A, write applier 1517B pushes writes relevant to data store 1530B, and write applier 1517C pushes writes that are to be consumed at data store 1530C. In some implementations, the write appliers may comprise subcomponents (e.g., threads or processes) of the persistent change log 1510, while in other implementations, write appliers 1517 may be implemented as entities external to the persistent change log. In some embodiments, a given write applier 1517 may be responsible for propagating writes to more than one data store 1530, or a single data store 1530 may receive writes from a plurality of write appliers 1517. In at least one implementation, a pull technique may be used to propagate written data to the data stores—e.g., one or more data stores 1530 may submit requests for writes to the persistent change log 1510 or the write appliers, instead of being provided written data at the initiative of the write appliers. After the data written during a transaction is applied to the corresponding data stores, clients 1532 may be able to read the updated data using the respective read interfaces of the data stores. In some embodiments, at least one of the write appliers may be capable of performing synchronous writes (e.g., either when explicitly directed to do so by the logging service, or for all the writes for which the applier is responsible). For example, a client may wish to ensure that at least one write of a given transaction (such as a write directed to a "master" data store among the plurality of data stores involved in the transaction) has been applied before the client is informed that the transaction has been committed. The specific writes to be performed synchronously may be indicated in the transaction request 1516 in some embodiments.

In some embodiments, as described below in further detail, a given transaction request 1516 may include respective indicators of a read set of the transaction (i.e., information identifying the set of data objects read during the transaction), the write set of the transaction (i.e., information identifying the set of data objects that are to be updated/written if the transaction is committed), the write payload (i.e., the set of data bytes that are to be stored for each write), and/or a conflict check delimiter (an indication of a subset of the committed transaction log records that should be examined to accept/reject the transaction). Some or all of these constituent elements of a transaction request may be stored within the corresponding commit record, together with the commit sequence number for the transaction. In at least one embodiment, the persistent change log 1510 may provide an identifier 1590 of the latest committed state of the application (such as the highest commit sequence number generated thus far), e.g., in response to a query from a data store or a query from a logging service client. The write appliers may indicate the commit sequence numbers corresponding to the writes that they apply at the data stores in the depicted embodiment. Thus, at any given point in time, a client 1532 may be able (e.g., by querying the data store) to determine the commit sequence number corresponding to the most-recently-applied write at a given data store 1530.

In at least some embodiments, during the generation of a transaction request (e.g., by a client library of the logging service), the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 1516. The conflict detector may identify commit records with sequence numbers greater than SN1 as the set of commit records to be examined for read-write conflicts for the requested transaction. If any of the write sets of the identified commit records overlaps with the read set of the requested transaction, the transaction may be rejected/aborted; otherwise, the transaction may be approved for commit in this example scenario.

In the depicted embodiment, the logging service may expose one or more programmatic log read interfaces 1513 (e.g., APIs, web-pages, command-line utilities, GUIs, and the like) to enable clients 1532 to read log records directly. In other embodiments, such read APIs allowing direct access to the change log 1510 may not be implemented. The ability to directly access log records indicating specific transactions that have been committed, and to determine the order in which they were committed, may enable new types of analyses to be performed in some embodiments than may be possible from accessing just the data stores directly (since at least some of the data stores may typically only allow readers to see the latest-applied versions of data objects, and not the histories of data objects).

The optimistic concurrency control mechanism illustrated in FIG. 15 may allow more complex types of atomic operations to be supported than may have been possible using the underlying data stores' concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the log-based approach described above, a single transaction that encompasses writes to multiple locations of the non-relational data store (and/or other data stores as well) may be supported with relative ease. A persistent change log 1510, together with the associated conflict detector 1505, may be referred to as a log-based transaction manager herein. In some embodiments, the write appliers 1517 may also be considered subcomponents of the transaction manager.

Figure 16:
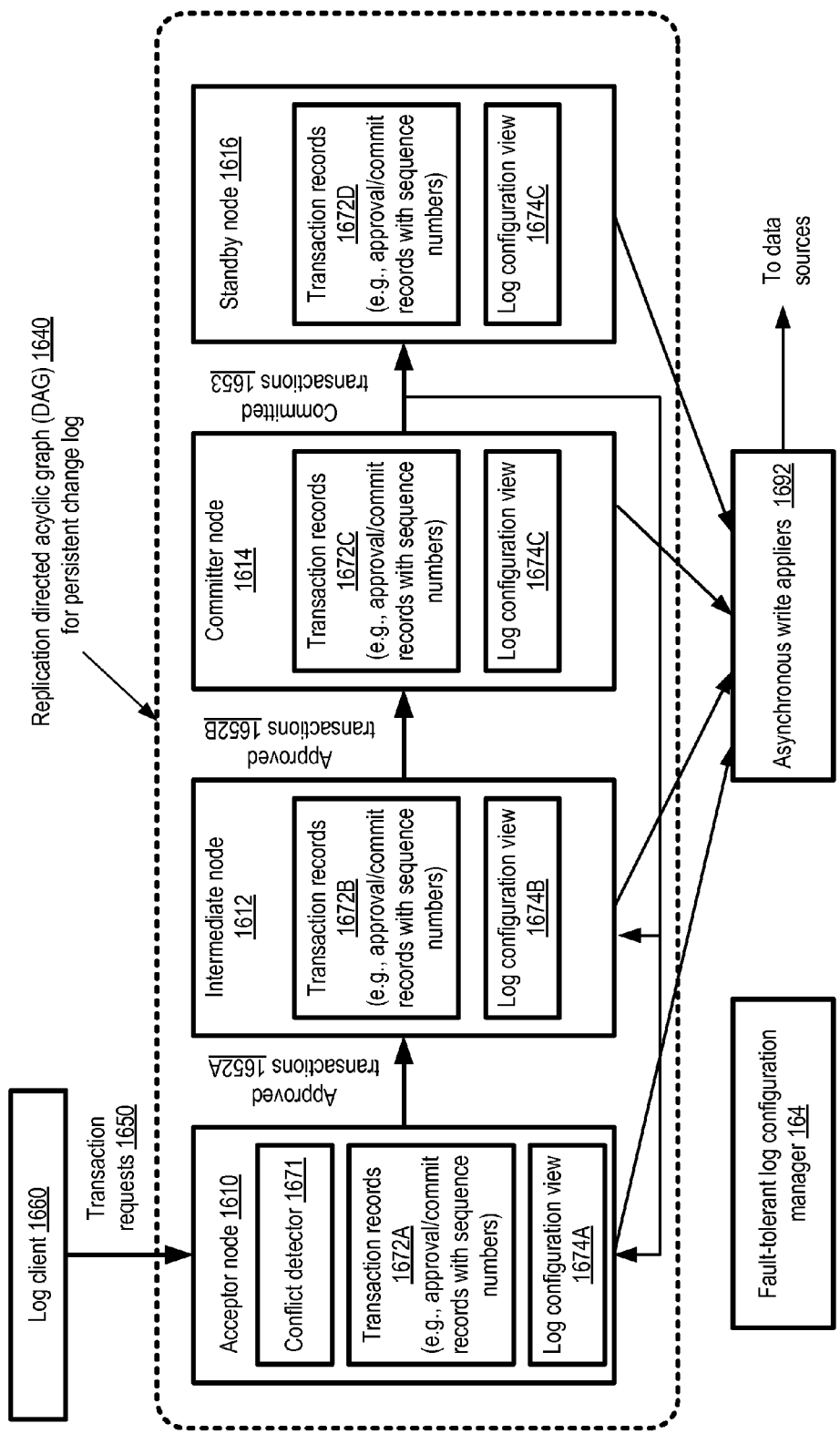
FIG. 16 illustrates an example implementation of a persistent change log using a replication DAG, according to at least some embodiments.

As mentioned above, the persistent change log 1510 may be implemented using the replication DAG described earlier in some embodiments. FIG. 16 illustrates an example implementation of a persistent change log using a replication DAG 1640, according to at least some embodiments. In the depicted embodiment, the application state transitions managed by the DAG correspond to transactions requested by log client 1660 as part of an application that includes reads and writes directed to a set of one or more data stores. The state of the application may be modeled as a respective set of transaction records 1672 stored in local storage at acceptor node 1610, intermediate node 1612, committer node 1614 and standby node 1616, with a current replication path comprising nodes 1610, 1612 and 1614. In some implementations, separate transaction records for approval (i.e., indicating that the requested transaction has been approved for commit) and commit may be stored, while in other embodiments, a single transaction record may be stored with a field that indicates whether the transaction has been committed or not. A sequence number or logical timestamp may be stored as part of, or indicated by, at least some of the transaction records in the depicted embodiment.

The decision as to whether a requested transaction 1650 is to be approved for commit may be made by a conflict detector implemented at the acceptor node 1610 in the depicted embodiment, although in other embodiments the conflict detector may be implemented outside the replication DAG. A fault-tolerant log configuration manager 164 may send configuration-delta messages asynchronously to the DAG nodes 1610, 1612, 1614 and 1616, with each such message indicating a change to the DAG configuration rather than the entire configuration of the DAG, and without requiring the DAG nodes to pause processing the stream of incoming transaction requests submitted by client 1660. Each DAG node may independently process or aggregate the configuration-delta messages received to arrive at its respective view 1674 (e.g., view 1674A at node 1610, view 1674B at node 1612, view 1674C at node 1614, and view 1674D at node 1616) of the current DAG configuration. At least some of the views 1674 may differ from those at other nodes at a given point in time; thus, under normal operating conditions, the different DAG nodes may not need to synchronize their view of the DAG configuration with each other. Messages 1652A and 1652B indicating approved (but not yet committed) transactions may be transmitted from acceptor node 1610 and intermediate node 1612 respectively along the replication pathway. In the depicted embodiment, committer node 1614 may transmit messages 1653 indicating commits to the acceptor and intermediate nodes as well as to standby node 1616. Asynchronous write appliers 1692, shown in the embodiment of FIG. 16 as entities outside the replication DAG, may propagate writes from various committed transaction records to the appropriate data stores or data consumers. In other embodiments, the write appliers may be implemented within the replication DAG, e.g., as respective processes running within the DAG nodes. In some implementations, only a subset of the DAG nodes may be read by the appliers 1692 in order to propagate committed writes to their destination data sources or consumers. In other embodiments, as shown in FIG. 16, the appliers may read committed transaction records from any of the DAG nodes to push the contents of the write payloads as described earlier.

Transaction Request Elements

Figure 17:
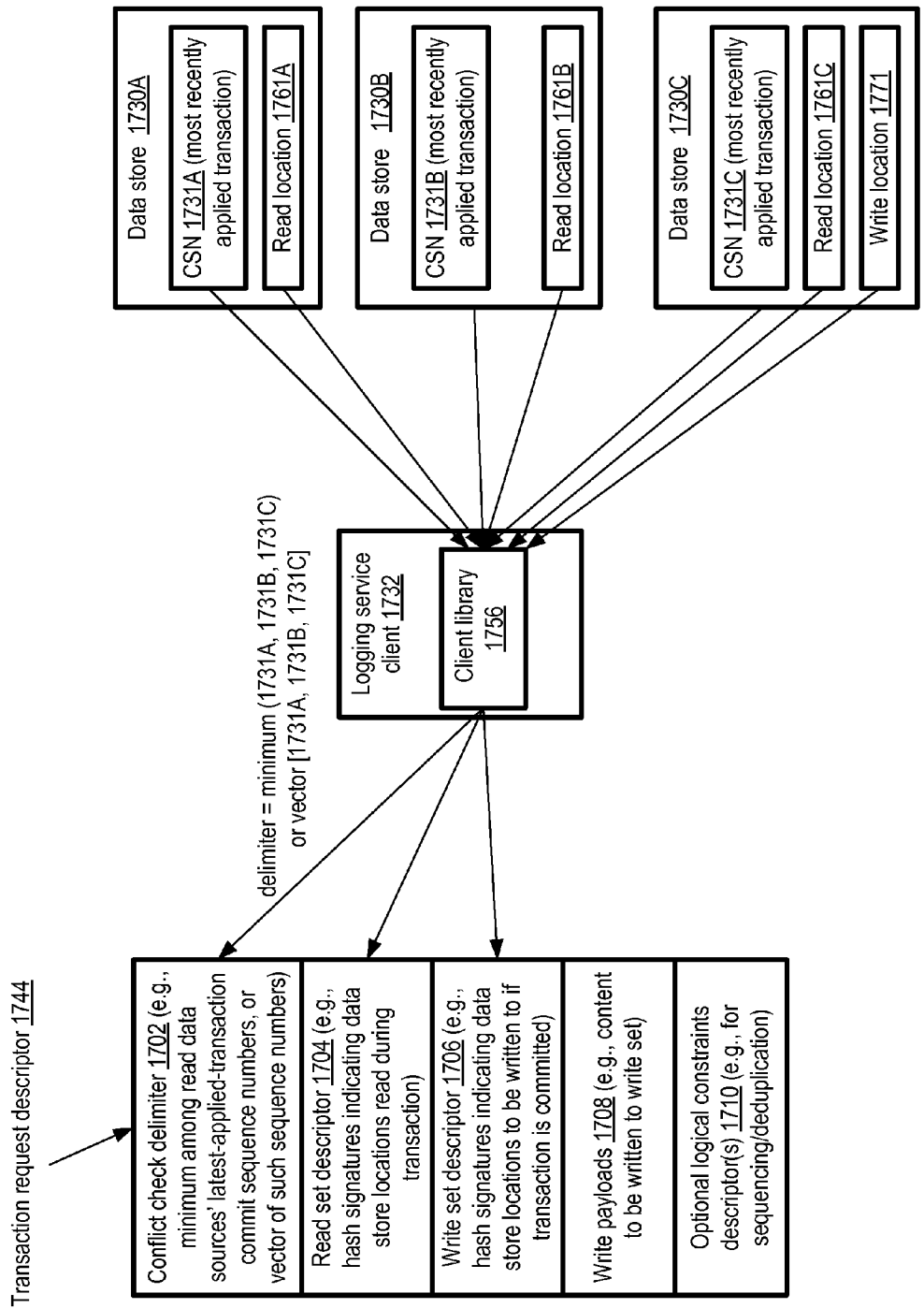
FIG. 17 illustrates example component elements of a transaction request descriptor that may be submitted by a client of a logging service, according to at least some embodiments.

FIG. 17 illustrates example component elements of a transaction request descriptor 1744 that may be submitted by a client 1732 of a logging service, according to at least some embodiments. As shown, transaction descriptor 1744 may include conflict check delimiter 1702, read set descriptor 1704, write set descriptor 1706, write payload(s) 1708, and optional logical constraint descriptors 1710 in the depicted embodiment. In the example shown, logging service client 1732 comprises a client library 1756 which may be utilized to assemble the transaction request descriptor. In at least some embodiments, the client library may automatically record the read locations 1761A 1761B, and 1761C respectively within data stores 1730A, 1730B and 1730C from which data is read during the transaction, and/or the write location 1771 (of data store 1730C in the depicted example) to which data is written. In some implementations, the client library 1756 may also obtain, from each of the data sources 1730, a corresponding commit sequence number (CSN) of the most recent transaction whose writes have been applied at the data store most recently. In one embodiment, such CSNs may be retrieved before any of the reads of the transaction are issued to the corresponding data stores, for example. In another embodiment, the CSNs may be retrieved from a given data store 1730 just before the first read that is directed to that data store within the current transaction is issued.

In the depicted embodiment, the conflict check delimiter 1702 may be derived from a function to which the most-recently-applied CSNs are provided as input. For example, in one implementation, the minimum sequence number among the CSNs obtained from all the data stores read during the transaction may be used. In another implementation, a vector or array comprising the CSNs from each of the data stores may be included as the conflict check delimiter 1702 of the transaction request descriptor. The conflict check delimiter 1702 may also be referred to herein as a committed state identifier (CSI), as it represents a committed state of one or more data stores upon which the requested transaction depends. In some embodiments, a selected hash function may be applied to each of the read locations 1761A, 1761B or 1761C to obtain a set of hash values to be included in read descriptor 1704. Similarly, a selected hash function (either the same function as was used for the read descriptor, or a different function, depending on the implementation) may be applied to the location of the write(s) of a transaction to generate the write set descriptor 1706. In other embodiments, hashing may not be used; instead, for example, an un-hashed location identifier may be used for each of the read and write set entries. The write payload 1708 may include a representation of the data that is to be written for each of the writes included in the transaction. Optional logical constraints 1710 may include signatures used for duplicate detection/elimination and/or for sequencing specified transactions before or after other transactions, as described below in further detail. Some or all of the contents of the transaction request descriptor 1744 may be stored as part of the transaction state records (e.g., approved transaction records and/or committed transaction records) replicated at the persistent change log 1510 in some embodiments.

It is noted that the read and write locations from which the read descriptors and write descriptors are generated may represent different storage granularities, or even different types of logical entities, in different embodiments or for different data stores. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used.

In various embodiments, the transaction manager may be responsible, using the contents of a transaction request and the persistent change log, for identifying conflicts between the reads indicated in the transaction request and the writes indicated in the log. For relatively simple read operations, generating a hash value based on the location that was read, and comparing that read location's hash value with the hash values of writes indicated in the change log may suffice for detecting conflicts. For more complex read requests in some embodiments, using location-based hash values may not always suffice. For example, consider a scenario in which a read request R1 comprises the query "select product names from table T1 that begin with the letter 'G'", and the original result set was "Good-product1". If, by the time that a transaction request whose write W1 is dependent on R1's results is examined for acceptance, the product name "Great-product2" was inserted into the table, this would mean that the result set of R1 would have changed if R1 were re-run at the time the transaction acceptance decision is made, even though the location of the "Good-product1" data object may not have been modified and may therefore not be indicated the write records of the log. To handle read-write conflicts with respect to such read queries, or for read queries involving ranges of values (e.g., "select the set of product names of products with prices between $10 and $20"), in some embodiments logical or predicate-based read set descriptors may be used. The location-based read set indicators described above may thus be considered just one example category of result set change detection metadata that may be used in various embodiments for read-write conflict detection.

Read-Write Conflict Detection

Figure 18:
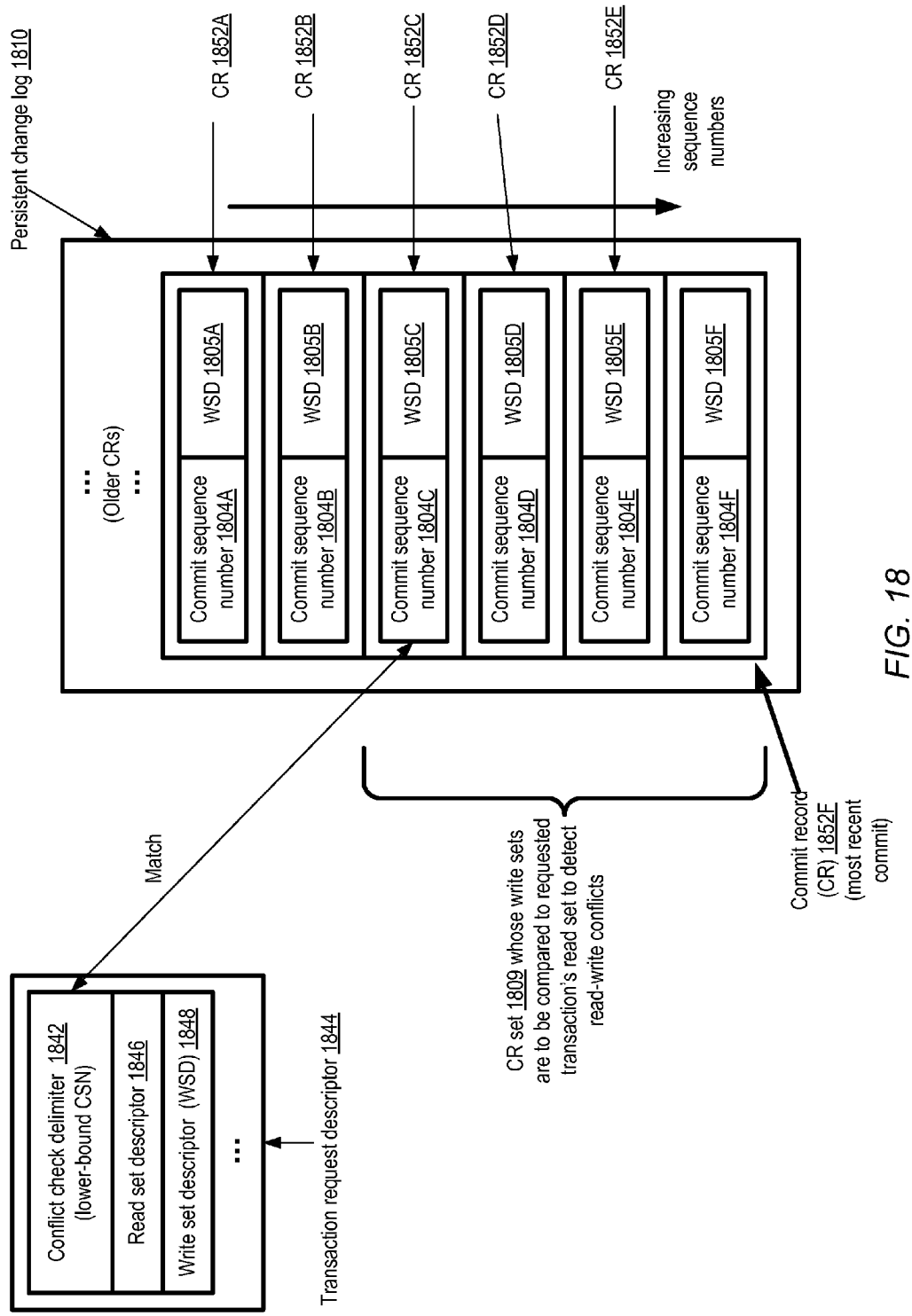
FIG. 18 illustrates an example of read-write conflict detection at a log-based transaction manager, according to at least some embodiments.

FIG. 18 illustrates an example of read-write conflict detection at a log-based transaction manager, according to at least some embodiments. In the depicted example, transaction commit records (CRs) 1852 stored at persistent change log 1810 are shown arranged in order of increasing commit sequence numbers from the top to the bottom of the log. The latest or most recently committed transaction is represented by CR 1852F, with commit sequence number (CSN) 1804F and write set descriptor (WSD) 1805F. Each of CRs 1852A, 1852B, 1852C, 1852D and 1852E comprise a corresponding CSN 1804 (e.g., CSNs 1804A-1804E respectively) and a corresponding WSD 1805 (e.g., WSDs 1805A-1805E).

As shown, transaction request descriptor 1844 includes a conflict check delimiter (or committed state identifier) 1842, a read set descriptor 1846 and a write set descriptor 1848. (The write payload of the requested transaction is not shown). The conflict detector of the log-based transaction management system may be required to identify a set of CRs of log 1810 that are to be checked for conflicts with the read set of the requested transaction. The conflict check delimiter 1842 indicates a lower-bound CSN that may be used by the conflict detector to identify the starting CR of set 1809 to be examined for read-write conflicts with the requested transaction in the depicted embodiment, as indicated by the arrow labeled "Match". Set 1809 may include all the CRs starting with the matching sequence number up to the most recent committed transaction (CR 1852F) in some embodiments. If any of the writes indicated by the CR set 1809 overlap with any of the reads indicated in the transaction request 1844, such a read-write conflict may lead to a rejection of the requested transaction. A variety of mechanisms may be used to check whether such an overlap exists in different embodiments. In one embodiment, for example, one or more hashing-based computations or probes may be used to determine whether a read represented in the read set descriptor 1846 conflicts with a write indicated in the CR set 1809, thereby avoiding a sequential scan of the CR set. In some implementations, a sequential scan of CR set 1809 may be used, e.g., if the number of records in the CR set is below a threshold. If none of the writes indicated in CR set 1809 overlap with any of the reads of the requested transaction, the transaction may be accepted, since none of the data that were read during the preparation of the transaction request can have changed since they were read. In at least one embodiment, a transaction request descriptor may also indicate an upper bound on the sequence numbers of transaction records to be checked for conflicts—e.g., the conflict check delimiter may indicate both a starting point and an ending point within the set of CS 1852.

Methods for Optimistic Log-Based Concurrency Control

Figure 19:
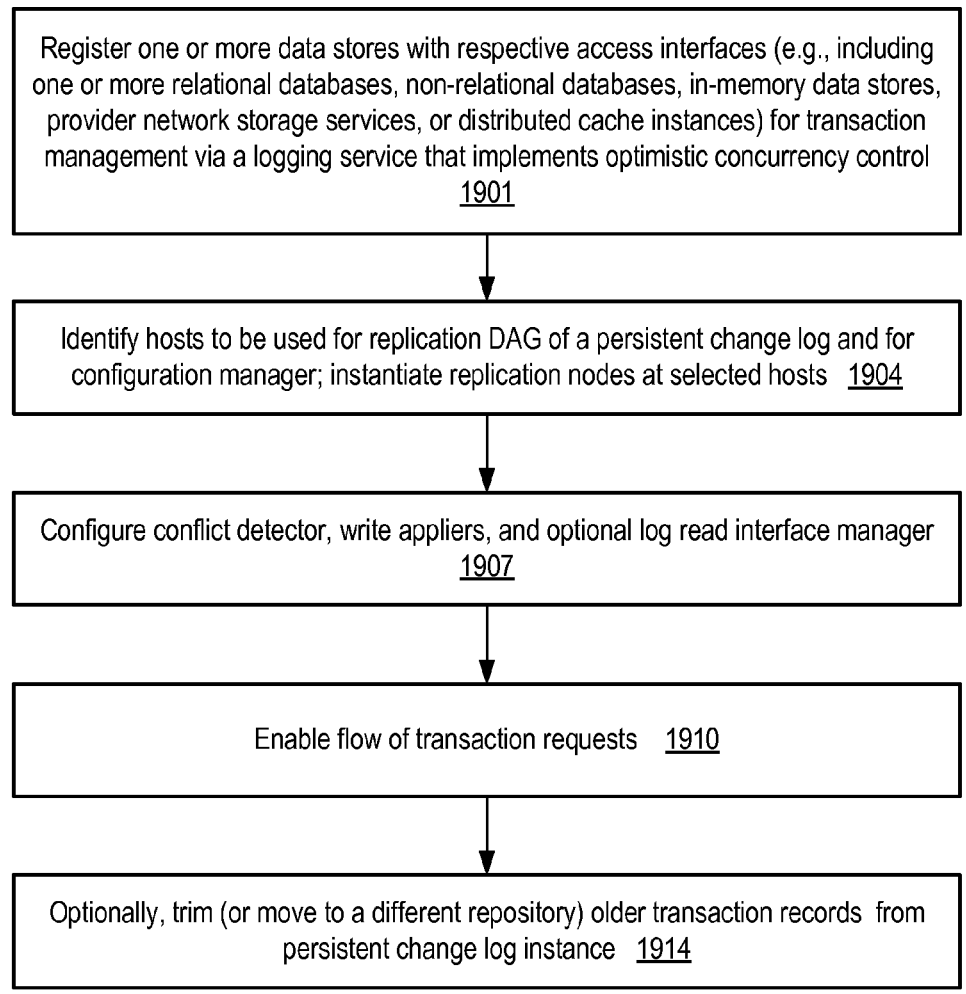
FIG. 19 is a flow diagram illustrating aspects of control-plane operations that may be performed at a logging service, according to at least some embodiments.

FIG. 19 is a flow diagram illustrating aspects of control-plane operations that may be performed at a logging service, according to at least some embodiments. At least some of the administrative or configuration-related operations shown may be performed by a logging service manager 1501 such as that illustrated in FIG. 15, e.g., in response to invocations of one or more administrative programmatic interfaces implemented at the logging service. As shown in element 1901, one or more data stores may be registered for transaction management via a logging service that implements an optimistic concurrency control mechanism, e.g., using the read-write conflict detection approach described above. Transaction management for a variety of types of data stores with respective distinct read interfaces may be implemented using a log-based approach in different embodiments, including for example instances of relational databases, non-relational databases, in-memory databases, provider network-implemented storage services, distributed cache components, pre-computed query results managers, snapshot managers, and so on. In some embodiments, some or all of the underlying data stores managed using a given log instance may not support at least some of the ACID properties (atomicity, consistency, isolation and durability) that are supported by some traditional relational database systems.

The logging service may identify a set of hosts to be used for replication DAG nodes of a persistent change log to be implemented for the registered data stores (element 1904), e.g., with the help of a provisioning service implemented at a provider network. One or more hosts may also be identified for a configuration manager for the replication DAG—for example, as described earlier, a cluster of nodes utilizing a consensus-based protocol for implementing DAG configuration changes may be used in some implementations. Replication nodes and the configuration manager may be instantiated at the selected hosts. Other components of the log-based transaction management mechanism, including the conflict detector, one or more write appliers and an optional read interface manager for the persistent change log may be configured (element 1907). The read interface manager for the log may be responsible in some embodiments for responding to read requests submitted directly to the log (instead of being submitted to the read interfaces of the registered data stores). The write appliers may be instantiated, in one example implementation as respective processes or threads that subscribe to notifications when transactions are committed at the log. The conflict detector may comprise a module that utilizes the read interface of the log in some embodiments. Configuration of the conflict manager may include, for example, establishing the order in which read-write conflicts are identified versus constraint checking operations corresponding to de-duplication or sequencing, the manner in which responses to clients are provided (e.g., whether and how clients are informed regarding transaction rejections/commits), and so on. In some embodiments, conflict detectors, write appliers and/or log read interface managers may be implemented in a multi-tenant fashion—e.g., a given conflict detector, write applier or read interface manager may provide its services to a plurality of clients for whom respective log instances have been established.

After the various components of the persistent change log have been configured, the flow of transaction requests from clients may be enabled (element 1910), e.g., by providing the appropriate network addresses and/or credentials to the clients. In at least some embodiments, the control-plane operations performed at the logging service may include trimming or archiving portions of the stored transaction state records (element 1914). In some such embodiments, for example, when the amount of storage used for transaction records of a given persistent change log crosses a threshold, some number of the oldest transaction records may be copied to a different storage facility (such as a provider network storage service, or a slower set of storage devices than are used for the recent set of transaction records). In another embodiment, the oldest transaction records may simply be discarded. In at least one embodiment, other control-plane operations may be performed as needed, such as switching between one instance of a persistence change log and another—e.g., when the first change log reaches a threshold population of records.

Figure 20:
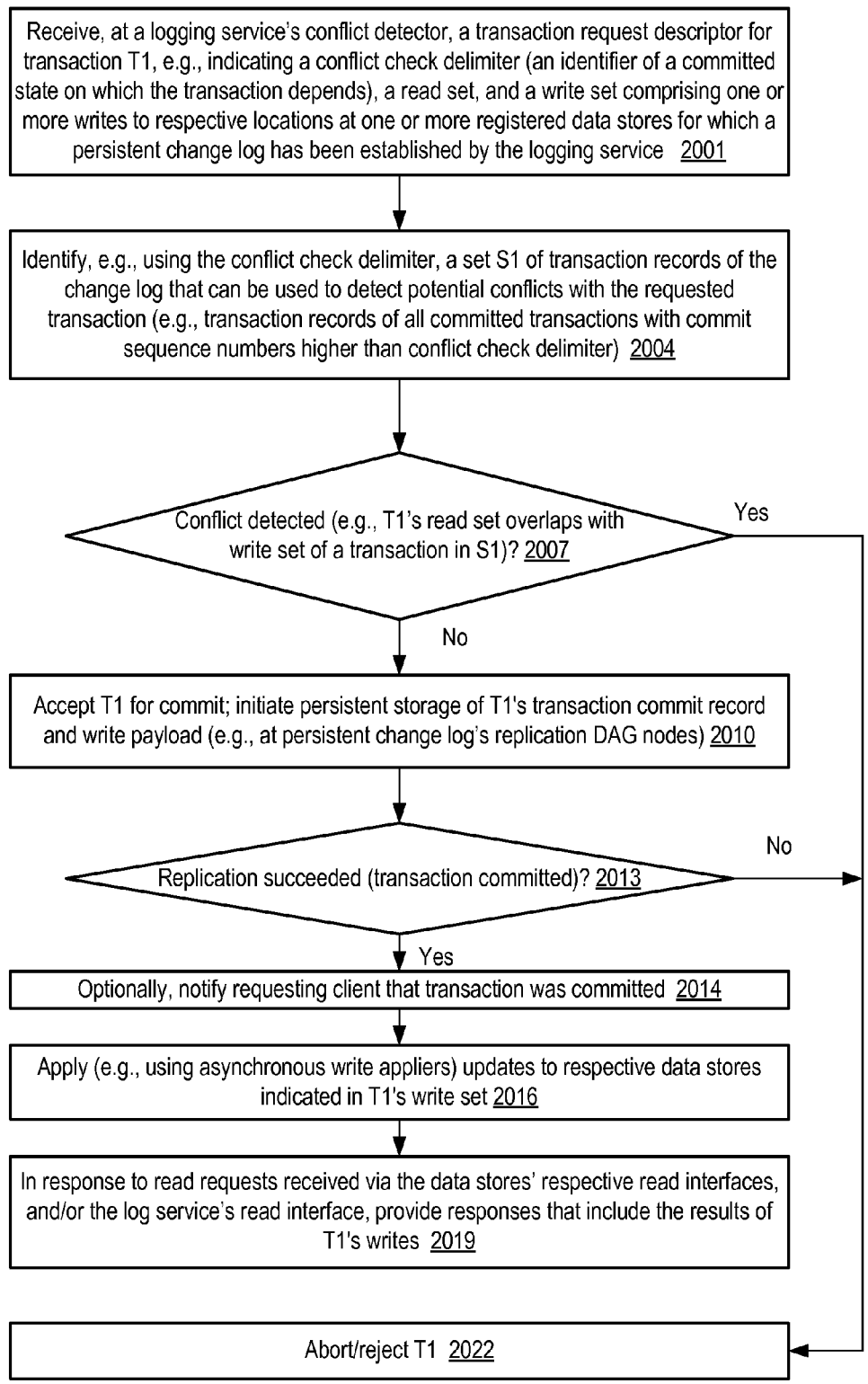
FIG. 20 is a flow diagram illustrating aspects of operations that may be performed at a logging service in response to a transaction request received from a client, according to at least some embodiments.

FIG. 20 is a flow diagram illustrating aspects of operations that may be performed at a logging service in response to a transaction request received from a client, according to at least some embodiments. As shown in element 2001, a logging service's conflict detector may receive a transaction request descriptor of transaction T1, e.g., indicating a conflict check delimiter, a read set, and a write set comprising one or more writes to respective locations at one or more data stores for which a persistent change log has been established by the logging service. The conflict check delimiter may indicate a committed state of one or more source data stores from which the results of the reads of the transaction were obtained, and may therefore serve as a committed state identifier (CSI). CSIs may also be referred to as "snapshot sequence numbers" in some environments, as they may correspond to a point-in-time logical snapshot of the source data stores. A set S1 of transaction records stored at the persistent change log may be identified for checking potential conflicts with the requested transaction (element 2004), e.g., using the conflict check delimiter and the sequence numbers of the transaction records stored in the log. Such a set S1 may include, for example, all the records of transactions that have commit sequence numbers higher than a sequence number indicated in the conflict check delimiter in one embodiment.

If a read-write conflict is detected (element 2007), e.g., if the read set of the requested transaction overlaps at least partly with the write set of one of the transactions of set S1, the transaction T1 may be rejected or aborted (element 2022). In some embodiments, hash functions may be used to determine whether such overlaps exist—e.g., if the read set hashes to the same value as a write set, a conflict may be assumed to have occurred. In some implementations, an indication or notification of the rejection may be provided to the client from which the transaction request was received, enabling the client to retry the transaction by generating and submitting another request descriptor. If a conflict is not detected (as also determined in element 2007), T1 may be accepted for commit (element 2010). In the depicted embodiment, replication of T1's transaction record may be initiated to persistent storage, e.g., at a plurality of replication DAG nodes of the log. In some embodiments, an acceptance sequence number may be assigned to T1 when it is accepted for commit, and may be stored together with contents of at least some of the transaction request descriptor elements in each replica. In at least one embodiment, the acceptance sequence number may serve as a commit sequence number if the transaction eventually gets committed.

Depending on the data durability needs of the application whose transactions are being managed, a threshold number of replicas may have to be stored before the transaction T1's commit is complete. If a sufficient number of replicas are saved (as determined in element 2013), the commit may be deemed successful, and the requesting client may be notified in some embodiments regarding the commit completion (element 2014). If for some reason the number of replicas that can be saved to persistent storage is below the required threshold (as also detected in element 2013), the transaction may be aborted/rejected (element 2022). After T1 commits, in the depicted embodiment the write operations indicated in T1's write set may be applied to the corresponding data stores or data consumers, e.g., by asynchronous write appliers (element 2016). In some embodiments, at least one of the write appliers may be synchronous—e.g., a client may be notified that the transaction has been committed only after such a synchronous write applier completes the subset of the transaction's writes for which updates are to be applied synchronously. After the updates have been applied, the updated data elements may be read in response to client read requests received via the respective data stores' read interfaces (element 2019). In addition to the read interfaces supported by the various registered data stores, in at least some embodiments the persistent change log may itself be queried directly for transaction record contents, e.g., via a programmatic query/read interface of the logging service. In some implementations, reads directed to the log via such a logging service interface may be able to see the results of write operations more quickly in some cases than reads directed to the data stores, since the data stores may rely on asynchronous appliers to propagate the writes that are already present in the log. In some embodiments, synchronous appliers may be used, which propagate writes to the data stores as soon as the transaction is committed at the log. In other embodiments, each applier may have a configurable time window within which writes have to be propagated to the corresponding data store or consumer, so that it becomes possible to adjust the maximum delay between a transaction commit and the appearance of the transaction's modified data at the data stores.

Figure 21:
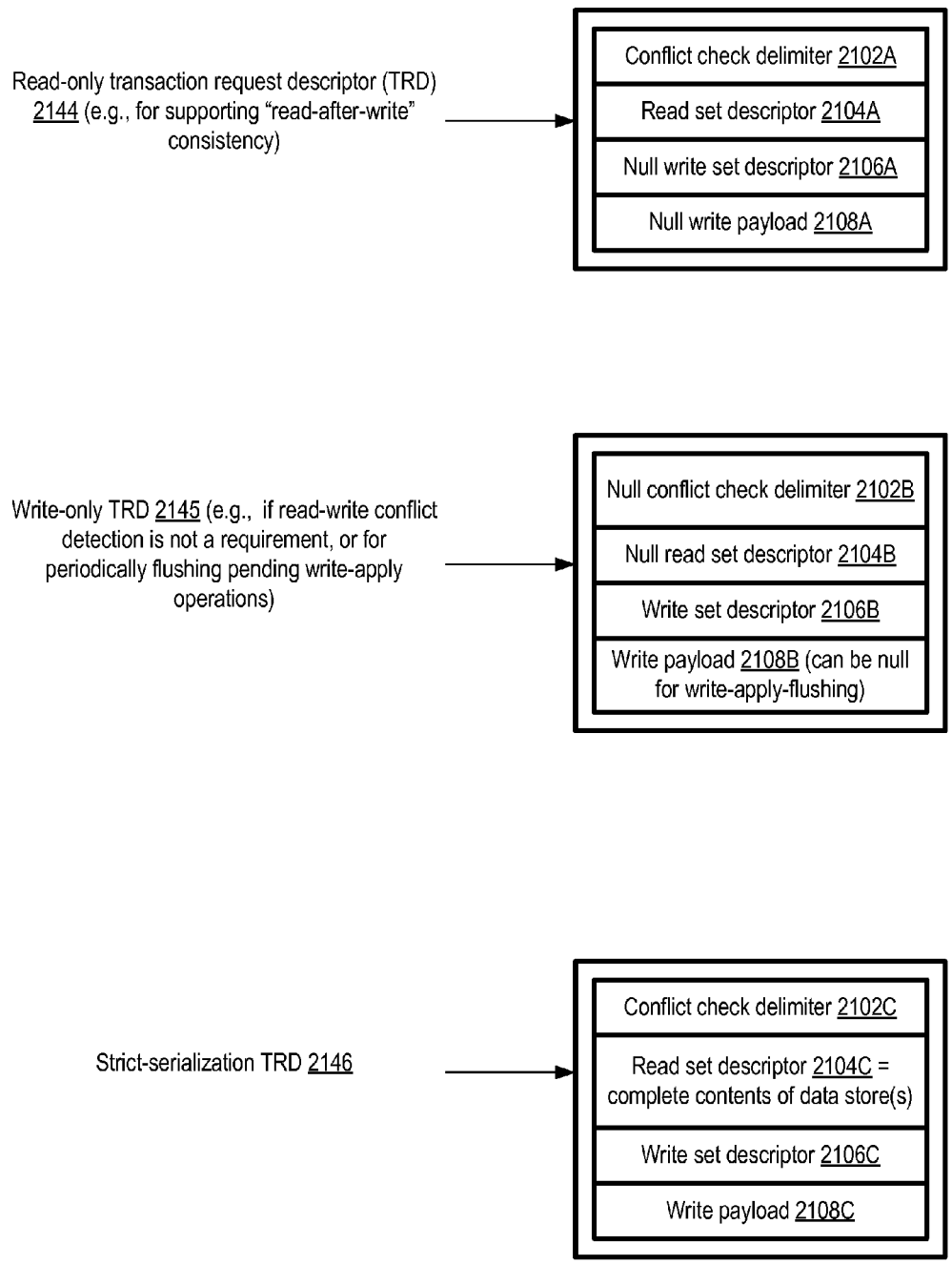
FIG. 21 illustrates examples of transaction request descriptors that may be used to achieve respective special-case consistency objectives, according to at least some embodiments.

FIG. 21 illustrates examples of transaction request descriptors that may be used to achieve respective special-case consistency objectives, according to at least some embodiments. In one embodiment, clients of the logging service may wish to enforce "read-after-write" consistency semantics, according to which a write becomes visible to all readers as soon as it is committed. To ensure read-after-write consistency, i.e., to ensure that reads always "see" data immediately after it is committed, a client may wish to submit transaction requests even for read-only transactions (as well as for transactions that contain writes). Read-only transaction request descriptor (TRD) 2144, for example, has a null write set 2106A and a null write payload 2108A, but has a non-null conflict check delimiter 2102A and a non-null read set descriptor 2104A. Upon receiving such a read-only transaction request descriptor, the conflict detector may check whether an overlap exists between the read set indicated in the request and the writes that have been committed with sequence numbers higher than the sequence number indicated in the conflict-check delimiter. If a conflict is detected, the read-only transaction may be rejected, thus disallowing reads to locations to which writes may have been committed after the conflict check delimiter was generated, even though the requested transaction does not include any writes dependent on those reads.

In at least some embodiments, write-only transaction requests may be submitted to the logging service under certain circumstances. For some applications, it may be the case that the client does not wish to enforce read-write consistency checks, at least during some time periods or for some data stores. Instead, the client may wish to have some writes accepted unconditionally for commit during such time periods. Accordingly, a transaction request descriptor 2145 that has a null read set 2104B and/or a null conflict check delimiter 2102B may be submitted, with a non-null write set descriptor 2106B and a non-null write payload 2108B. Such write-only requests may be submitted, for example, when a data store or object is being initially populated, or if only one writer client is known to be submitting requests during some time period.

As mentioned earlier, in some embodiments asynchronous write appliers may be used to propagate contents of committed writes from the persistent change log to various data stores or data consumers. As a result of the asynchronous nature of the write propagation, it may be the case at some points of time that a set of committed writes has not yet been propagated to their intended data stores. In at least one embodiment, it may be possible to flush such un-applied writes using write-only transactions. For example, if a particular write applier WA1 is configured to have no more than N un-applied writes outstanding to a given data store DS1, a client may submit a write-only transaction request descriptor such as TRD 2145 directed to a special write location WL1 in DS1, where WL1 is used specifically or primarily for flushing outstanding committed writes. In some cases, such a TRD may not need to have any write payload at all (e.g., write payload 2108B may be set to null). When such a write-apply-flushing transaction request is accepted, a new pending committed write may be added to the log and to WA1's queue of outstanding requests. As the length of the queue grows, WA1 may have to start applying the earlier-committed writes in the queue to meet its requirement of no more than N un-applied writes. In some embodiments, such write-apply-flushing requests may be submitted periodically, e.g., once every second, to ensure that committed writes do not remain pending for too long. When a write-apply-flushing transaction's committed write reaches the head of an applier's queue, in some implementations a physical write need not be performed; instead, for example, the applier may simply send the commit sequence number corresponding to the transaction to the destination data store as an indicator of the most-recently "applied" write.

For some applications, clients may wish to enforce strict serialization, during at least for some time periods. That is, only one (write-containing) transaction may be allowed to proceed at a time, regardless of whether any conflicts exist between the data read during the transaction and writes that may have been committed since the transaction preparation was initiated. In such a scenario, a client may submit a strict-serialization transaction request descriptor 2146 to the logging service, with its read set descriptor 2104C indicating the entire contents of all the data sets used by the application. In one implementation in which a hash value is used as an indicator of the locations read/written, and a bit-wise comparison with write set entries is used to detect conflicts, for example, a hash value included in read set descriptor 2402C may be set to a sequence of "1"s (e.g., "1111111111111111" for a 16-bit hash value). If any write-containing transactions have been committed with CSNs greater than the conflict check delimiter 2102C of such a TRD 2146, the transaction corresponding to TRD 2146 may be rejected. Thus, the writes indicated by write set descriptor 2106C and write payload 2108C would only be committed if no other write has been committed (regardless of the location of such a write) in the conflict check interval indicated by the descriptor.

De-Duplication and Sequencing Constraints

Figure 22:
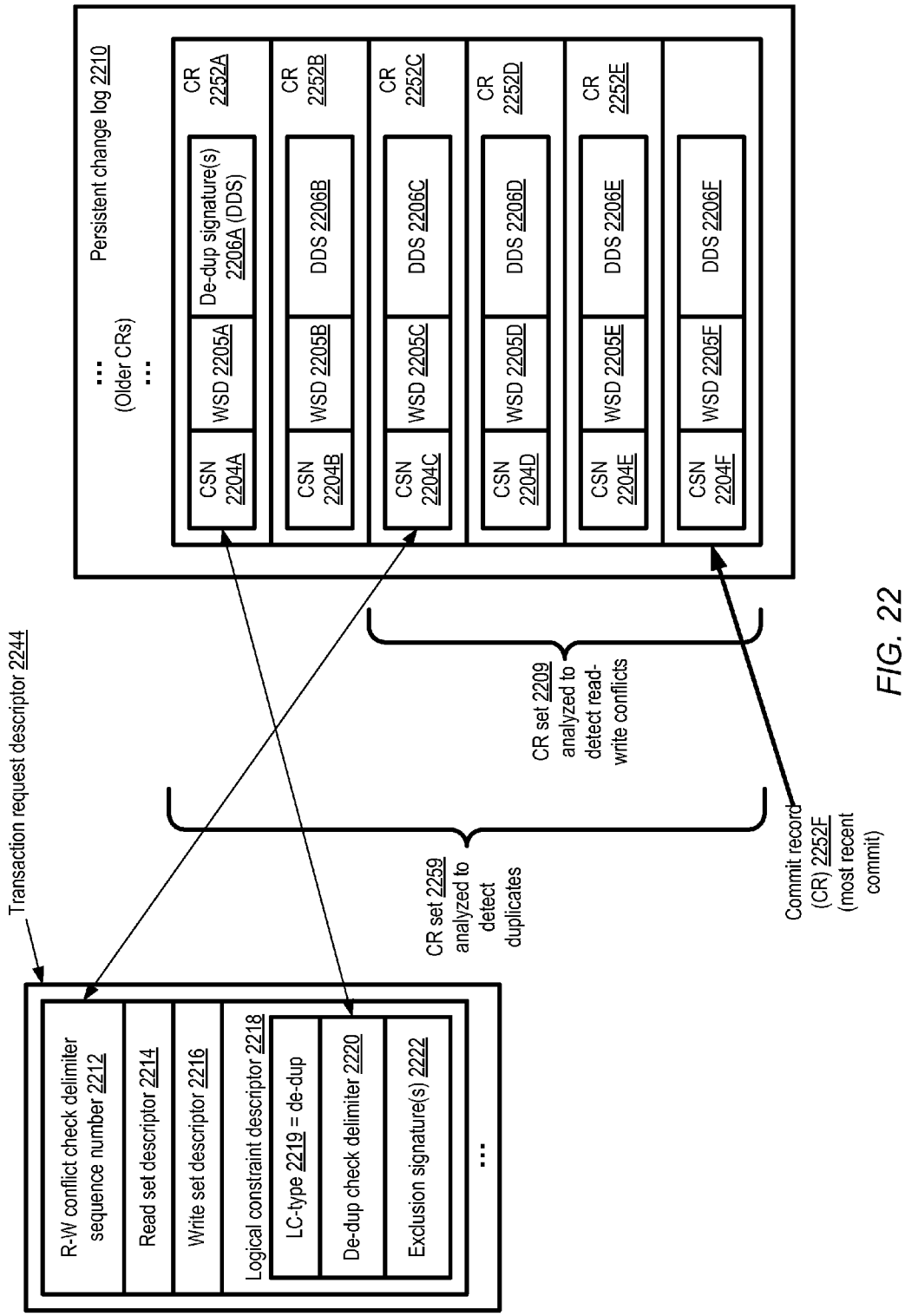
FIG. 22 illustrates an example of enforcing a de-duplication constraint associated with a transaction request received at a log-based transaction manager, according to at least some embodiments.

In some embodiments, clients of the logging service may wish to ensure that duplicate entries are not written to one or more data stores. In one such embodiment, in addition to performing read-write conflict detection as described above, the logging service may also have to enforce a de-duplication requirement indicated in the transaction request. FIG. 22 illustrates an example of enforcing a de-duplication constraint associated with a transaction request received at a log-based transaction manager, according to at least some embodiments. As shown, the transaction request descriptor 2244 comprises a read-write conflict check delimiter 2212, a read-set descriptor 2214, a write-set descriptor 2216, and a logical constraint delimiter 2218. The write payload of TRD 2244 is not shown in FIG. 22. The logical constraint descriptor 2218 includes LC-type field 2219 indicating that it represents a de-duplication constraint, de-duplication check delimiter 2220, and exclusion signature(s) 2222 in the depicted embodiment.

In order to determine whether to accept the requested transaction, the logging service may have to perform two types of checks in the depicted embodiment: one for detecting read-write conflicts, and one for detecting duplicates. The commit records 2252 in the persistent change log 2210 may each include respective commit sequence numbers (CSNs 2204), write set descriptors (WSDs) 2205, and de-duplication signatures (DDSs) 2206 in the depicted embodiment. To determine whether a read-write conflict has occurred, the logging service may identify CR set 2209, starting at a sequence number corresponding to read-write conflict check delimiter 2212 and ending with the most-recent commit record 2252F, whose write sets are to be evaluated for overlaps with the requested transaction's read set descriptor 2214. If a read-write conflict is detected (i.e., if such an overlap exists), the requested transaction may be rejected as described earlier.

To determine whether the requested transaction's write(s) represent duplicates, another CR set 2259 may be identified in the depicted embodiment starting at a sequence number corresponding to de-duplication check delimiter 2220, and ending at the most recent commit record 2252F. For each of the commit records in CR set 2259, the logging service may check whether any of the de-duplication signatures stored in the commit record match the exclusion signature(s) 2222 of the requested transaction. A duplicate may be detected if such a match is found, and the requested transaction may be rejected in such a scenario even if no read-write conflicts were detected. If duplication is not detected, and if no read-write conflicts are detected, the transaction may be accepted for commit.

In at least some embodiments, a de-duplication signature 2206 may represent the data items written by the corresponding transaction in a different way (e.g., with a hash value generated using a different hash function, or with a hash value stored using more bits) than the write set descriptors. Such different encodings of the write set may be used for de-duplication versus read-write conflict detection for any of a number of reasons. For example, for some applications, clients may be much more concerned about detecting duplicates accurately than they are about occasionally having to resubmit transactions as a result of a false-positive read-write conflict detection. For such applications, the acceptable rate of errors in read-write conflict detection may therefore be higher than the acceptable rate of duplicate-detection errors. Accordingly, in some implementations, cryptographic-strength hash functions whose output values take 128 or 256 bits may be used for de-duplication signatures, while simpler hash functions whose output is stored using 16 or 32 bits may be used for the write signatures included in the WSDs. In some scenarios, de-duplication may be required for a small subset of the data stores being used, while read-write conflicts may have to be checked for a much larger set of transactions. In such cases, storage and networking resource usage may be reduced by using smaller WDS signatures than de-duplication signatures in some embodiments. It may also be useful to logically separate the read-write conflict detection mechanism from the de-duplication detection mechanism instead of conflating the two for other reasons—e.g., to avoid confusion among users of the logging service, to be able to support separate billing for de-duplication, and so on.

In other embodiments, the write set descriptors may be used for both read-write conflict detection and de-duplication purposes (e.g., separate exclusion signatures may not be used). Similarly, in some embodiments, the same sequence number value may be used as a read-write conflict check delimiter and a de-duplication check delimiter—i.e., the sets of commit records examined for read-write conflicts may also be checked for duplicates. In at least one embodiment, de-duplication may be performed by default, e.g., using the write-set descriptors, without the need for inclusion of a logical constraint descriptor in the transaction request descriptor.

Figure 23:
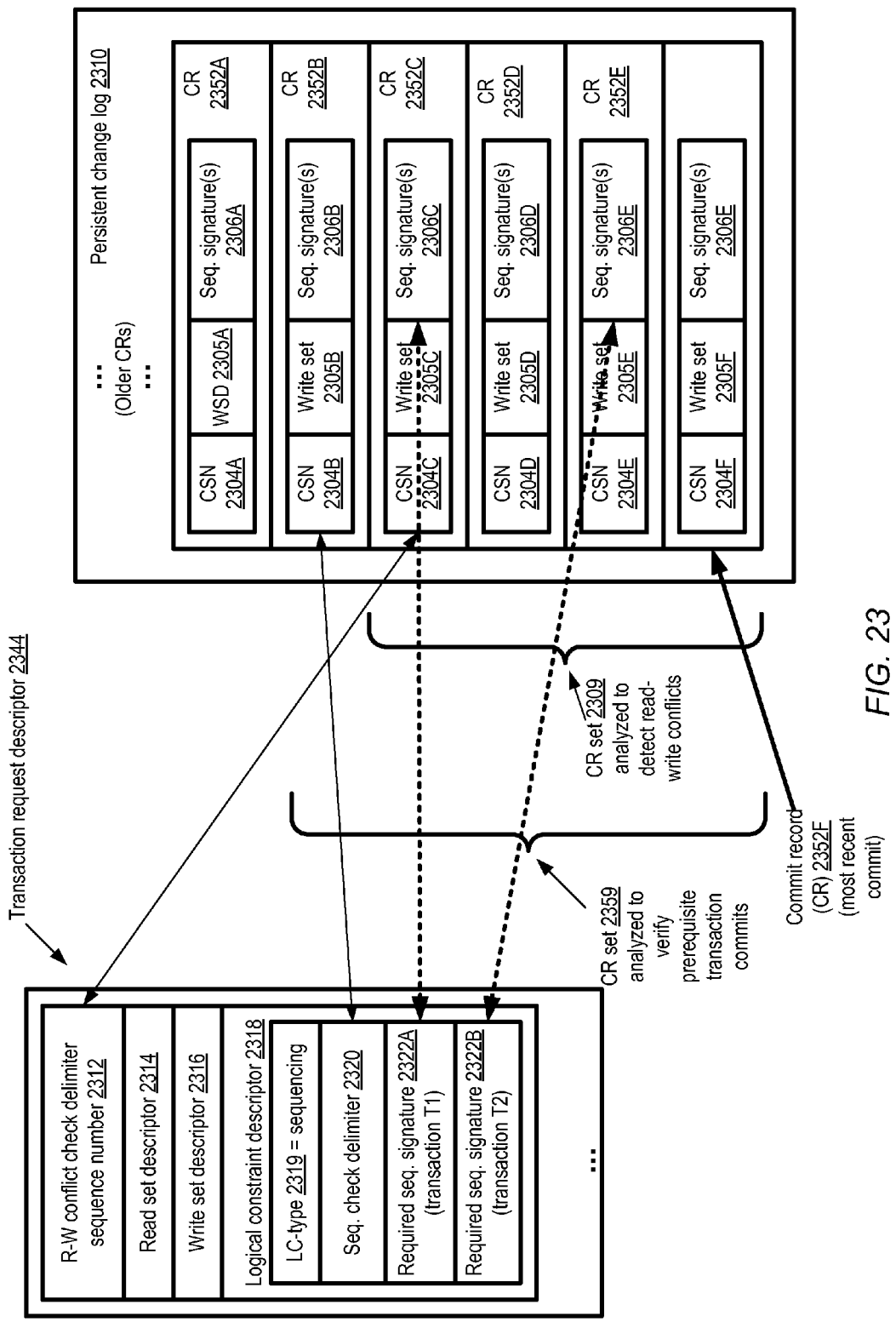
FIG. 23 illustrates an example of enforcing a sequencing constraint associated with a transaction request received at a log-based transaction manager, according to at least some embodiments.

For some applications, clients may be interested in enforcing a commit order among specified sets of transactions—e.g., a client that submits three different transaction requests for transactions T1, T2 and T3 respectively may wish to have T1 committed before T2, and T3 to be committed only after T1 and T2 have both been committed. Such commit sequencing constraints may be enforced using a second type of logical constraint descriptor in some embodiments. FIG. 23 illustrates an example of enforcing a sequencing constraint associated with a transaction request received at a log-based transaction manager, according to at least some embodiments. As shown, the transaction request descriptor 2344 comprises a read-write conflict check delimiter 2312, a read-set descriptor 2314, a write-set descriptor 2316, and a different type of logical constraint delimiter 2318 than logical descriptor 2218 of FIG. 22. The write payload of TRD 2344 is not shown in FIG. 23. The logical constraint descriptor 2318 includes LC-type field 2319 indicating that it represents a sequencing constraint, a sequencing check delimiter 2220, and required sequencing signatures 2322A and 2322B corresponding to transactions T1 and T2 respectively in the depicted embodiment. The logical constraint descriptor 2318 may be included in TRD 2344 to ensure that the requested transaction is committed only if both transactions T1 and T2 (represented by sequencing signatures 2322A and 2322B) have been committed earlier.

In order to determine whether to accept the requested transaction, the logging service may once again have to perform two types of checks in the example illustrated in FIG. 23: one for detecting read-write conflicts, and one for ensuring that the transactions T1 and T2 have been committed. The commit records 2352 in the persistent change log 2310 may each include respective commit sequence numbers (CSNs 2304), write set descriptors (WSDs) 2305, and sequencing signatures 2306 in the depicted embodiment. To determine whether a read-write conflict has occurred, as before, the logging service may identify CR set 2309, starting at a sequence number corresponding to read-write conflict check delimiter 2312 and ending with the most-recent commit record 2352F, whose write sets are to be evaluated for overlaps with the requested transaction's read set descriptor 2314. If a read-write conflict is detected (i.e., if such an overlap exists), the requested transaction may be rejected.

To determine whether the requested transaction's sequencing constraints are met, another CR set 2359 may be identified in the depicted embodiment starting at a sequence number corresponding to sequencing check delimiter 2320, and ending at the most recent commit record 2352F. The logging service may have to verify that respective commit records with sequencing signatures that match required signatures 2322A and 2322B exist within CR set 2359. If at least one of the required signatures 2322 is not found in CR set 2259, the sequencing constraint may be violated and the requested transaction may be rejected, even if no read-write conflicts were detected. If both sequencing signatures are found in CR set 2359, and if no read-write conflicts are detected, the transaction may be accepted for commit.

The sequencing signatures stored within the CRs 2352 (and in the TRD 2344) may be generated using a variety of techniques in different embodiments. In some embodiments, they may be generated from the write sets of the transactions; in other embodiments, sequencing signatures may be based at least in part on other factors. For example, the identity of the requesting client may be encoded in the sequencing signatures in addition to the write signatures in some embodiments, the clock time at which the transaction was requested may be encoded in the sequencing signatures, or an indication of the location from which the transaction was requested may be encoded, and so on. Similar considerations as described above regarding the use of different techniques for representing sequencing signatures than write set signatures may apply in some embodiments. Accordingly, in some embodiments, a different technique may be used to generate sequencing signatures than is used for generating write set descriptor contents, even if both the sequencing signatures and the write set signatures are derived from the same underlying write locations. For example, a different hash function or a different hash value size may be used. In other embodiments, however, the write set descriptors may be used for both read-write conflict detection and sequencing enforcement purposes (e.g., separate sequencing signatures may not be used). Similarly, in some embodiments, the same sequence number value may be used as a read-write conflict check delimiter and a sequencing check delimiter—i.e., the sets of commit records examined for read-write conflicts may also be checked for sequencing. In some cases arbitrary numbers or strings unrelated to write sets may be used as sequencing signatures. In at least one embodiment, a constraint descriptor may not include an LC-type field; instead, the type of a constraint may be indicated by the position of the constraint descriptor within the transaction request. In some embodiments, a "required" flag may be associated with sequencing signatures, and an "excluded" flag may be associated with a de-duplication signature, instead of using LC-type fields, for example. As mentioned earlier in the context of read-write conflict check delimiters, in some embodiments CSN upper bounds may also be specified within a transaction request descriptor to indicate the range of commit records that should be examined for constraint checking, instead of just specifying the CSN lower bound.

In some embodiments, more complex sequencing constraints may be enforced than are illustrated in FIG. 23. For example, instead of simply requesting the logging service to verify that both transactions T1 and T2 must have been committed (in any order) prior to the requested transaction's commit, a client may be able to request that T1 must have been committed prior to T2. Similarly, in some embodiments a client may be able to request negative ordering requirements: e.g., that some set of transactions {T1, T2, Tk} should have been committed before the requested transaction in some specified order (or in any order), and also that some other set of transactions {Tp, Ts} should not have been committed.

Figure 24:
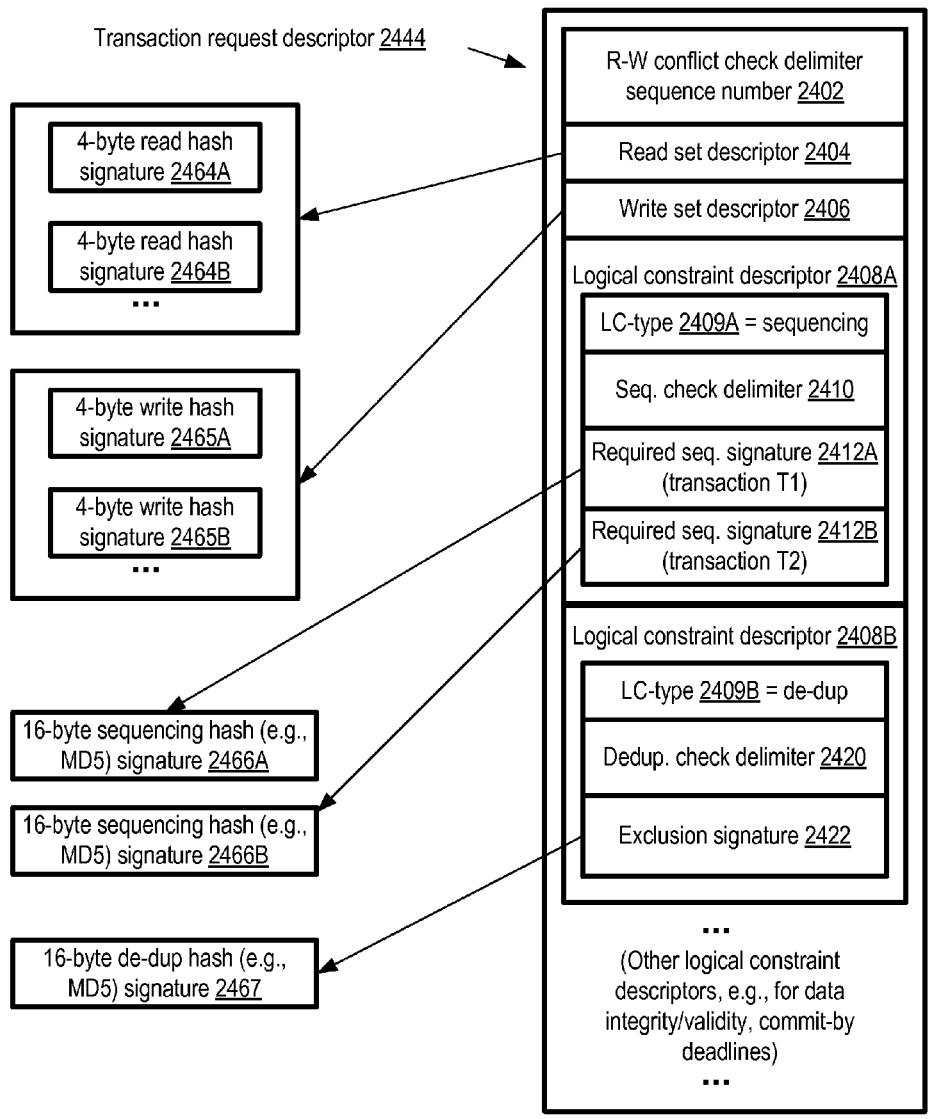
FIG. 24 illustrates an example of a transaction request descriptor comprising multiple logical constraint descriptors, according to at least some embodiments.

In FIG. 22 and FIG. 23, a single type of logical constraint was indicated in the transaction requests shown. In some embodiments, clients may wish to enforce several different types of logical constraints on various transactions. FIG. 24 illustrates an example of a transaction request descriptor comprising multiple logical constraint descriptors, according to at least some embodiments. One sequencing constraint is to be applied, and one de-duplication constraint is to be applied for the same requested transaction represented by transaction descriptor 2444. In the depicted embodiment, the read and write set descriptors comprise 32-bit (4-byte) hash values for each data item read or written. For example, respective 4-byte read hash signatures 2464A and 2464B may represent two data item locations in the read set descriptor 2404, and respective 4-byte write hash signatures 2465A and 2465B may be included in write set descriptor 2406 to represent two locations targeted for writes if the transaction is committed. Read-write conflict check delimiter 2402 is to be used to select the lower bound of a range of sequence numbers in the persistent change log whose commit records are to be checked for read-write conflicts with the requested transaction.

Transaction request descriptor 2444 may also include a sequencing constraint descriptor 2408A and a de-duplication constraint descriptor 2408B in the depicted embodiment. Sequencing constraint descriptor 2408A may include a constraint type field 2409A, a sequencing check delimiter 2410, and one or more required sequencing signatures such as 2412A and 2412B corresponding to transactions whose commits must have been completed for the requested transaction to be accepted. De-duplication constraint descriptor 2408B may include a constraint type field 2409B, a deduplication check delimiter 2420, and a deduplication exclusion signature 2422.

As shown, in the depicted embodiment, the required sequencing signatures 2412A, 2412B and the de-duplication signature 2422 may respectively comprise 128-bit (16-byte) hash signatures 2466A, 2466B and 2467. Thus, the logical constraint signatures may each occupy four times as many bits as are used per data item for read and write set signatures in the depicted example, which may help reduce the number of hash collisions for the logical constraint-related comparisons relative to the comparisons performed for read-write conflict detection. In some embodiments, a cryptographic hash function such as MD5 may be used for the sequencing and/or the de-duplication signatures. The use of cryptographic hash functions may help reduce the probability of errors in evaluating logical constraints to near zero in at least some such embodiments. Although a reasonably low rate of transaction rejections based on false positive hash collisions (e.g., on a false positive read-write conflict detection) may be acceptable, at least some clients may be much more concerned about avoiding the acceptance of a transaction due to a false positive hash collision (e.g., in the case of commit sequencing), and the use of cryptographic-strength hash functions may help to avoid such erroneous transaction acceptances. In some implementations, clients may be able to select hash functions to be used for duplicate detection and/or for sequencing purposes. Different hash functions and/or hash value lengths may be used for de-duplication signatures, sequencing signatures and/or read or write signatures in some embodiments than shown in FIG. 24—for example, the de-duplication and sequencing signatures may differ in size. In at least some embodiments, the addresses of data items read or written may be used for read/write set signatures, deduplication and/or sequencing signatures, e.g., instead of using hash values generated from the addresses. In one embodiment, the de-duplication and/or write signatures may be derived from the write payload in addition to, or instead of, from the locations to which data is written.

Additional logical constraints may also be specified in the transaction request descriptor in some embodiments, such as data integrity/validity constraints or commit-by deadline constraints. An example data integrity or validity constraint may require, for example, that a particular value V1 may only be stored in a data store DS1 if a different value V2 is already stored, either in DS1 or in some other data store. A data validity constraint may define acceptable ranges (either unconditional, or conditioned on the values stored in specified data store locations) for specified data types or data items to be stored. Commit-by constraints may indicate deadlines by which a transaction's commit is to be completed, with the intent that the transaction should be abandoned or aborted if the deadline is not met.

Figure 25:
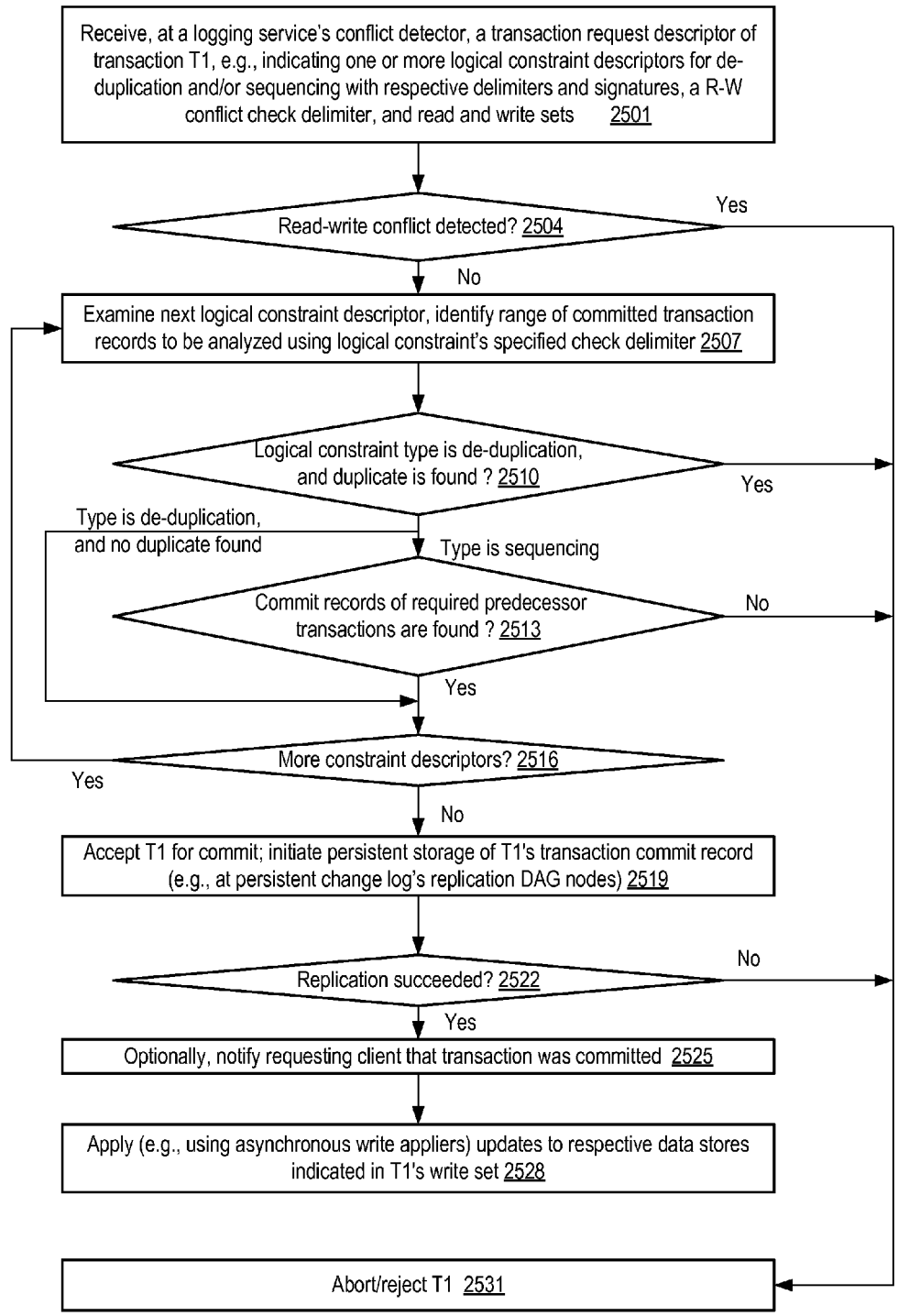
FIG. 25 is a flow diagram illustrating aspects of operations that may be performed at a logging service in response to a transaction request that indicates one or more logical constraints, according to at least some embodiments.

FIG. 25 is a flow diagram illustrating aspects of operations that may be performed at a logging service in response to a transaction request that indicates one or more logical constraints, according to at least some embodiments. In the depicted embodiment, a given transaction's commit requirements may include concurrency control requirements (e.g., a requirement that no read-write conflicts of the kinds described above are found) as well as logical constraint requirements. Both de-duplication and sequencing logical constraints may be supported for a single transaction (other logical constraints may also be supported, but only the operations pertaining to de-duplication and sequencing are shown in FIG. 25) in at least some embodiments. As shown in element 2501, a transaction request descriptor that includes one or more logical constraint descriptors of a transaction T1 may be received at a conflict detector associated with a particular persistent change log instance of a logging service. For each logical descriptor, a corresponding check delimiter may be specified in the depicted embodiment, to be used to select the set of commit records to be analyzed to determine whether the logical constraint is met or violated. Respective sets of one or more signatures may also be specified for each logical constraint. The read and write sets of the requested transaction may also be indicated, together with a read-write conflict check delimiter. As mentioned earlier, in some embodiments, the same delimiter may be used for one or more logical constraints as that used for checking read-write conflicts. Also, in at least one embodiment, separate signatures may not be required for logical constraints; instead, for example, the write set signatures may be used as de-duplication and/or sequencing signatures.

Using the read-write conflict check delimiter, a first set of commit records CRS1 to be analyzed may be identified in the depicted embodiment. Such a set may, for example, comprise those commit records whose sequence numbers lie in a range starting at the read-write conflict check delimiter, up to the sequence number of the most recently-stored commit record (or up to a different upper bound indicated in the transaction request). If a read-write conflict is detected (element 2504) (e.g., if the write sets of any of the commit records of CRS1 overlaps with the read set of the requested transaction), the transaction may be rejected/aborted (element 2531). Checking for read-write conflicts may also be referred to herein as verifying that the requested transaction meets concurrency control requirements. In some embodiments, the client from which the transaction request was received may be notified that the transaction has been aborted.

If a read-write conflict is not detected (also in operations corresponding to element 2504), each of the logical constraints indicated by the corresponding descriptors may be checked in sequence in the depicted embodiment. The next logical constraint descriptor in the sequence may be examined, and a new commit record set CRS-k may be selected for constraint analysis based on the check delimiter associated with the constraint (element 2507). For example, CRS-k may include all the commit records with sequence numbers in the range starting with the delimiter and ending at the highest recorded commit sequence number (or up to a different upper bound indicated in the transaction request). The analysis to be performed may depend on the type of the logical constraint descriptor. If a de-duplication constraint is to be checked, and if a duplicate is found by comparing the de-duplication signatures of CDR-k and the requested transaction (element 2510), the transaction may also be rejected/aborted (element 2531). If the constraint is a de-duplication constraint and no duplicate is found (as also detected in element 2510), and if more logical constraints remain to be analyzed, the next logical constraint descriptor may be examined and the operations corresponding to elements 2507 onwards may be repeated for the next logical descriptor.

If the constraint descriptor indicates a sequencing constraint indicating one or more required signatures of committed transactions, the CRS-k for the sequencing constraint may be examined to ensure that the required signatures have in fact been stored for transactions whose commits have completed. If the commit records of the required transactions are not found (as detected in element 2513), the requested transaction may also be aborted/rejected (element 2531). If the commit records of the required transactions are found (also in operations corresponding to element 2513), the sequencing constraint processing may be complete. As in the case of read-write conflict detection, logical constraint checking may also be performed using hash functions for the comparisons in at least some embodiments, thus avoiding the overhead of scanning the commit record sets. If any logical constraint descriptors remain (element 2516), they may be examined in turn. If no logical constraint descriptors remain (as also detected in element 2516), the transaction may be accepted for commit. A procedure to save the transaction's commit records in persistent storage may be initiated in the depicted embodiment (element 2519), e.g., at several nodes of a replication DAG. If the replication succeeds (e.g., if a sufficient number of copies of the commit record are stored successfully at respective storage devices) (as detected in element 2522), the transaction's commit may be considered complete. If for some reason the required number of replicas is not stored, the transaction may still be rejected/aborted (element 2531). In some embodiments, a notification that the transaction has been successfully committed may be transmitted to the requesting client (element 2525).

In some embodiments, operations to check more than one logical constraint may be performed in parallel instead. In one embodiment, any combination of the read-write conflict check and the logical constraint checks may be performed in parallel. In some embodiments, responses regarding each of the logical constraints indicated may be provided to the requesting client, even if one or more of the constraints are not met. For example, in the case of a transaction request with a de-duplication constraint and a sequencing constraint, the sequencing constraint may be checked even if the de-duplication constraint isn't met, and the results of the evaluation of both constraints may be provided to the client. In some implementations, clients may be able to explicitly request that a specified subset or all of the logical constraints of a given transaction request are to be checked.

It is noted that in various embodiments, operations other than those illustrated in the flow diagram of FIGS. 6, 7, 8, 9, 10, 12, 13, 14, 19, 20 and 25 may be used to implement at least some of the techniques of application state management, coordinated suspension, concurrency control and logical constraint management described above. Some of the operations shown may not be implemented in some embodiments, may be implemented in a different order, or in parallel rather than sequentially (as indicated above with respect to FIG. 25).

Use Cases

The techniques described above, of managing application state changes using replication DAGs, including log-based transaction management, may be useful in a variety of embodiments. As more and more organizations migrate their computing to provider network environments, a larger variety of distributed storage applications with respective consistency semantics and respective interfaces has been developed. Some large applications may span multiple data store instances, and the replication DAGs and log-based transaction management techniques may represent a unified, flexible, scalable, and highly-available approach to distributed storage application management. The ability of the replication DAG nodes to make progress on application state transitions even though the respective views of the DAG configuration may at least temporarily diverge may reduce or eliminate at least some of the "stop-the-world" pauses in handling application requests that may arise if less dynamic replication techniques are used. Log-based transaction management may not only allow cross-data-store transactions (as well as multi-item transactions for data stores that may not support atomic multi-write transactions), but may also facilitate features such as automated query response generation, snapshot generation, and the like. Entirely new ways of performing data analysis across multiple data stores may be enabled using the logging service's own read interfaces.

In some provider network environments, log-based transaction management via replication DAGs may be used to store control-plane configuration information of another network-accessible service implemented at the provider network, such as a virtualized computing service, a storage service, or a database service. In such scenarios, the transactions managed using the log may represent changes to the configurations of various resources of the network-accessible service (such as compute instances or virtualization hosts in the case of a virtual computing service).

Illustrative Computer System

Figure 26:
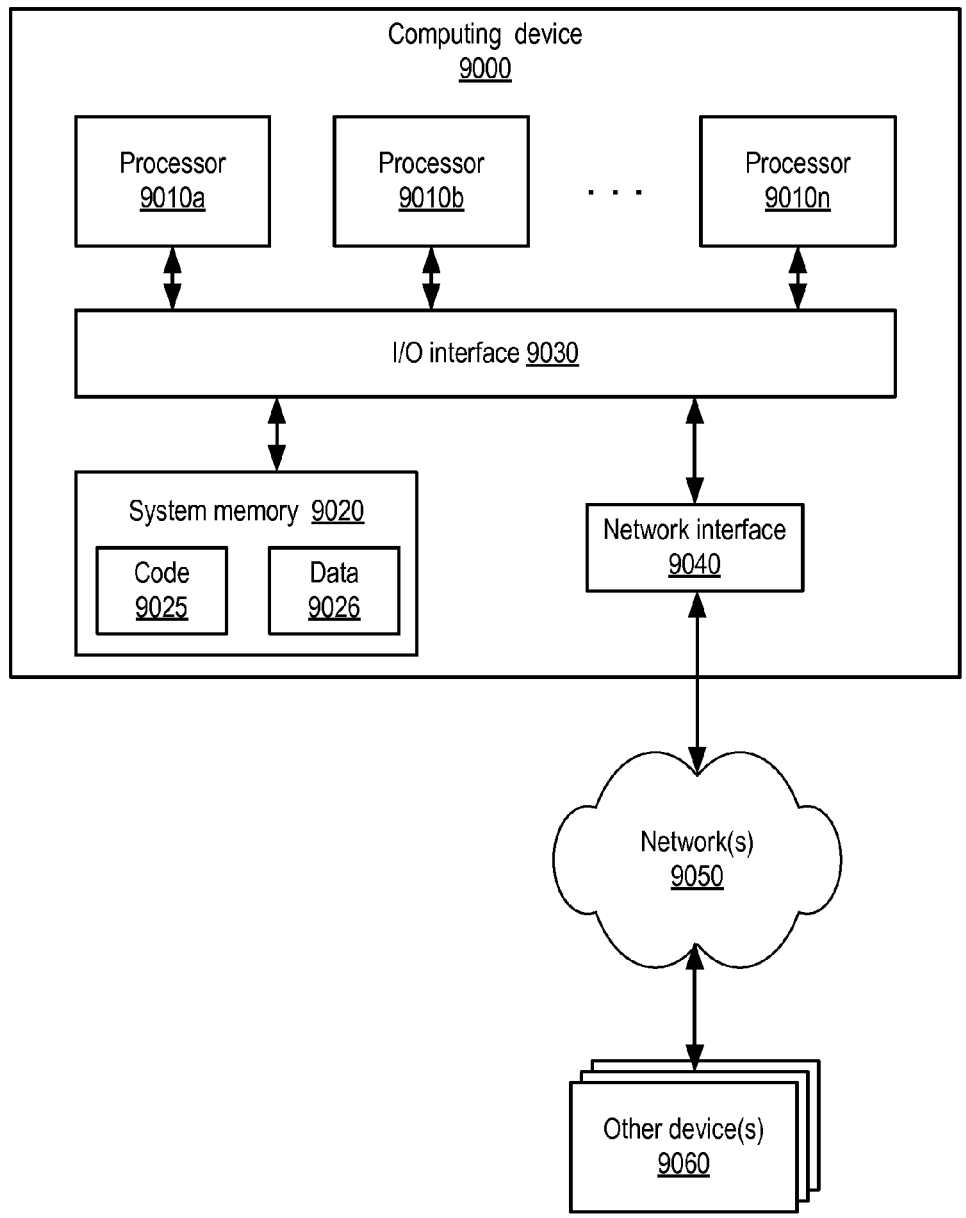
FIG. 26 is a block diagram illustrating an example computing device that may be used in at least some embodiments.

In at least some embodiments, a server that implements a portion or all of one or more of the technologies described herein, including the techniques to implement the various components of a replication DAG and/or a logging service for transaction management may include a general-purpose computer system that includes or is configured to access one or more computer-accessible media. FIG. 26 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 25, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 25 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 26 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices to:
receive, at a log-based transaction manager instantiated for one or more data stores, a requested transaction from a client, wherein the requested transaction includes a transaction descriptor that indicates a first logical constraint for the requested transaction specified by the client to be checked to determine whether the requested transaction is to be committed based at least in part on (a) a constraint type from a plurality of different supported constraint types, and (b) one or more data signatures;

determine, by the log-based transaction manager using at least some transaction records corresponding to committed transactions stored in a particular persistent log, that the requested transaction is committable with respect to a set of concurrency control requirements distinct from the first client-specified logical constraint;

identify, by the log-based transaction manager, a subset of transaction records stored in the particular persistent log to be examined for checking the first client-specified logical constraint, compare, by the log-based transaction manager, contents of the one or more data signatures with other data signatures stored in the subset of transaction records;

determine, by the log-based transaction manager based at least in part on a result of one or more comparisons, that the first client-specified logical constraint is satisfied by the requested transaction; and commit, by the log-based transaction manager, the requested transaction in response to determining that the requested transaction is committable with respect to the set of concurrency requirements and the first client-specified logical constraint is satisfied by the requested transaction.

2. The system as recited in claim 1, wherein the constraint type of the first client-specified logical constraint is de-duplication, and wherein, to determine that the first client-specified logical constraint is satisfied, the one or more computing devices are further configured to verify that a particular data signature of the one or more data signatures indicated in the transaction descriptor does not match a data signature stored in the subset of transaction records.

3. The system as recited in claim 1, wherein the constraint type of the first client-specified logical constraint is commit sequencing, and wherein, to determine that the first client-specified logical constraint is satisfied, the one or more computing devices are further configured to verify that a particular data signature of the one or more data signatures indicated in the transaction descriptor matches a data signature stored in the subset of transaction records.

4. The system as recited in claim 1, wherein the transaction descriptor indicates, corresponding to a second logical constraint specified by the client to be checked to determine whether the requested transaction is to be committed, a second constraint type that differs from the constraint type of the first client-specified logical constraint.

5. The system as recited in claim 1, wherein the transaction descriptor includes at least a first delimiter to be used to identify the subset of transaction records to be examined to check the first client-specified logical constraint.

6. A method, comprising:
performing, by one or more computing devices:
receiving, at a log-based transaction manager, a requested transaction from a client, wherein the requested transaction includes a transaction descriptor indicating a first logical constraint for the requested transaction specified by the client that indicates one or more data signatures and a constrain type selected from a plurality of different supported constraint types, and the log-based transaction manager is configured to enforce one or more commit requirements for transactions distinct from the first client-specified logical constraint;

identifying a subset of transaction records stored in a particular persistent log to be examined for checking the first client-specified logical constraint, comparing contents of the one or more data signatures indicated in the transaction descriptor with one or more data signatures stored in the subset of transaction records;

determining, based at least in part on a result of said comparing, that the first client-specified logical constraint is met by the requested transaction; and in response to determining that one or more commit requirements of the requested transaction have been met, and that the first client-specified logical constraint is met, committing the requested transaction.

7. The method as recited in claim 6, wherein the first client-specified logical constraint comprises a de-duplication constraint, wherein the one or more data signatures indicated in the transaction descriptor include a particular de-duplication signature representing a location to which a write operation of the requested transaction is directed, and wherein said determining that the first client-specified logical constraint is met by the requested transaction includes verifying that the particular de-duplication signature does not match another de-duplication signature stored in the subset of transaction records.

8. The method as recited in claim 6, wherein the first client-specified logical constraint comprises a commit-sequencing constraint, wherein the one or more data signatures indicated in the transaction descriptor comprise a sequencing signature, and wherein said determining that the client-specified logical constraint is met by the requested transaction comprises verifying that the particular sequencing signature matches another sequencing signature stored in the subset of transaction records.

9. The method as recited in claim 6, wherein the transaction descriptor indicates a second logical constraint specified by the client for the requested transaction.

10. The method as recited in claim 9, wherein the first client-specified logical constraint comprises a de-duplication constraint and the second client-specified logical constraint comprises a commit sequencing constraint.

11. The method as recited in claim 6, wherein the one or more commit requirements comprise a concurrency control requirement.

12. The method as recited in claim 6, wherein the transaction descriptor includes at least a first delimiter to be used to identify the subset of transaction records to be examined to check the first client-specified logical constraint.

13. The method as recited in claim 12, wherein the first delimiter comprises a client-specified logical timestamp corresponding to a commit of a particular transaction, wherein the particular transaction was committed prior to said receiving the transaction descriptor.

14. The method as recited in claim 12, wherein the transaction descriptor indicates a second client-specified logical constraint, and wherein the transaction descriptor comprises a different delimiter to be used to identify a different subset of transaction records to be examined to check the second client-specified logical constraint.

15. The method as recited in claim 6, wherein the transaction descriptor comprises a particular write signature indicative of a targeted write location of the requested transaction, wherein the one or more data signatures comprise a particular de-duplication signature corresponding to the targeted write location, wherein the particular de-duplication signature differs from the particular write signature.

16. The method as recited in claim 6, wherein the requested transaction includes one or more reads from a data store comprising one of: (a) a relational database, (b) a non-relational database, (c) an in-memory database, (d) a storage service implementing a web service interface, (e) a file system, or (f) an instance of a distributed cache.

17. A non-transitory computer-accessible storage medium storing program instructions that when executed on one or more processors:

receive, at a log-based transaction manager, a requested transaction from a client, wherein the transaction includes a transaction descriptor indicating a first logical constraint for the requested transaction specified by the client that indicates one or more data signatures and a constrain type selected from a plurality of different supported constraint types, and the log-based transaction manager is configured to enforce one or more commit requirements for transactions distinct from the first client-specified logical constraint;

identify a subset of transaction records stored in a particular persistent log to be examined for checking the first client-specified logical constraint, compare contents of the one or more data signatures indicated in the transaction descriptor with one or more data signatures stored in the subset of transaction records;

determine, based at least in part on a result of comparing the contents of the one or more data signatures, that the first client-specified logical constraint is met by the requested transaction; and in response to a determination that one or more commit requirements of the requested transaction have been met, and that the first client-specified logical constraint is met, commit the requested transaction.

18. The non-transitory computer-accessible storage medium storing program instructions as recited in claim 17, wherein the first client-specified logical constraint comprises one of: a de-duplication constraint, or a commit sequencing constraint.

19. The non-transitory computer-accessible storage medium storing program instructions as recited in claim 17, wherein the one or more one or more commit requirements comprise a concurrency control requirement.

20. The non-transitory computer-accessible storage medium storing program instructions as recited in claim 17, wherein the transaction descriptor includes at least a first delimiter to be used to identify the subset of transaction records to be examined to check the first client-specified logical constraint.

* * * * *